United States Patent
Haley et al.

(10) Patent No.: US 10,321,450 B2
(45) Date of Patent: Jun. 11, 2019

(54) MULTICARRIER COMMUNICATIONS SYSTEM

(71) Applicant: University of South Australia, Adelaide (AU)

(72) Inventors: David Victor Lawrie Haley, Adelaide (AU); William George Cowley, Adelaide (AU); John Lawrence Buetefuer, Adelaide (AU); Alexander James Grant, Adelaide (AU); Gottfried Lechner, Adelaide (AU); Andre Pollok, Adelaide (AU); Robert George McKilliam, Adelaide (AU); Ingmar Rudiger Land, Adelaide (AU); Marc Pierre Denis Lavenant, Adelaide (AU); Ying Chen, Adelaide (AU)

(73) Assignee: MYRIOTA PTY LTD, Adelaide (AU)

( * ) Notice: Subject to any disclaimer, the term of this patent is extended or adjusted under 35 U.S.C. 154(b) by 0 days.

(21) Appl. No.: 15/534,424

(22) PCT Filed: Dec. 9, 2015

(86) PCT No.: PCT/AU2015/000743
§ 371 (c)(1),
(2) Date: Jun. 8, 2017

(87) PCT Pub. No.: WO2016/090411
PCT Pub. Date: Jun. 16, 2016

(65) Prior Publication Data
US 2017/0347340 A1    Nov. 30, 2017

(30) Foreign Application Priority Data
Dec. 9, 2014    (AU) ................................ 2014904976

(51) Int. Cl.
*H04L 5/00* (2006.01)
*H04L 25/02* (2006.01)
(Continued)

(52) U.S. Cl.
CPC ......... *H04W 72/042* (2013.01); *H04L 5/0037* (2013.01); *H04L 25/0204* (2013.01);
(Continued)

(58) Field of Classification Search
CPC ..... H04L 5/0007; H04L 5/001; H04L 5/0094; H04L 25/0202; H04L 27/2656;
(Continued)

(56) References Cited

U.S. PATENT DOCUMENTS

| 7,027,415 B1 | 4/2006 | Dahlby et al. | |
| 7,426,199 B2 * | 9/2008 | Sondur | H04L 27/2675 370/332 |

(Continued)

FOREIGN PATENT DOCUMENTS

| CN | 101369882 A | * | 2/2009 |
| CN | 101369882 B | * | 2/2011 |

(Continued)

OTHER PUBLICATIONS

Ming et al, Novel Doppler Frequency Shift Compensation Algorithm for OFDM Underwater Acoustic Communication System, May 27, 2013, IEEE, 2013 25th Chinese Control and Decision Conference (CDCC), DOI: 10.1109/CCDC.2013.6561179 (Year: 2013).*

(Continued)

Primary Examiner — Eric Nowlin
(74) Attorney, Agent, or Firm — McDonnell Boehnen Hulbert & Berghoff LLP

(57) ABSTRACT

Methods and apparatus for communication between terminals and an access node in a multiuser multicarrier commu-
(Continued)

nications network are described. The access node may be a satellite access node. Terminals are configured to perform initial estimation and tracking of channel offsets and to estimate channel offsets for future packets to be transmitted by the terminal. In some embodiments the channel offsets comprise mobility related channel offsets due to the relative movement between the access node and the plurality of terminals. Transmissions from the terminals to the access node are pre-compensated for the channel offsets, so that the aggregate signal received by the access node occupies a bandwidth greater or equal to the maximum signal bandwidth of any individual terminal. Terminal transmissions may overlap in frequency and time on the ground, but arrive orthogonally at the access node.

22 Claims, 30 Drawing Sheets

(51) Int. Cl.
  *H04L 25/03* (2006.01)
  *H04L 27/26* (2006.01)
  *H04W 72/04* (2009.01)
(52) U.S. Cl.
  CPC .... *H04L 25/03343* (2013.01); *H04L 27/2657* (2013.01); *H04L 5/0007* (2013.01); *H04W 72/044* (2013.01)
(58) Field of Classification Search
  CPC .............. H04L 27/2657; H04L 27/2659; H04L 27/266; H04L 27/2675; H04L 2027/0065; H04W 72/042; H04W 72/044
  See application file for complete search history.

(56) References Cited

U.S. PATENT DOCUMENTS

| | | | | |
|---|---|---|---|---|
| 7,480,497 B2* | 1/2009 | Biswas | ............... | H04L 25/0204 370/343 |
| 7,668,252 B2* | 2/2010 | Sandell | ............... | H04L 27/2657 375/267 |
| 7,693,111 B2* | 4/2010 | Sondur | ............... | H04L 27/2675 370/332 |
| 7,844,004 B2* | 11/2010 | De Rore | ............. | H04L 27/2657 375/259 |
| 8,040,790 B2* | 10/2011 | Ratnam | ................. | H04L 5/0007 370/208 |
| 8,238,496 B1 | 8/2012 | Narasimhan et al. | | |
| 8,416,759 B1 | 4/2013 | Narasimhan et al. | | |
| 8,498,346 B2* | 7/2013 | Biswas | ............... | H04L 25/0204 375/260 |
| 8,644,363 B2* | 2/2014 | Li | ....................... | H04L 25/0204 370/252 |
| 8,718,185 B2* | 5/2014 | Giannakis | ........... | H04L 25/0206 375/295 |
| 8,774,309 B2* | 7/2014 | Giannakis | ........... | H04L 25/0206 370/334 |
| 9,160,591 B2* | 10/2015 | Wei | ..................... | H04L 27/2659 |
| 9,197,477 B2* | 11/2015 | Do | .......................... | H04L 5/001 |
| 9,462,504 B2* | 10/2016 | Stephens | ............. | H04W 52/241 |
| 9,559,801 B2* | 1/2017 | Muth | .................. | H04J 14/0221 |
| 2002/0181509 A1* | 12/2002 | Mody | .................... | H04L 1/0618 370/480 |
| 2006/0209979 A1* | 9/2006 | Sandell | ............... | H04L 27/2657 375/267 |
| 2007/0002800 A1* | 1/2007 | Sondur | ............... | H04L 27/2657 370/332 |
| 2007/0004337 A1* | 1/2007 | Biswas | ............... | H04L 25/0204 455/63.1 |
| 2007/0140366 A1* | 6/2007 | Rore | .................... | H04L 27/2657 375/260 |
| 2008/0317149 A1* | 12/2008 | Sondur | ............... | H04L 27/2657 375/260 |
| 2009/0041144 A1* | 2/2009 | Biswas | ............... | H04L 25/0204 375/260 |
| 2010/0080114 A1* | 4/2010 | Ratnam | ................. | H04L 5/0007 370/210 |
| 2010/0202546 A1* | 8/2010 | Ruan | .................... | H04L 25/0212 375/260 |
| 2010/0304687 A1 | 12/2010 | Azadet et al. | | |
| 2011/0110445 A1* | 5/2011 | Sameer | ............... | H04L 27/2659 375/260 |
| 2011/0116487 A1 | 5/2011 | Grandhi | | |
| 2011/0249648 A1* | 10/2011 | Jen | ........................ | H04B 7/0404 370/330 |
| 2011/0317653 A1* | 12/2011 | Kwon | ................... | H04L 1/1861 370/329 |
| 2012/0213123 A1* | 8/2012 | Futaki | ..................... | H04L 5/001 370/254 |
| 2013/0163693 A1* | 6/2013 | Giannakis | ........... | H04L 25/0206 375/295 |
| 2013/0223562 A1* | 8/2013 | Giannakis | ........... | H04L 25/0206 375/295 |
| 2014/0286359 A1* | 9/2014 | Do | .......................... | H04L 5/001 370/516 |
| 2015/0110208 A1* | 4/2015 | Wei | ..................... | H04L 27/2659 375/260 |
| 2015/0139090 A1* | 5/2015 | Stephens | ............. | H04W 52/241 370/329 |
| 2015/0334708 A1* | 11/2015 | Lee | .......................... | H04L 1/00 370/329 |
| 2016/0050098 A1* | 2/2016 | Do | .......................... | H04L 5/001 370/330 |
| 2016/0286012 A1* | 9/2016 | Yu | .......................... | H04L 69/321 |
| 2017/0250740 A1* | 8/2017 | Liang | .................... | H04B 7/0452 |
| 2018/0054269 A1* | 2/2018 | Cui | ....................... | H04J 11/0036 |

FOREIGN PATENT DOCUMENTS

| | | |
|---|---|---|
| EP | 2257005 | 12/2010 |
| WO | 2011/060267 A1 | 5/2011 |

OTHER PUBLICATIONS

PCT International Search Report and Written Opinion, PCT International Application No. PCT/AU2015/000743, dated Mar. 11, 2016, 10 pages.
Ijaz, A. et al., "Improved SNR Estimation for BPSK and QPSK Signals", Electronics Letters, vol. 45, No. 16, Jul. 30, 2009, 2 pages.
Jin, Hui et al., "Irregular Repeat—Accumulate Codes", Proc. Int. Symp. on Turbo Codes & Rel. Topics, 2000, pp. 1-8.
Oerder, Martin et al., "Digtial Filter and Square Timing Recovery", IEEE Transactions on Communications, vol. 36, No. 5, May 1988, pp. 605-612.
Ren, Guangliang et al., "A New SNR's Estimator for QPSK Modulations in an AWGN Channel", IEEE Transactions on Circuits and Systems-II: Express Briefs, vol. 52, No. 6, Jun. 2005, pp. 336-338.
Shin, Dong-Joon et al., "Simple SNR Estimation Methods for QPSK Modulated Short Bursts", Proc. IEEE Global Telecommun. Conf. (GlobeCom), vol. 6, 2001, pp. 3644-3647.
The Extended European Search Report for European Patent Application No. 15868338.3 dated Jul. 19, 2018, pp. 1-11.

* cited by examiner

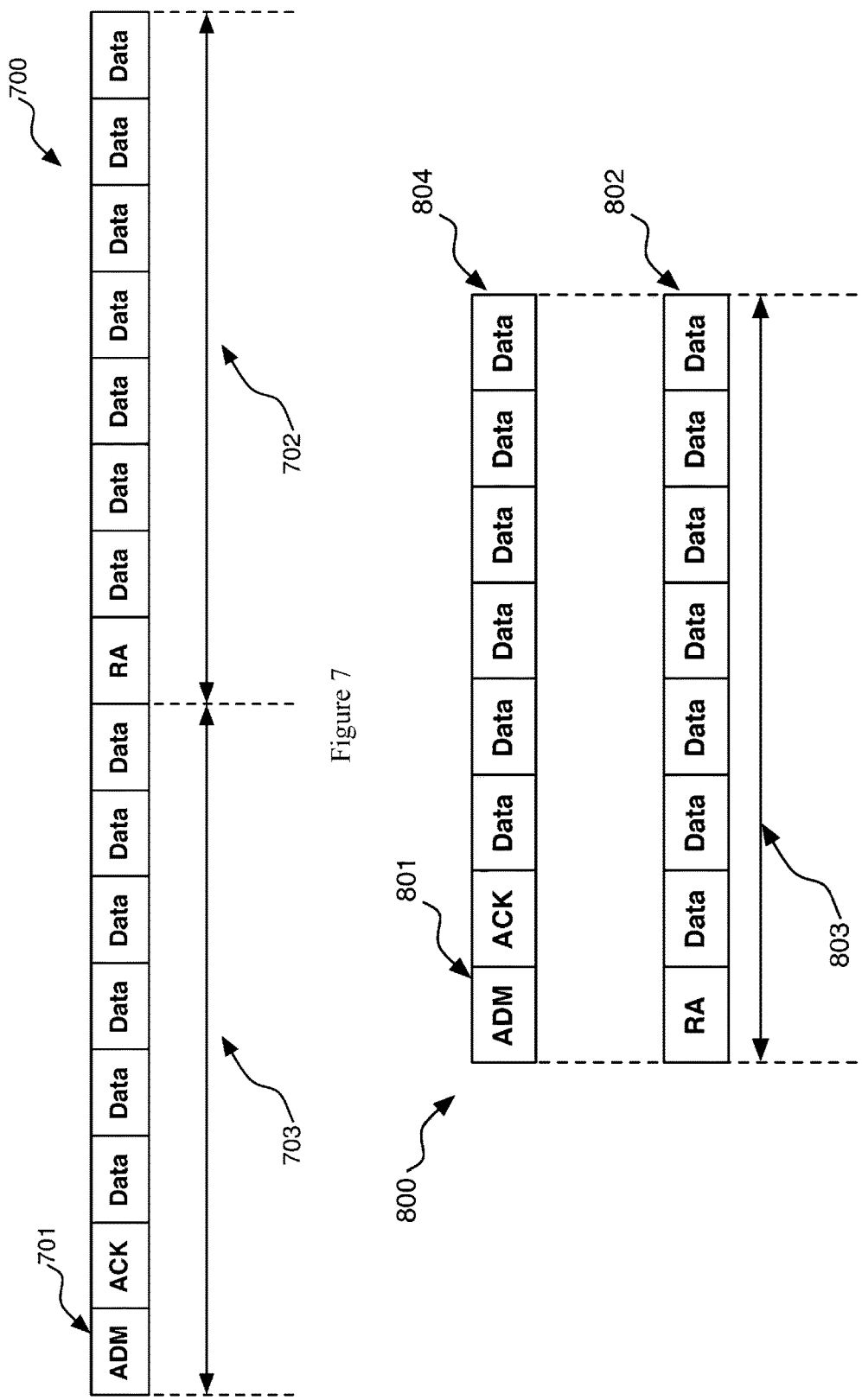

MULTICARRIER COMMUNICATIONS SYSTEM

CROSS-REFERENCE TO RELATED APPLICATIONS

The present application claims priority from International Patent Application Pub. No. WO2016/090411, titled "Multicarrier Communications System" and filed on 9 Dec. 2015, the content of which is hereby incorporated by reference in its entirety. International Patent Application Pub. No. WO2016/090411 claims priority from Australian Provisional Patent Application No. 2014904976 titled "Multicarrier Communications System" and filed on 9 Dec. 2014, the content of which is hereby incorporated by reference in its entirety.

INCORPORATION BY REFERENCE

The following publications are referred to in the present application and their contents are hereby incorporated by reference in their entirety:

H. Jin, A. Khandekar, and R. McEliece, "Irregular repeat-accumulate codes", In Proc. Int. Symp. on Turbo Codes & Rel. Topics, pages 1-8, 2000;

M. Oerder and H. Meyr, "Digital filter and square timing recovery", IEEE Trans. Commun., 36(5):605-612, May 1988;

International Patent Application No. PCT/AU2014/000826 titled "A multiuser communications system" in the name of University Of South Australia;

International Patent Application No. PCT/AU2014/000139 (WO2014127407) titled "Synchronisation using pilots and data" in the name of University Of South Australia;

International Patent Application No. PCT/AU2013/001501 (WO2014094064) titled "Digital communication system" in the name of University Of South Australia;

International Patent Application No. PCT/AU2013/001464 (WO2014089634) titled "Carrier phase and amplitude estimation for phase shift keying using pilots and data" in the name of University Of South Australia;

International Patent Application No. PCT/AU2013/001078 (WO2014043760) titled "Communication system and method" in the name of University Of South Australia; and International Patent Application No. PCT/AU2013/000895 (WO2014026228) titled "Channel allocation in a communication system" in the name of University Of South Australia.

TECHNICAL FIELD

The present invention relates to a multicarrier communications system.

BACKGROUND

The combination of growing demand for wireless communication services, and increasingly scarce radio frequency spectrum, necessitates more efficient and flexible use of spectrum.

An example communication system comprising a satellite based access node (AN) and ground based user terminals (UT) and gateway terminals (GAT). One challenge in such scenarios is how to efficiently share the medium between the access node and terminals. In situations where centralised control is possible, the access node may coordinate access to the channel e.g. using some orthogonal access scheme, such as time division multiple access (TDMA) or frequency division multiple access (FDMA). Other methods include code division multiple access (CDMA), orthogonal frequency division multiple access (OFDMA), and single carrier frequency division multiple access (SC-FDMA). In the case of OFDMA and SC-FDMA the channel is divided across the band into subcarriers, and each user is allocated one or more subcarriers. Such schemes conventionally require very tight time and frequency synchronisation between all the transmitters in order to maintain orthogonality between the users' signals.

In many situations of interest, the communications medium may be dispersive in time or frequency (or both). One example of such a channel is the multipath mobile radio channel, where relative motion of transmitters and receivers can induce Doppler offsets. Reflections of radio signals from the environment also results in the superposition of many copies of the transmitted waveform, each with its own time delay, attenuation and phase offset. Another example of a channel which can introduce significant time and frequency offsets is in the context of communication with a satellite, e.g. in low earth orbit (LEO). In this situation, the time-of-flight to the satellite can vary significantly depending on the relative position of the satellite with respect to the transmitter. Furthermore, the high speed of the satellite (as seen from a fixed point on the ground) induces large Doppler offsets. In such situations, the channel can impose (potentially time-varying) time, frequency and phase offsets to each of the transmitted signals. In some situations the frequency offset may be time-varying, according to some frequency rate (measured in radians/second2 or Hz/second).

The Doppler induced frequency offset between the access node and a terminal is dependent upon geometry and the relative motion between the two entities. Consider a communication system with channel Doppler and time offsets induced through the system dynamics. In this example all terminals are transmitting modulated signals within the same designated frequency allocation at the same time. These may be either single or multiple carrier transmissions. The access node is travelling towards a first terminal T1, thus inducing a positive Doppler shift on the uplink signal and moving it to a higher frequency at the receiver. The access node is travelling away from a second terminal T2, thus inducing a negative Doppler shift on the uplink signal and moving it to a lower frequency at the receiver. The access node is directly above terminal T3 and there is negligible Doppler shift. All signals require time to travel from terminal transmitter to access node receiver, introducing a delay proportional to the link distance. Doppler induced shifts may be significant in relation to available uplink bandwidth and spacing between subcarriers. For example, for the case of a 400 MHz carrier frequency, a terminal directly ahead of a LEO satellite based access node is shifted upwards in frequency by approximately 10 kHz. In conventional systems these effects can reduce performance by introducing inter-carrier interference. The performance degradation increases with induced frequency shift.

The channel induced offsets may not be known a-priori to the transmitters, which means that attempts to transmit using orthogonal access schemes can be defeated by the channel. Although the transmitted signals are orthogonal, they may be non-orthogonal when they arrive at the receiver. This causes multiple-access interference, whereby the signals from different transmitters mutually interfere at the receiver. This is can seriously degrade the performance of the system.

One approach to address this problem is to estimate the relevant time, frequency and phase offsets at the access node based receiver and use a feedback channel to provide these estimates to the corresponding transmitters so that they can pre-compensate for these effects. However, this approach must operate fast enough such that the channel parameters do not change substantially from when they were estimated to when they are used. Moreover, this approach may also increase receive processing complexity at the access node. Increased access node complexity is highly undesirable for some applications, such as those where the access node is located on-board a satellite.

Another approach is to use fixed guard bands and guard intervals to provide sufficient time and frequency separation so that no matter what offsets are introduced by the channel, the signals from different transmitters do not interfere. This approach is simple, but can present a problem if a spectrally efficient system is required. For example, in the case of a LEO satellite system operating at 400 MHz, the maximum induced Doppler shift will be approximately ±10 kHz, thus requiring 20 kHz of guard bandwidth.

In the case of a satellite deployment, a large access node field of view offers the potential to communicate with a wide geographical distribution of terminals. This can lead to a diverse range of channel conditions between the access node and each terminal. In many instances during a satellite pass the use of fixed guard bands will be overly conservative, e.g. when the terminal is directly beneath the satellite and the induced Doppler shift is negligible. Moreover, for systems that aim to compensate for channel affects, the diverse range of channel conditions creates a need for dynamic and accurate channel estimation methods.

There is thus a need to provide methods, systems and components for improving the spectral efficiency of multiuser multicarrier communications networks, or at least to provider a useful alternative to current systems.

SUMMARY

According to a first aspect, there is provided a method for communication between a terminal and an access node in a multiuser multicarrier communications network comprising a plurality of terminals, the method comprising:

establishing a link between a terminal and the access node;

performing initial estimation and tracking of one or more channel offsets;

estimating, one or more channel offsets for future packets to be transmitted by the terminal using the tracked channel offsets; and pre-compensating a transmission to the access node for one or more channel offsets using the estimated one or more channel offsets so that the aggregate signal received by the access node occupies a bandwidth greater or equal to the maximum signal bandwidth of any individual terminal.

In one form, the relative movement between the access node and the plurality of terminals generates one or more mobility related channel offsets, and the one or more channel offsets comprise one or more mobility related channel offsets. In one form, the method further comprises requesting allocation of one or more subcarriers in one or more slots from the access node wherein the allocation takes into account the one or more mobility related channel offsets.

In one form, the one or more mobility related channel offsets comprises a frequency offset. In a further form pre-compensating the transmission comprises pre-compensating for a frequency offset, and pre-compensating for a frequency offset comprises:

determining which of the one or more subcarriers in the one or more slots that the terminal is capable of pre-compensating using a prediction of the uplink frequency offset;

requesting allocation of one or more subcarriers in one or more slots and transmitting on a different set of one or more subcarriers wherein the difference in frequency between the requested subcarrier frequency and actual subcarrier provides a bulk pre-compensation at subcarrier resolution; and applying a fine pre-compensation to the channel frequency to pre-compensate for any remaining fraction of subcarrier spacing for the allocated subcarriers.

In one form, the one or more channel offsets further comprises a time offset, and pre-compensating the transmission further comprises pre-compensating for the time offset by transmitting ahead of a slot timing boundary. In a further form, pre-compensating the transmission compensates for a time offset and a frequency offset so that at the access node a transmitted subcarrier is received sufficiently close to the allocated subcarrier centre frequency and slot boundary such that the access node can successfully receive the transmission after performing residual frequency correction.

In one form, at the time of transmission a pre-compensated transmission from the terminal may overlap in frequency and time with a transmission from another terminal, but wherein the two transmissions arrive orthogonally at the access node due to mobility related channel offsets.

In one form, tracking and estimating is performed by a channel state tracker module that generates channel state predictions for pre-compensating the transmission, and the inputs to the channel state tracker comprise a downlink frequency and a timing estimate, and the channel state tracker estimates a frequency offset and a timing offset for future transmissions. In a further form, the inputs to the channel state tracker additionally comprise parameters describing the relative motion between the access node and the terminal. In a further form, the inputs to the channel state tracker additionally comprise one or more of a frequency rate, a complex channel gain, or a signal-to-noise ratio (SNR).

In one form, the method further comprises determining a targetable set of one or more subcarriers in one or more slots that the terminal can pre-compensate for the estimated one or more channel offsets, and pre-compensation of transmission is performed in one or more subcarriers such that the transmission arrives at the access node in one of the targetable set of one or more subcarriers in one or more slots.

In one form, the method further comprises determining a targetable set of one or more subcarriers in one or more slots that the terminal can pre-compensate for channel offsets based upon the estimated one or more channel offsets, and requesting allocation of one or more subcarriers in one or more slots from the access node wherein the targetable set for the terminal is included in the allocation request transmitted to the access node by the terminal, and the allocation is performed by the access node such that in use, the access node is configured to allocate uplink resources by optimising one or more objective functions as a function of system parameters wherein the optimisation is configured to discourage allocation of one or more subcarriers in one or more slots to a terminal not in the targetable set for the terminal.

According to a second aspect, there is provided a method for communication between an access node and one or more terminals in a multiuser multicarrier communications network comprising a plurality of terminals, the method comprising:

establishing one or more links between the access node and one or more terminals;

receiving an allocation request for one or more subcarriers in one or more slots from one or more terminals;

allocating uplink resources to the one or more terminals, wherein the allocation takes into account one or more channel offsets and the one or more subcarriers are allocated from a bandwidth greater than or equal to a maximum signal bandwidth of any individual terminal so that in use, the aggregate signal received by the access node occupies a bandwidth greater or equal to the maximum signal bandwidth of any individual terminal.

In one form, the one or more subcarriers are allocated from a bandwidth equal to the maximum signal bandwidth of any individual terminal increased by an amount based on twice a predetermined maximum Doppler offset between the access node and the plurality of terminals and the subcarrier spacing.

In one form, the allocation request from a terminal comprises a targetable set of subcarriers for the terminal and allocating uplink resources takes into account one or more channel offsets using the targetable set. In a further form, relative movement between the access node and the plurality of terminals generates one or more mobility related channel offsets, and the one or more channel offsets comprise one or more mobility related channel offsets, and allocating uplink resources takes into account one or more mobility related channel offsets using the targetable set.

In one form, allocating uplink resources to the one or more terminals takes into account one or more channel offsets using the targetable set by optimising one or more objective functions as a function of system parameters, wherein the optimisation is configured to discourage allocation of one or more subcarriers in one or more slots to a terminal not in the targetable set for the terminal.

In a further form, the optimisation is configured to discourage allocation to a terminal not in the targetable set for the terminal by including one or more additional constraints which discourage the optimisation from allocating one or more subcarriers in one or more slots to a terminal not in the targetable set for the terminal. In a further form, the constraint prohibits the allocation of one or more subcarriers in one or more slots to a terminal not in the targetable set for the terminal. In a further form, the one or more additional constraints comprise a proportional fairness constraint. In a further form, the one or more additional constraints is a linear function of the system parameters and optimisation variables.

In one form, the optimisation is configured to discourage allocation to a terminal not in the targetable set for the terminal by including a penalty function to the objective function which discourages the optimisation from allocating one or more subcarriers in one or more slots to a terminal not in the targetable set for the terminal. In a further form the penalty function is a linear function of the system parameters and optimisation variables.

In one form, the objective function comprises a total data rate. In one form, the system parameters comprise at least a signal to noise ratio for each terminal on each subcarrier. In one form, the access node performs independent subcarrier channel estimation.

According to a third aspect, there is provided a terminal apparatus for use in a multiuser multicarrier communications network comprising an access node and a plurality of terminals, the terminal comprising:

a transmitter;

a receiver;

a channel state tracker configured to perform initial estimation and tracking of one or more channel offsets, and for estimating one or more channel offsets for future packets to be transmitted by the terminal using the tracked channel offsets;

a Medium Access Controller configured to establish a link between the terminal and the access node, and to request allocation of one or more subcarriers in one or more slots taking into account the one or more channel offsets, and to pre-compensate a transmission from the terminal to the access node for one or more channel offsets using the estimated one or more channel offsets wherein the received signal at the access node occupies a bandwidth greater or equal to a maximum signal bandwidth of the terminal.

In one form, relative movement between the access node and the plurality of terminals generates one or more mobility related channel offsets and the one or more channel offsets comprise one or more mobility related channel offsets. In one form, the link is established as a MAC level session. In one form, the channel state tracker is a component of a Physical Layer (PHY), and the MAC is configured to trigger the channel state tracker to generate estimates of channel offsets and instruct the PHY on the one or more subcarriers to be used for transmission.

According to a fourth aspect, there is provided an access node for use in a multiuser multicarrier communications network comprising an access node and a plurality of terminals, the access node comprising:

a transmitter;

a receiver;

a Medium Access Controller configured to establish one or more links between a terminal and the access node, and to receive allocation requests of one or more subcarriers in one or more slots received from one or more terminals, and to allocate one or more subcarriers in one or more slots to the one or more terminals, wherein the allocation takes into account one or more channel offsets and the one or more subcarriers are allocated from a bandwidth greater than or equal to a maximum signal bandwidth of any individual terminal so that in use the aggregate signal received by the access node occupies a bandwidth greater or equal to the maximum signal bandwidth of any individual terminal.

In one form, the an allocation request comprises a targetable set of one or more subcarriers in one or more slots from a terminal, and the access node is configured to allocate uplink resources comprising at least one or more subcarriers in one or more slots to one or more terminals by optimising one or more objective functions as a function of system parameters wherein the optimisation is configured to discourage allocation of one or more subcarriers in one or more slots to a terminal not in the targetable set for the terminal. In one form, relative movement between the access node and the plurality of terminals generates one or more mobility related channel offsets and the one or more channel offsets comprises one or more mobility related channel offsets. In one form, the access node performs independent subcarrier channel estimation.

According to a fifth aspect, there is provided a multiuser multicarrier communications system network comprising:

a plurality of terminals according to the third aspect; and an access node according to the fourth aspect.

According to a sixth aspect, there is provided a computer readable medium comprising instructions for causing a processor to perform the method of the first or second aspect.

BRIEF DESCRIPTION OF DRAWINGS

Embodiments of the present invention will be discussed with reference to the accompanying drawings wherein:

FIG. 7 depicts example of time division duplex frame structure according to an embodiment;

FIG. 8 depicts example frequency division duplex frame structure according to an embodiment;

DESCRIPTION OF EMBODIMENTS

Section 1: Overview

Methods, systems and components of a multiuser multicarrier communications network will now be described. We consider a communications system that includes an access node AN 110, which communicates with remote user nodes (via a remote radio interface) and gateway nodes (via a gateway radio interface). User and gateway nodes are implemented in terminal equipment. For convenience user nodes and gateway nodes will be collectively referred to as user terminals 120. Moreover, terminals may implement more than one type of node capability.

Figure 1:
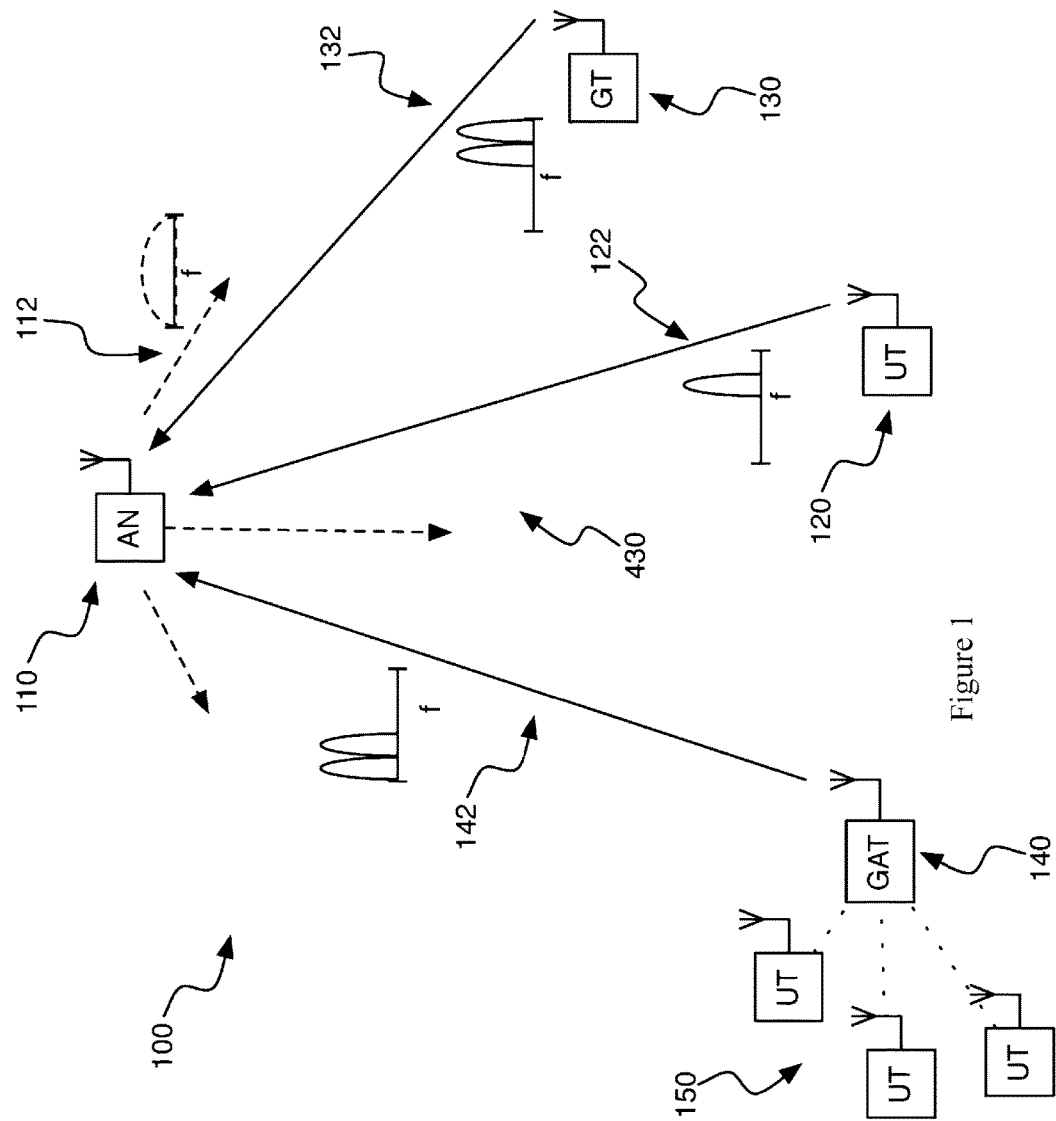
FIG. 1 shows an example system architecture and introduces multiple access aspects of an embodiment.

FIG. 1 shows an example system architecture 100 and introduces multiple access aspects of one embodiment. A typical application may include a satellite based access node 110 and ground based terminals, some of which may be user terminals 120, and some of which may be gateway terminals 130. The gateway/access terminal 140 in FIG. 1 also includes a local group of user terminals 150 that (in the absence of the satellite) are coordinated by a multi-mode gateway/access terminal 140 functioning as an access node. In the presence of the satellite 110, the gateway/access terminal 140 may function as a gateway node. The access node 110 communicates over a downlink 112 comprising a single carrier broadcast from the access node to all terminals for timing status, acknowledgements and data transfer. The user terminals communicate over uplinks comprising flexible time and frequency slotted uplinks access 122 112, 132, 142 for requests and traffic, pre-compensated for channel offsets as described herein. The channel offsets may include one or more mobility related channel offsets due to relative movement between the access node and the plurality of terminals. The embodiments described in this document are suitable for either remote or gateway interfaces. The embodiments allow a single interface to be shared between remote and gateway terminals. This flexibility allows channel resources to be allocated as required, thus increasing overall spectral efficiency.

One challenge in such scenarios is how to efficiently share the medium between the access node 110 and user terminals

120 (including gateway terminals). In situations where centralised control is possible, the access node may coordinate access to the channel e.g. using some orthogonal access scheme, such as time division multiple access (TDMA) or frequency division multiple access (FDMA). Other methods include code division multiple access (CDMA), orthogonal frequency division multiple access (OFDMA), and single carrier frequency division multiple access (SC-FDMA). In the case of OFDMA and SC-FDMA the channel is divided across the band into subcarriers, and each user is allocated one or more subcarriers. Such schemes conventionally require very tight time and frequency synchronisation between all the transmitters in order to maintain orthogonality between the users' signals.

In many situations of interest, the communications medium, also known as the channel 430, may be dispersive in time or frequency (or both). One example of such a channel is the multipath mobile radio channel, where relative motion of transmitters and receivers can induce Doppler offsets. Reflections of radio signals from the environment also results in the superposition of many copies of the transmitted waveform, each with its own time delay, attenuation and phase offset. Another example of a channel which can introduce significant time and frequency offsets is in the context of communication with a satellite, e.g. in low earth orbit (LEO). In this situation, the time-of-flight to the satellite can vary significantly depending on the relative position of the satellite with respect to the transmitter. Furthermore, the high speed of the satellite (as seen from a fixed point on the ground) induces large Doppler offsets.

In such situations, the channel can impose (potentially time-varying) time, frequency and phase offsets to each of the transmitted signals. In some situations the frequency offset may be time-varying, according to some frequency rate (measured in radians/second$^2$ or Hz/second). The Doppler induced frequency offset between the access node and a terminal is dependent upon geometry and the relative motion between the two entities. Doppler induced shifts may be significant in relation to available uplink bandwidth and spacing between subcarriers. For example, for the case of a 400 MHz carrier frequency, a terminal directly ahead of a LEO satellite based access node is shifted upwards in frequency by approximately 10 kHz. In conventional systems these effects can reduce performance by introducing inter-carrier interference. The performance degradation increases with induced frequency shift.

In some embodiments of the present invention, the medium is shared using OFDMA techniques. It is possible to use SC-FDMA techniques. Our system efficiently generates accurate channel state estimates, tracks them over time, and uses channel state predictions to compensate for channel effects. A system according to the present invention is able to maintain orthogonality between users' signals in cases where Doppler induced by the channel is significant, and larger than the subcarrier spacing.

Figure 2:
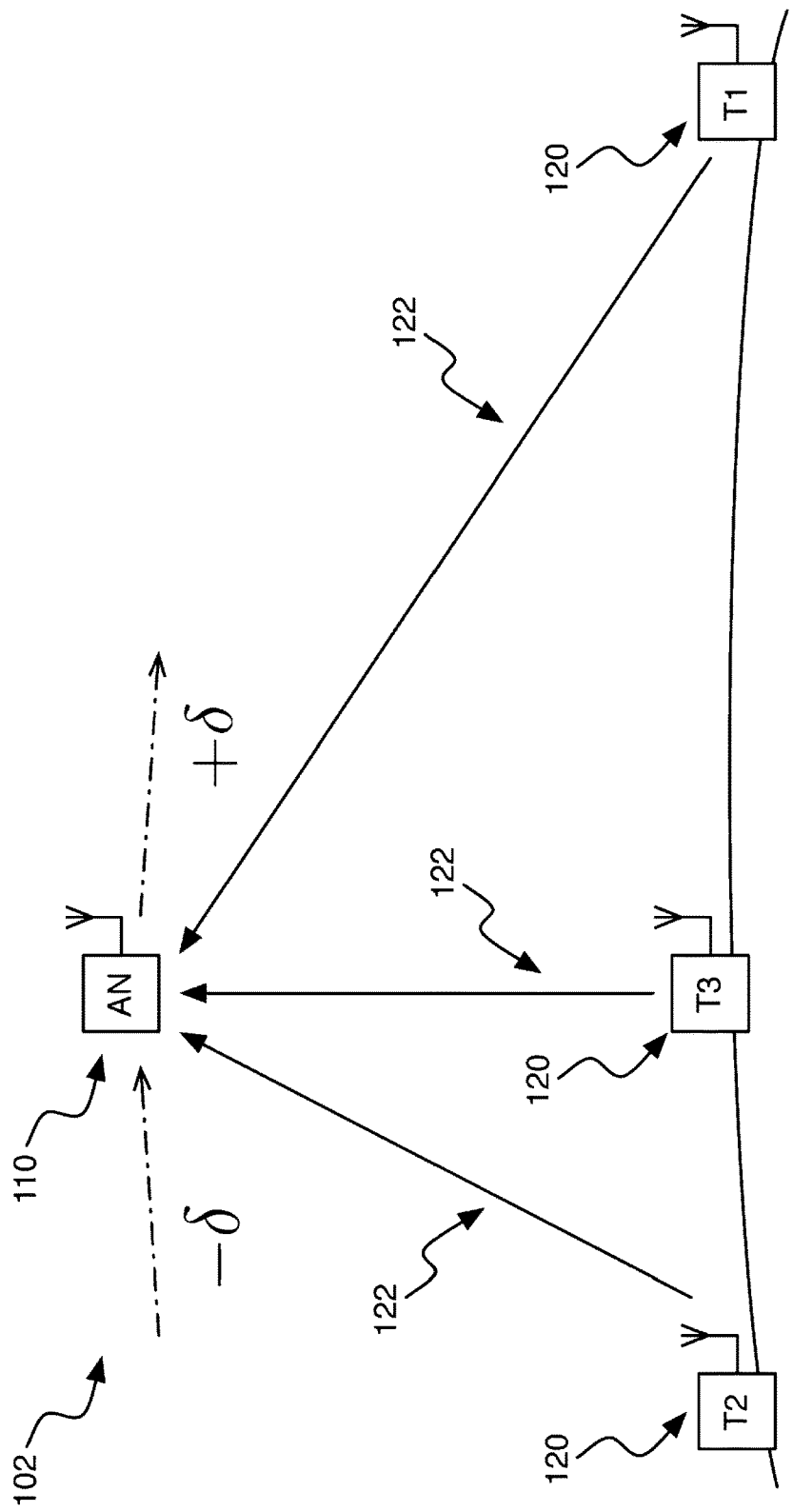
FIG. 2 shows an example system with channel Doppler and time offsets induced through the system dynamics.

FIG. 2 shows an example system 102 with channel Doppler and time offsets induced through the system dynamics, which will also be referred to as mobility related channel offsets. In this example, all terminals T1, T2, T3 are transmitting modulated signals 122 within the same designated frequency allocation at the same time. These may be either single or multiple carrier transmissions. The access node AN is travelling towards terminal T1, inducing a positive Doppler shift on the uplink signal and moving it to a higher frequency at the receiver. The access node is travelling away from terminal T2, inducing a negative Doppler shift on the uplink signal and moving it to a lower frequency at the receiver. The access node is directly above terminal T3 and there is negligible Doppler shift. All signals require time to travel from terminal transmitter to access node receiver, introducing a delay proportional to the link distance.

The channel induced offsets may not be known a-priori to the transmitters, which means that attempts to transmit using orthogonal access schemes can be defeated by the channel. Although the transmitted signals are orthogonal, they may be non-orthogonal when they arrive at the receiver. This causes multiple-access interference, whereby the signals from different transmitters mutually interfere at the receiver. This is can seriously degrade the performance of the system.

One approach to address this problem is to estimate the relevant time, frequency and phase offsets at the access node based receiver and use a feedback channel to provide these estimates to the corresponding transmitters so that they can pre-compensate for these effects. However, this approach must operate fast enough such that the channel parameters do not change substantially from when they were estimated to when they are used. Moreover, this approach may also increase receive processing complexity at the access node. Increased access node complexity is highly undesirable for some applications, such as those where the access node is located on-board a satellite.

Another approach is to use fixed guard bands and guard intervals to provide sufficient time and frequency separation so that no matter what offsets are introduced by the channel, the signals from different transmitters do not interfere. This approach is simple, but can present a problem if a spectrally efficient system is required. For example, in the case of a LEO satellite system operating at 400 MHz, the maximum induced Doppler shift will be approximately ±10 kHz, thus requiring 20 kHz of guard bandwidth.

In the case of a satellite deployment, a large access node field of view offers the potential to communicate with a wide geographical distribution of terminals. This can lead to a diverse range of channel conditions between the access node and each terminal. In many instances during a satellite pass the use of fixed guard bands will be overly conservative, e.g. when the terminal is directly beneath the satellite and the induced Doppler shift is negligible. Moreover, for systems that aim to compensate for channel affects, the diverse range of channel conditions creates a need for dynamic and accurate channel estimation methods.

According to an aspect of the present invention, there is provided new methods for bi-directional communication between an access node (e.g. mounted on a satellite) and user terminals and/or gateway terminals. Doppler offsets are exploited to achieve greater uplink spectral efficiency while simultaneously minimising processing requirements at both the access node and terminals by carefully allocating channel resources to terminals. Terminal transmissions may overlap in frequency and time on the ground, but arrive orthogonally at the access node. The system includes scalable waveforms that provide flexibility in message size and delivery.

Figure 3A:
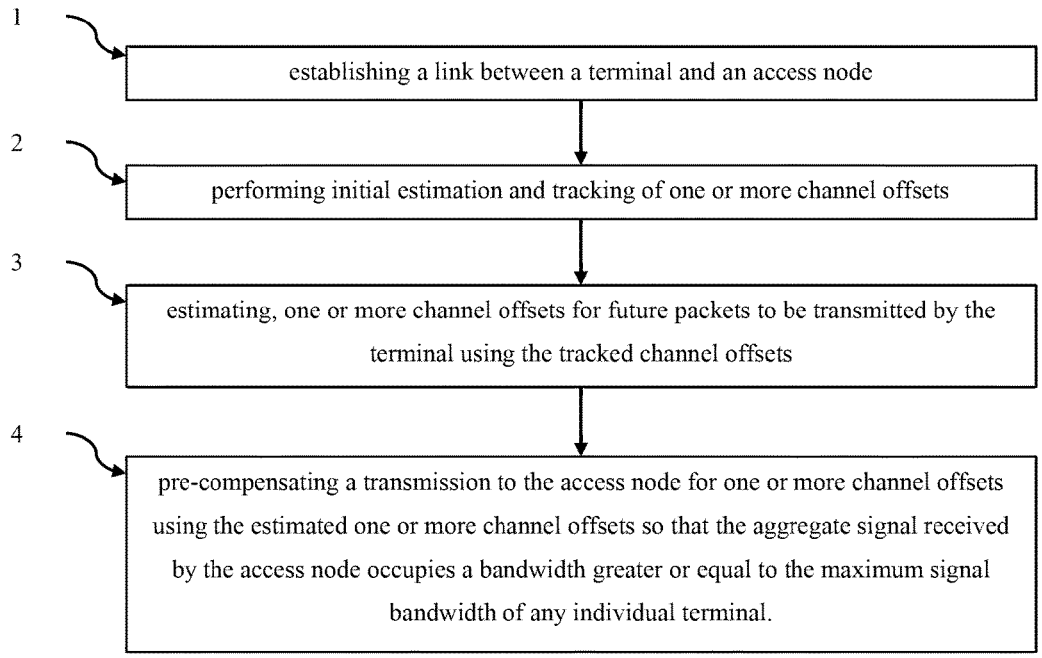
FIG. 3A is a flowchart of a method according to an embodiment.

FIG. 3A is a flowchart of a method for communication between a terminal and an access node in a multiuser multicarrier communications network comprising a plurality of terminals according to an embodiment. The method may be used to improve the spectral efficiency of such a communication system The method broadly comprises establishing a link between a terminal and the access node (1). Initial estimation of channel offsets (or parameters or state) is then performed and these are tracked (2). In the context of this specification channel offsets will refer to offsets and parameters relating directly to the channel, as well as offsets due to system components such as (but not limited to) system frequency offsets or parameters including a time offset due to unsynchronised local clocks, frequency offsets due to drift of the local oscillators or access node transmit and receive chain electronics complex channel gain, Signal-To-Noise ratio (SNR), etc. These channel offsets may also include mobility related channel offsets due to the relative movement between the access node and the plurality of terminals. These mobility related channel offsets may include Doppler induced frequency offsets, and potentially a frequency rate of change, as well as a timing offset due to the unknown receiver-transmitter distance (ie a time of flight offset) and potentially time variation of the timing offset (for example due to relative motion). These offsets may collectively be referred to as mobility related offsets, as they are either directly induced by relative motion or are related to the fact that relative motion results in variation in distance of receiver and terminal (ie they are not a known or fixed distance). The receiver may also provide estimates for channel offsets to terminals. These channel offsets, and in particular the mobility related channel offsets mean that a transmission made in a first subcarrier will, in some cases, not arrive in the same subcarrier at the access node. Thus when a transmitter wishes to transmit data an estimation step (3) is performed to estimate one or more channel offsets for future packets to be transmitted by a terminal using the tracked channel offsets. Typically this estimation will be performed by the transmitter, for example in one embodiment a channel state tracker described below could be used. However in other embodiments another entity could perform the estimation of channel offsets, for example a distributed processing approach. For example a transmitter could have limited processing power, and thus could be configured to receive transmissions and provide relevant information to another entity over another communications link to perform one or both of tracking and estimation of channel offsets.

With knowledge of the likely channel offsets, and including (but not necessarily always) any mobility related effects such as Doppler effects, the terminal pre-compensates a transmission from the terminal to the access node for one or more channel offsets using the estimated one or more channel offsets (4). In one embodiment this is performed by the transmitter. However in another embodiment the determination of how to pre-compensate a transmission could be performed by another entity which provides the pre-compensation information to the terminal.

Notably the pre-compensation is performed so that the aggregate signal received by the access node occupies a bandwidth greater or equal to the maximum signal bandwidth of any individual terminal. The transmissions arriving at the access node from multiple transmitters are all subject to different channel offsets and mobility related offsets. Typically transmitters are licenced to use a certain bandwidth and are not allowed to transmit out of band. Doppler effects will cause frequency and time offsets to transmissions, and so a transmission originally in a subcarrier at the transmitter may not arrive in the same subcarrier at the access node, and could in fact be outside of the band permitted at the terminal transmitter. That is the subcarriers at the access node may be shifted with respect to the transmitted subcarriers or the bandwidth may shift of vary. However as this is at the access node, this effect can be exploited. Effectively the receiver can utilise additional subcarriers compared to terminals where the bandwidth as seen by the access node is effectively increased by an amount equal to twice the maximum Doppler offset (the factor of two relates to the directionality of Doppler effects). As the access node is receiving signals from multiple transmitters, the aggregate signal received by the access node will occupy a bandwidth greater or equal to the maximum signal bandwidth of any individual terminal.

Figure 3B:
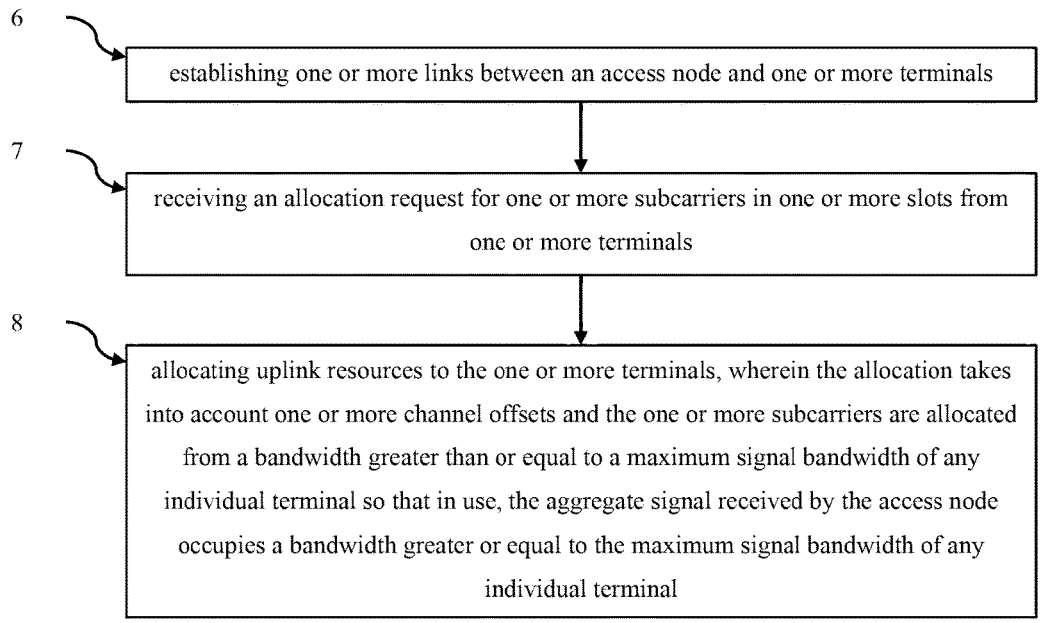
FIG. 3B is a flowchart of a method according to an embodiment.

FIG. 3B is a flowchart of a method for communication between an access node and one or more terminals in a multiuser multicarrier communications network comprising a plurality of terminals according to an embodiment. The method broadly comprises establishing one or more links between the access node and one or more terminals (6) and receiving an allocation request for one or more subcarriers in one or more slots from one or more terminals (7). The access node allocates uplink resources to the one or more terminals. The allocation takes into account one or more channel offsets, and the one or more subcarriers are allocated from a bandwidth greater than or equal to a maximum signal bandwidth of any individual terminal so that in use, the aggregate signal received by the access node occupies a bandwidth greater or equal to the maximum signal bandwidth of any individual terminal. In one embodiment, the terminals make an allocation request comprising a targetable set of subcarriers for the terminal (eg those the terminal can pre-compensate for) and the access node allocates uplink resources taking into account one or more channel offsets by using the targetable set. This effectively distributes the processing load down onto the terminals, as each terminal can estimate their channel offsets and how much pre-compensation can be performed.

Pre-compensation is used to remove the harsh effects of Doppler on the uplink to ensure that at the access point the transmissions arrive orthogonally (they may overlap in frequency and time on the ground). This reduces interference and simplifies the receiver architecture as to the receiver the system resembles a channel having low mobility. Thus existing known resource allocation techniques, such as those developed for orthogonal frequency division multiple access can be applied at the access node to optimise the allocation of subcarriers and to balance fairness in channel access for the terminals. This is discussed further below. In one embodiment, the terminals may provide information on channel offsets to the access node, and the access node may take these into account when determining which subcarriers to allocate. In one embodiment where random access is allowed, no allocation request is made by the terminal, however the terminal still determines which of the random access subcarriers that the terminal can target, and pre-compensates the transmission so that the transmission will arrive at a desired random access subcarrier.

As mentioned transmitters are typically licenced to use a certain frequency band, and thus are prohibited from transmitting outside of the band. Accordingly a transmitter will be configured to have some maximum signal bandwidth which can be utilised for transmissions. This may be a fixed set of contiguous subcarriers spanning the entire bandwidth, or they may use a sub set of all possible sub-carriers over the maximum bandwidth. In some embodiments the terminal can be reconfigured to use different sets of sub-carriers in the bandwidth. In this context the maximum signal bandwidth of any individual terminal will be the maximum bandwidth in use at a point in time. Embodiments of the system could be implemented even in the case that licensing restrictions were imposed such that the transmissions arriving at the receiver had to be within a certain bandwidth. A conventional system may handle this by limiting the maximum transmit bandwidth at the terminal (by an amount equal to twice the maximum Doppler offset) so that the Doppler expanded bandwidth at the access node was within the licensing limit. Our system provides dynamic allocation of the channel by considering the current state of channel offsets, and allows transmit bandwidth to be allocated to maximise the use of spectrum while meeting licensing restrictions.

Various embodiments of a system for implementing the method are discussed in detail below. In one embodiment the system uses an access node coordinated orthogonal frequency division multiple access (OFDMA) transmission scheme, with channel pre-compensation performed at the terminal transmitter using outputs from the channel state tracker in a terminal. However other transmission schemes and configurations, including distributed processing configurations could be used.

Section 2: An Exemplary System

Figure 4:
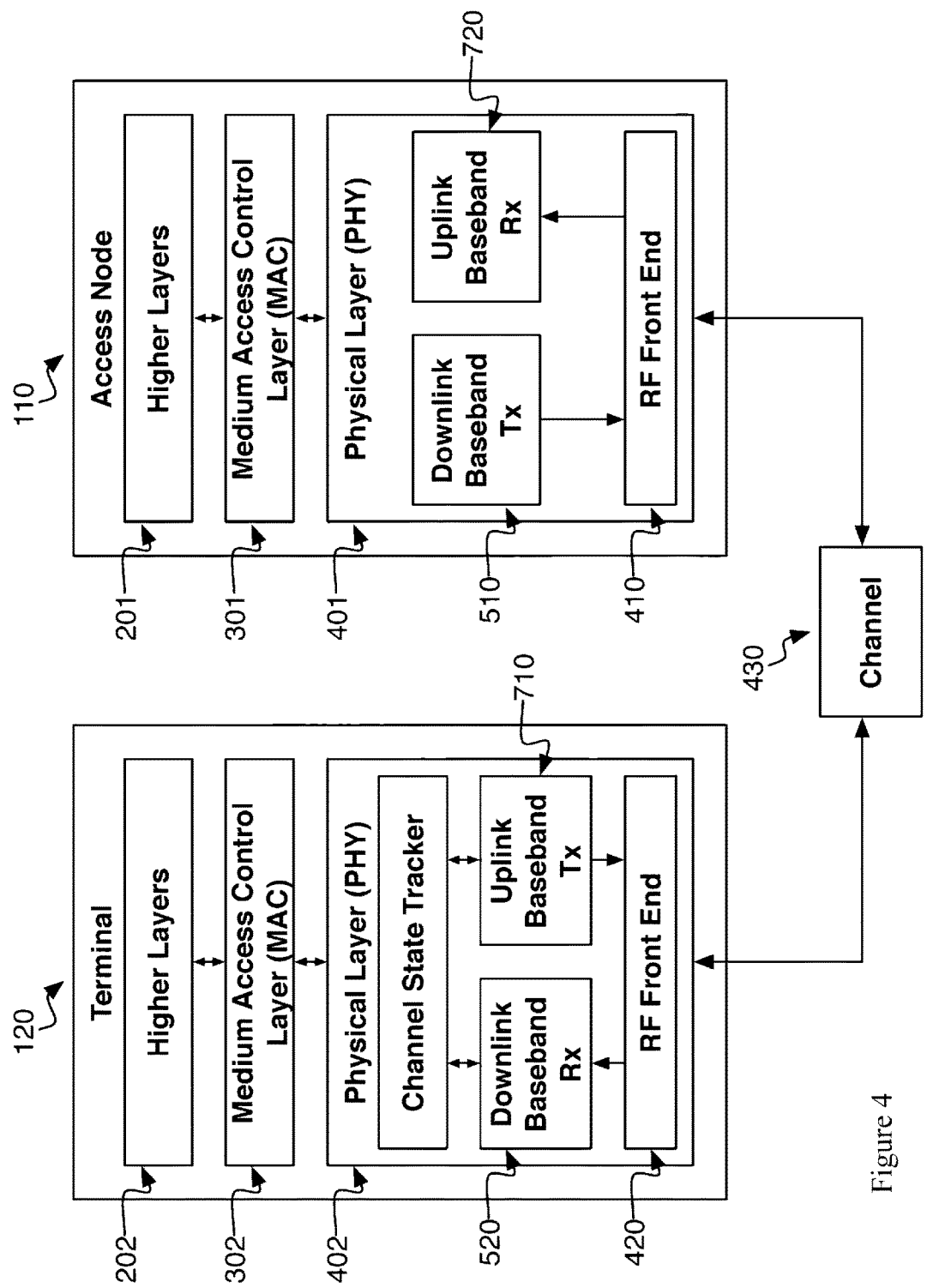
FIG. 4 shows a block diagram of the access node and a single terminal that appear in FIG. 1 according to an embodiment.

FIG. 4 shows a block diagram of the access node 110 and a single user terminal 120 that appear in FIG. 1 according to an embodiment. The access node 110 is responsible for coordination of communications. In this embodiment communication is time slotted and system timing is based on a frame having length of an integral number of slot periods. In an embodiment, all communication in the system is packet based. A system wide timing reference is provided at both the access node and terminals, e.g. via the global positioning system (GPS) or similar (not shown in FIG. 4). In an embodiment, transmitters output fixed duration packets within one slot period.

The uplink uses OFDMA or SC-FDMA access methods, allowing concurrent access by multiple terminals. The access node 110 and terminal 120 shown in FIG. 4 each comprise a physical layer (PHY) 401 402, medium access control (MAC) layer 301 302 and higher layers 201 202. The invention described in this document comprises embodiments at the PHY and MAC layer. Higher layers 201 202 may include a message networking layer and application layer. The MAC layer 300 is described in Section 3. The physical layer 400 is introduced in Section 4, and then described further in the sections that follow.

The terminal baseband receiver processes signals received from the access node and outputs decoded data, along with estimates for downlink channel effects, such as time offset, frequency offset (and its rate of change), complex channel gain, and signal-to-noise ratio (SNR). These estimates are optionally time stamped and passed to the channel state tracker which tracks them over time and uses these parameter estimates along with any other known or estimated information about the access node (e.g. its motion relative to the terminal, or orbital parameters in the case of an access node in low earth orbit), to predict uplink channel effects. The channel state tracker passes these predictions to the MAC layer where they are used to determine which subcarriers at the access node receiver can be targeted by the terminal, by considering terminal transmission bandwidth constraints and any frequency shift induced by the channel. The predictions are also passed to the baseband transmitter where they are used to pre-compensate for uplink channel effects. The terminal transmits a request for channel access to the access node, indicating which subcarriers it can target. The access node decodes the data received from the terminal, then allocates uplink subcarriers to the terminal for use in future time slots and notifies the terminal of its allocation via a downlink message.

Our system can operate in channels that induce large Doppler offsets, e.g. larger than the subcarrier spacing, such as the LEO channel described above. Our system exploits Doppler shifts that are larger than the subcarrier spacing to provide a frequency shift of an integer number of subcarrier spacings, and applies frequency pre-compensation to adjust for any remaining offset that is a fraction of the subcarrier spacing. This ensures that terminal transmissions arrive aligned to subcarriers at the access node receiver. This technique allows the bandwidth observed at the access node receiver to exceed that transmitted by the terminal and provides a Doppler-induced bandwidth expansion and highly efficient use of radio spectrum.

Precompensated signals arriving at the access node receiver have only phase offset and minor residual frequency offset, even in the presence of channels that induce significant time and frequency offsets. This significantly reduces the problem of allocating subcarriers for multiple access. For example, removing these uplink channel effects in the case of a LEO satellite system reduces the problem of access node reception to one that resembles a channel having low mobility. Thus, existing known resource allocation techniques, such as those developed for orthogonal frequency division multiple access, can be applied at the access node to optimise the allocation of subcarriers and to balance fairness in channel access for the terminals. Such techniques typically construct an optimisation problem with one or more objectives, e.g. maximum data rate and/or minimum power consumption, where the variables to be optimised typically represent the terminal subcarrier allocations, and the allocation of signal power to each subcarrier, while meeting individual terminal bandwidth and total power constraints. Such algorithms cannot be directly applied to our specific subcarrier allocation problem, as they do not accommodate systems in which different terminals have different capabilities in terms of the particular subset of subcarriers that they can access.

In some embodiments of our system, terminals inform the access node of the subcarriers that they can target, which may be a subset of the total subcarriers at the access node. We have found a way to modify existing resource allocation techniques to account for the unavailability of subcarriers that cannot be targeted by a terminal by penalising (in an optimisation sense) inaccessible subcarriers. For example, in the case where the optimisation problem includes a constraint upon subcarrier SNR, then the noise power of inaccessible subcarriers may be set to infinity, or some other large number, such that the optimisation algorithm will never allocate such subcarriers to that terminal. Alternatively, a new constraint or penalty function may be introduced into the optimisation problem in order to achieve the same outcome. For example, we can add a constraint function $$\sum_{t=1}^{T} \sum_{s=1}^{S} c_{ts} p_{ts} = 0,$$

where T is the total number of terminals, S is the total number of subcarriers, $c_{ts}$ represents the terminal capabilities, and is equal to 0 if terminal t can transmit on subcarrier s, and is equal to some positive number, e.g. 1 if it cannot transmit on that subcarrier. $p_{ts}$ is the allocation of subcarrier s to terminal t, for example it could represent the allocation of transmit power on that subcarrier, or it could be a binary variable which is equal to 0 if subcarrier s is not allocated to terminal t, and is equal to 1 if subcarrier s is allocated to terminal t. Similarly we could introduce a penalty function of the same form, $$K\sum_{t=1}^{T}\sum_{s=1}^{S}c_{ts}p_{ts},$$

adding this to the objective function. The parameter K is a constant with large absolute value, and is positive in the case that the original optimisation problem is a minimisation, or negative in the case that the original problem was a maximisation. These choices of constraints or penalty functions are illustrative, and someone skilled in the art would be able to select alternative constraints or penalty functions that have a similar effect, of disallowing or discouraging the optimisation algorithm from allocating inaccessible subcarriers to a terminal. If it is desired to limit the allocation of subcarriers such that each subcarrier is only allocated to at most M terminals, where M=1 for only one terminal per subcarrier, and M=2 to allow two terminals per subcarrier and so on, then we can add S constraints (one for each s=1, 2, . . . S) as follows:

$$\sum_{t=1}^{T}I[p_{ts}]\leq M,$$

where I[ ] is an indicator function such that I[x]=0 if x=0 and I[x]=1 if x≠0. Construction of the optimization problem and parameters will typically depend upon the configuration of the system. For example in a OFDMA system a constraint on the number of subcarriers may be used, whereas in a SC-FDMA system the "subcarriers" are now the frequency bands allocated to each SC-FDMA terminal which might be wider than the original OFDMA subcarriers, in which case a constraint such that each terminal is only allocated one of these wider subcarriers can be implemented.

The methods described in this document are suitable for the delivery of a 2-way service, such as service type 2 (ST2) described in WO2014043760. The methods may also be used to deliver a 1-way service, such as service type 1 (ST1) described in WO2014043760.

In one embodiment, one or more (user and/or gateway) terminals determine communication link parameters as follows:

1. The access node transmits at least one downlink packet at the start of every frame period. Terminals use this packet for synchronisation. In one embodiment the packet contains administration data (ADM) via which the access node provides instructions to terminals, e.g. channel management data.

2. The terminal receiver acquires the access node packets in order to establish a link. The terminal determines the following (potentially dynamic) parameters:

Downlink packet timing offset (start of packet reception compared with timing reference).

Downlink frequency offset and (optionally) its rate of change.

3. After one or more packets have been received and the terminal has obtained synchronisation with the downlink, the terminal tracks the timing and frequency offset of subsequent packets.

The terminal can estimate channel offsets for future packets using previous measurements of timing and frequency offset, and (optionally) access node trajectory data and the known position of the terminal. This reduces the processing required to demodulate future packets. Downlink frequency, frequency rate, and timing estimates are input to a channel state tracker. The estimates are time-stamped according to the time of packet reception. The values are used to predict future channel state estimates, and are provided to the uplink physical layer to pre-compensate for frequency and timing offset in transmissions from the terminal to the access node.

For uplink channel compensation, the uplink is designed to make maximal use of bandwidth at the access node receiver, exploiting Doppler offset to gain additional spectral efficiency. Terminal transmissions are coordinated to occur on one or more subcarriers. The terminal pre-compensates for both propagation delay and frequency offset, so that at the access node receiver, the transmitted subcarriers fall sufficiently close to their correct centre frequencies (with respect to the receiver).

For interference mitigation, one embodiment of the present invention includes a coordinated system and uplink transmission scheme that avoids inter-symbol and inter-carrier interference and requires only minor residual frequency offset correction to be performed at the access node. This is achieved using waveform and receiver algorithm designs that enable low complexity implementation. We employ independent subcarrier channel estimation which performs phase recovery. Residual frequency offset correction may be performed using per-subcarrier phase tracking.

The remainder of this section provides an introduction to the time and frequency offset effects induced by the channel, and how our system manages and exploits these effects. Section 3 describes techniques for media access control, including uplink establishment and allocation of channel resources. Section 4 provides an overview of key components of physical layer processing. An embodiment of the downlink PHY is described in Section 5. The channel state tracker uses channel estimates from the downlink receiver to generate channel state predictions for uplink pre-compensation. An embodiment of the channel state tracker is described in Section 6. An embodiment of the uplink PHY is described in Section 7 and an alternative embodiment is described in Section 8. Techniques for optimising system performance are presented in Section 9. Results from an example implementation are provided in Section 10.

Figure 5:
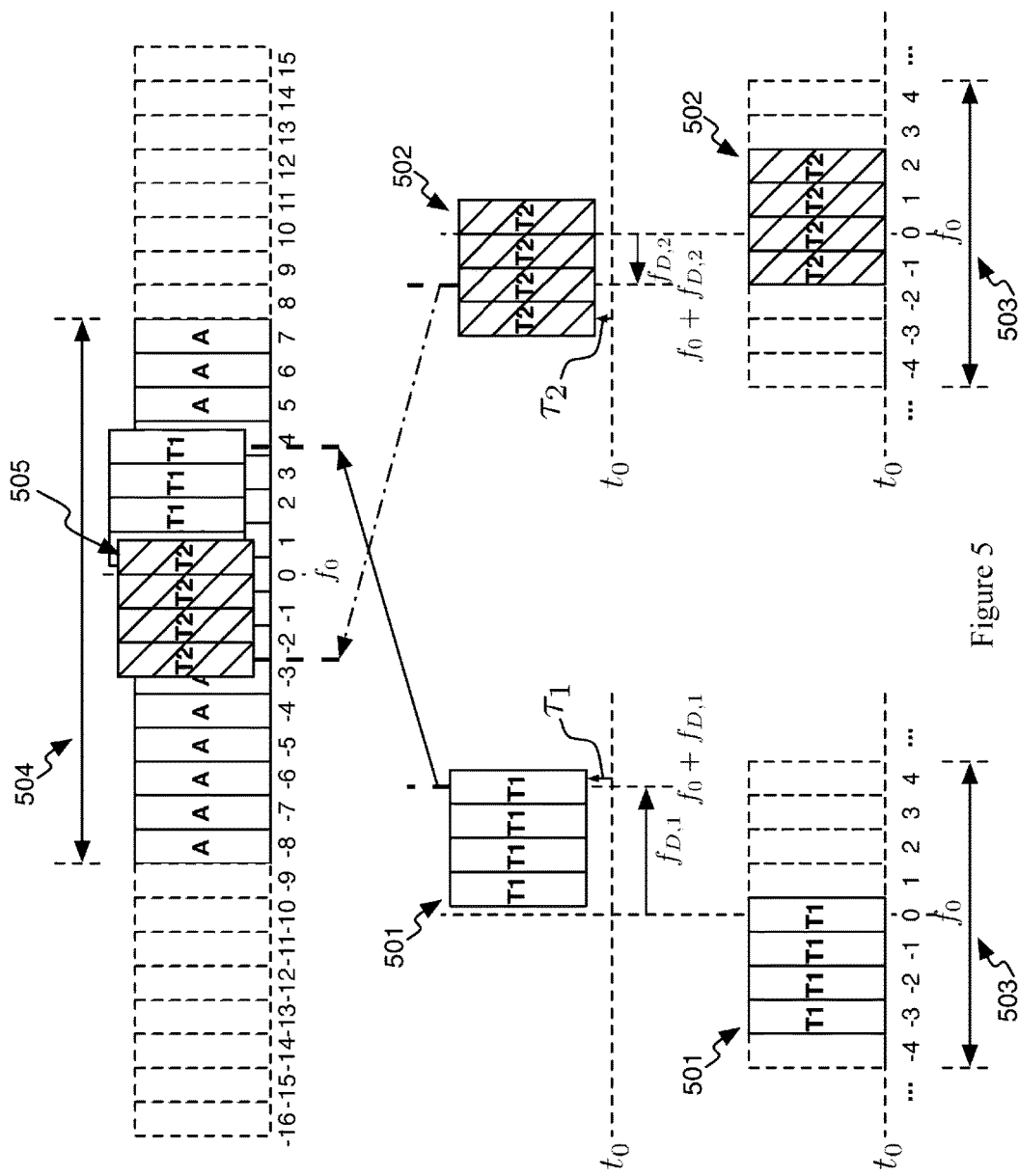
FIG. 5 shows the Doppler induced frequency offset and propagation delay from the channel between each transmitter and the receiver according to an embodiment.

To explain exploiting Doppler for efficient uplink allocation, we first consider the system shown in FIG. 2 for a case when Terminals T1 and T2 transmit an OFDM signal without coordination from the access node, and without applying any channel pre-compensation at the transmitter. Terminal T3 is not active in this example. FIG. 5 shows the transmitted signals, 501 from terminal T1 and 502 from terminal T2, with the horizontal axis representing frequency and the vertical axis representing time. The figure also shows the Doppler induced frequency offset and propagation delay from the channel between each transmitter and the receiver. The resulting composite received signal is also shown. Subcarriers are indexed such that index zero is the baseband DC (0 Hz) subcarrier and is modulated onto the carrier frequency $f_0$. A permitted transmission region 503 is defined in order to meet transmit spectral mask requirements (subcarriers −4 to 4 in this example). Each terminal populates 4 subcarriers. Terminal T1 transmits on subcarriers indexed from −3 to 0. Terminal T2 transmits on subcarriers indexed from −1 to 2. The access node includes an OFDMA receiver, having subcarrier spacing consistent with the transmitters, and again indexed such that index zero is the baseband DC subcarrier corresponding to $f_0$. The receiver defines a set of subcarriers available for uplink allocation 504, e.g. determined by the bandwidth of allocated uplink spectrum. In this example these are the 16 subcarriers from index −8 to 7. The signal transmitted by terminal T1 501 is shifted up in frequency by Doppler $f_{D,1}$ and its arrival at the receiver is delayed by $\tau_1$. The signal transmitted by terminal T2 502 is shifted down in frequency by Doppler $f_{D,2}$ and its arrival at the receiver is delayed by $\tau_2$. When these signals arrive at the receiver they are misaligned in time, leading to inter-symbol interference; and misaligned in frequency, leading to inter-carrier interference. Moreover, the signals overlap in time and frequency 505, causing multiuser interference. These effects can severely degrade receiver performance.

Using the methods described herein, our system has the access node coordinate terminal transmissions to avoid interference. In one embodiment, terminals track channel state behaviour and apply channel pre-compensation by:

1. Transmitting on subcarriers allocated by the access node, with the allocation taking into account uplink channel effects. The subcarrier allocation also provides bulk pre-compensation for channel frequency offset, at a subcarrier spacing resolution.

2. Applying pre-compensation for channel frequency offset as required for any remaining fraction of the subcarrier spacing.

3. Compensating for channel delay by transmitting ahead of slot timing boundaries.

Figure 6A:
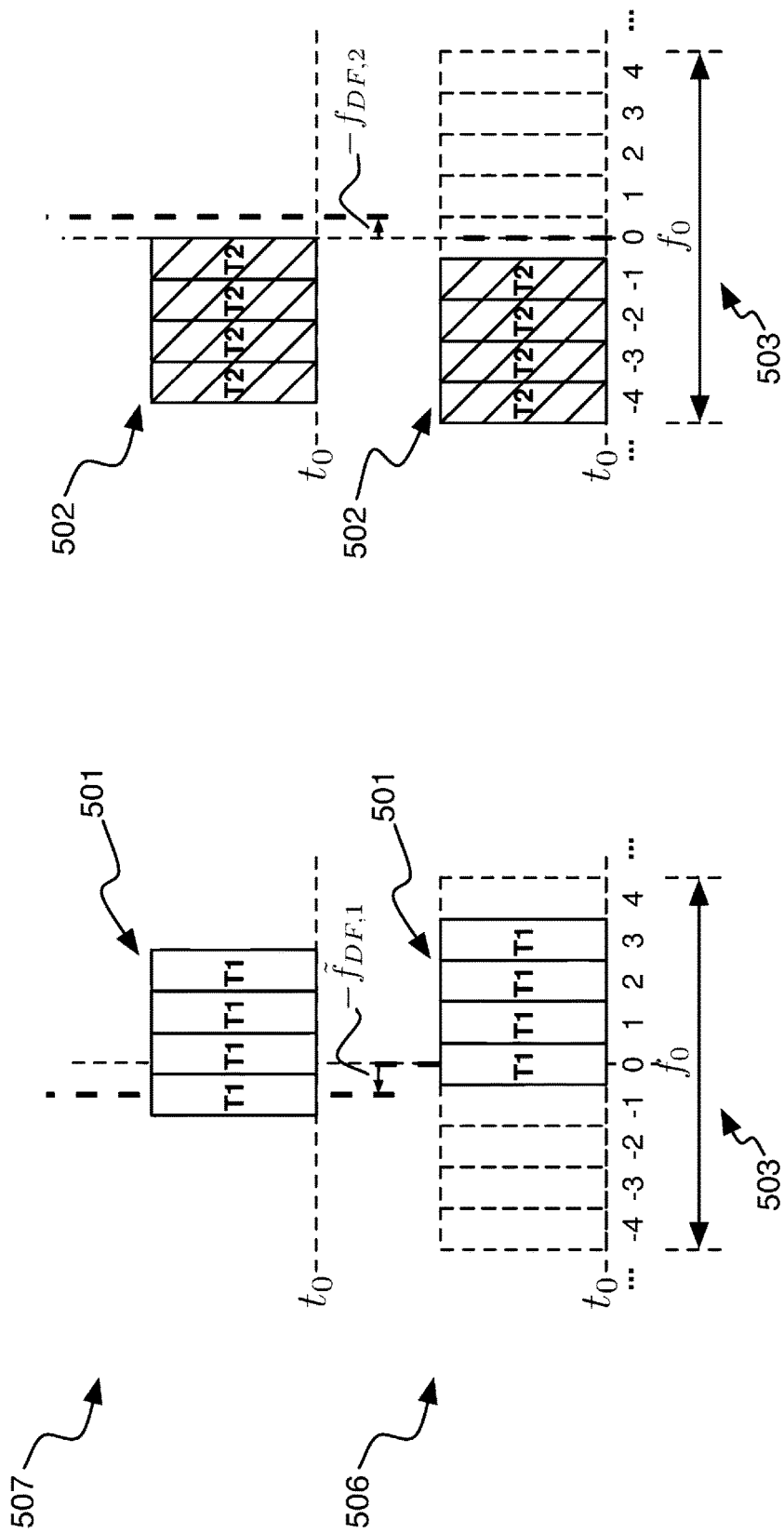
FIG. 6A depicts part of a system in which terminals are coordinated by the access node and pre-compensate for uplink channel effects according to an embodiment.
Figure 6B:
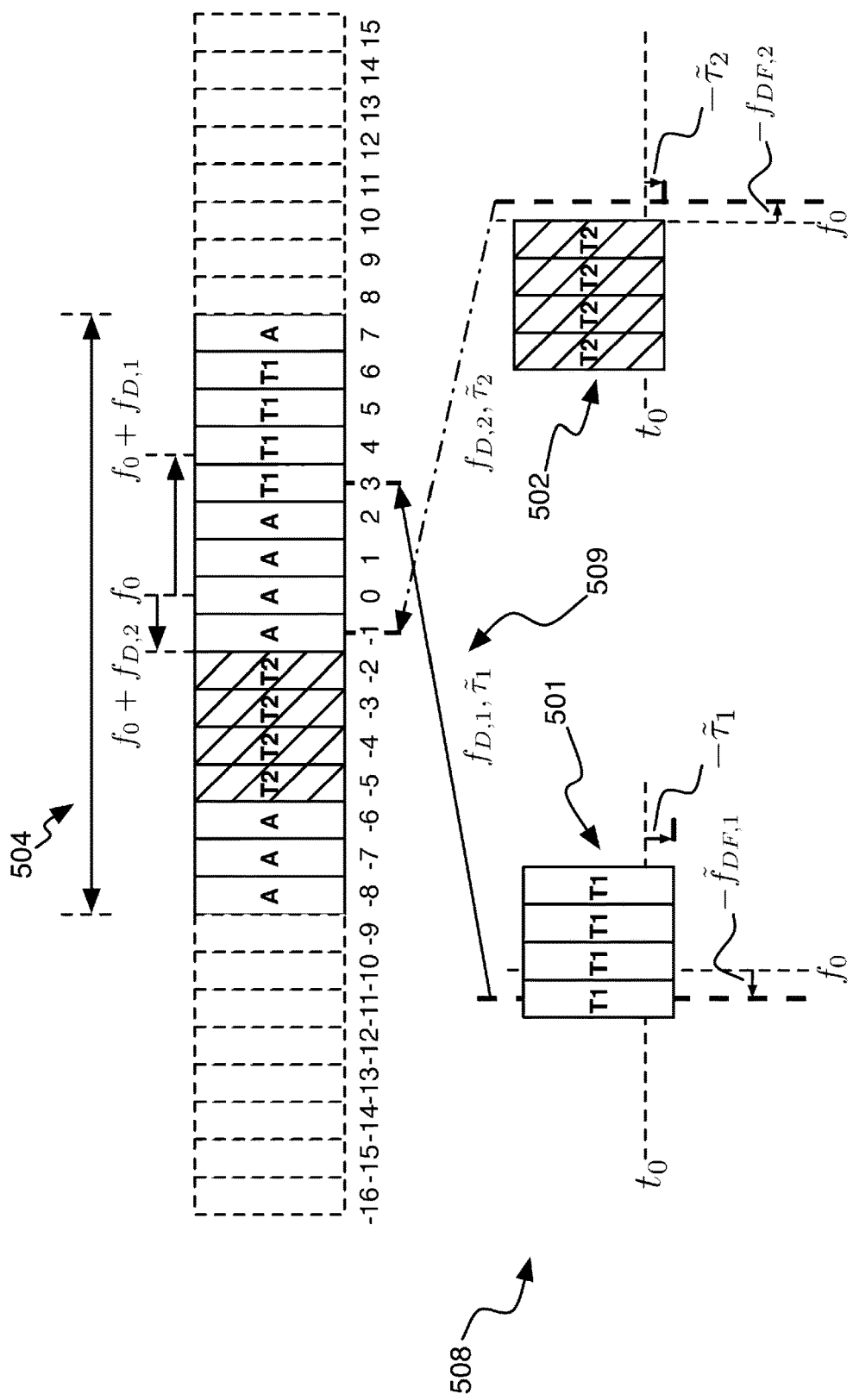
FIG. 6B depicts the remaining parts of the system shown in FIG. 6A.

We now consider the example using our system, in which terminals T1 and T2 are coordinated by the access node and pre-compensate for uplink channel effects. We assume that the terminals have requested access to the channel, and have been allocated subcarriers for transmission, as described in Section 3. FIGS. 6a and 6b shows the transmitted signals (FIG. 6B sits above FIG. 6A). The first step of frequency pre-compensation 506 is performed by the allocation of transmit subcarriers. Terminal T1 transmits on subcarriers indexed from 0 to 3. Terminal T2 transmits on subcarriers indexed from −4 to −1. The terminals apply pre-compensation for frequency and time offsets as shown in FIG. 5, and described in Section 7. Briefly at 506, each terminal T1 T2 performs coarse frequency pre-compensation by choice of offset subcarriers. At step 507 fine frequency pre-compensation is performed by adjusting by a fraction of subcarrier spacing. At step 508 (shown in FIG. 6B) time delay pre-compensation is performed. The channel then introduces Doppler induced frequency offset and propagation delay 509 between each transmitter and the receiver, consistent with the previous example. The resulting composite received signal is also shown. Signals from T1 and T2 arrive at the receiver to provide the following benefits in comparison to the uncoordinated case:

arrival time is close to the start of packet expected by the receiver, minimising inter-symbol interference.

arrival frequency is consistent with the subcarrier mapping allocated by the receiver, minimising inter-carrier interference.

the signals do not overlap, i.e. there is no multiuser interference.

Section 3: Medium Access Control

The medium access control (MAC) layer determines how access to the radio channel is organised and controlled. The MAC layer also provides an interface to higher layers of the communications system, e.g. the message networking layer, as described in WO2014043760.

System uplink and downlink channel resources may be provided by different segments of radio spectrum, i.e. frequency division duplexing (FDD), or at the same frequency, e.g. via time division duplexing (TDD). In an embodiment the uplink and downlink are time slotted, and a frame period is whole number of time slots spanning some integral fraction of 1 minute, e.g. 4, 5 or 6 seconds. In this embodiment time slots have duration 250 ms but in other embodiments other durations may be used (eg 25 ms, 50 ms, 100 ms, 200 ms, 300 ms, 500 ms etc).

FIG. 7 shows a structure of a single TDD frame 700 according to an embodiment. The frame comprises a plurality of slots 701 such as administration (ADM), acknowledgements (ACK), Data, Random Access (RA) that are allocated to either an uplink portion 702 or a downlink portion 703 This example frame has a 1:1 ratio between uplink and downlink slots. Other ratios are possible, e.g. if asymmetry of uplink and downlink traffic volumes is expected (eg 1:2, 2:1, 1:4, 4:1 etc). The division of uplink and downlink slots may be dynamic and change from one frame period to the next. The division may be known according to some predetermined schedule, or may be announced by the access node. The access node may change the division between uplink and downlink based on its position, or by dynamically adapting to the load in either direction. Other TDD frame structures with different slot sequences may be used. FIG. 8 shows a structure of an FDD frame 800 according an embodiment. In this example the slot duration 801, and number of slots in a frame 803, is consistent between uplink 802 and downlink 804 frames. Other FDD frame structures may be used including different slot configurations. In one embodiment, different length uplink and downlink portions can be used.

In an embodiment, at least one slot per frame is reserved for downlink operation, and will contain channel management data. Access node transmissions in these slots serve as a beacon and allow the terminal receiver to estimate channel parameters. In the example frame structure shown in FIG. 7, the first downlink slot is an administration slot (ADM), and the second is used to acknowledge reception of terminal transmissions (ACK). In an embodiment the access node uses the administration slot to announce its node identifier, current position, and current radio channel allocations. The administration slot may also provide uplink and downlink assignment maps which describe how the channel is to be used during the upcoming frame periods. The remaining downlink slots are used for data transport (Data). In an embodiment, a region of the uplink channel resource is assigned for random access. In the example in FIG. 7 this is the slot labelled RA. The random access region may be used by terminals to request channel access, as described in Section 3.2. The remaining uplink slots are used for data transport.

The MAC layer employs the concept of a session. This document refers to sessions in this MAC layer context, rather than in the conventional sense of a communication session between two applications as managed by the session layer of the OSI model. A session is considered active when an access node and terminal agree to communicate with one another. An access node may have active sessions with multiple terminals at any one time. In an embodiment, the access node also has a multicast session. Broadcast and multicast downlink traffic may be transmitted at any time that the multicast session is active. In one embodiment the access node keeps the multicast session active at all times. In another embodiment the multicast session is enabled or disabled by the access node according to some criteria, e.g. network load or the location of the (mobile) access node. Each MAC layer maintains a list of its active sessions, and may also record statistics for each session, such as link quality metrics.

Figure 9A:
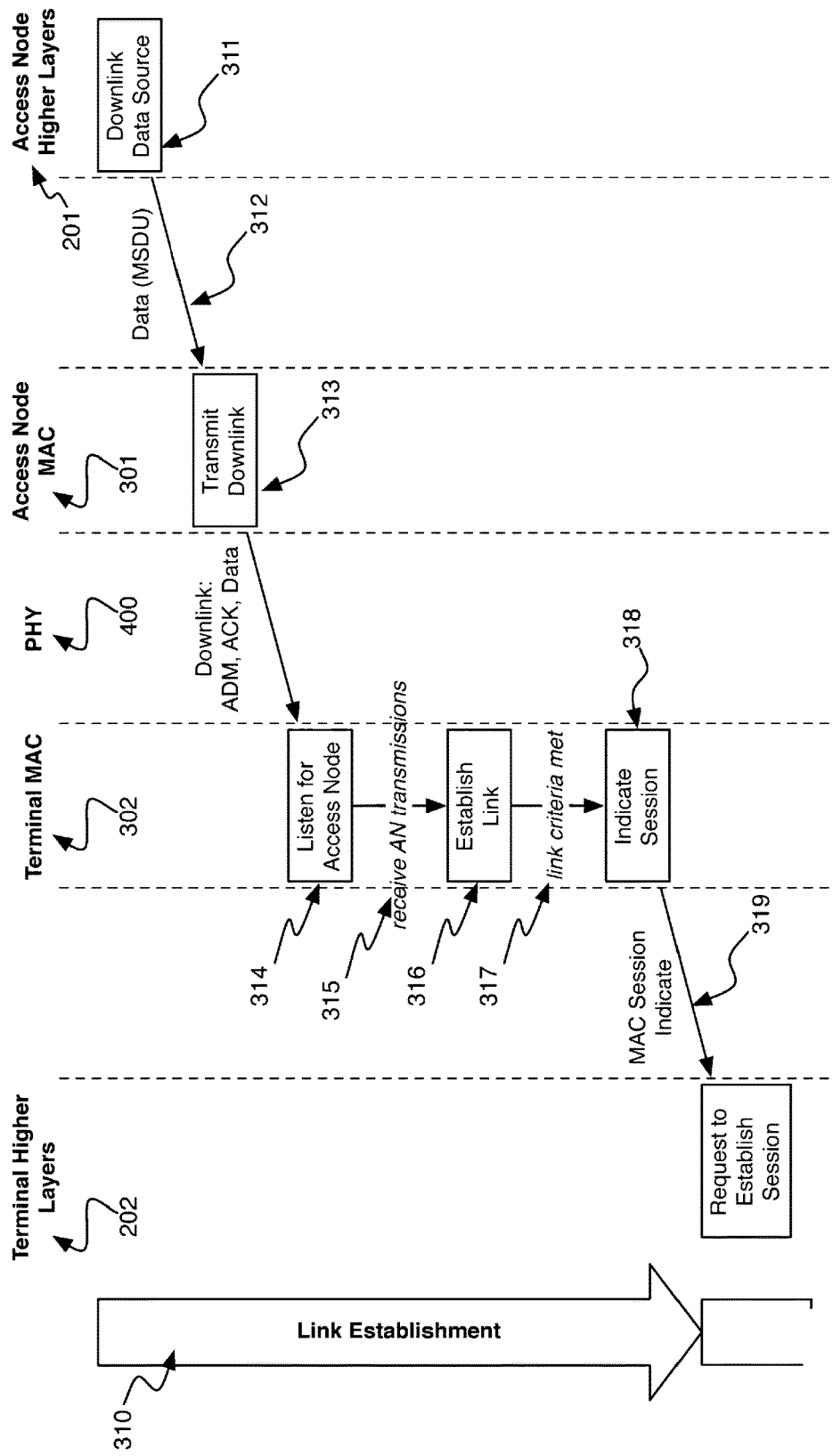
FIG. 9a presents a first partial summary of one embodiment of link state transitions according to an embodiment.
Figure 9B:
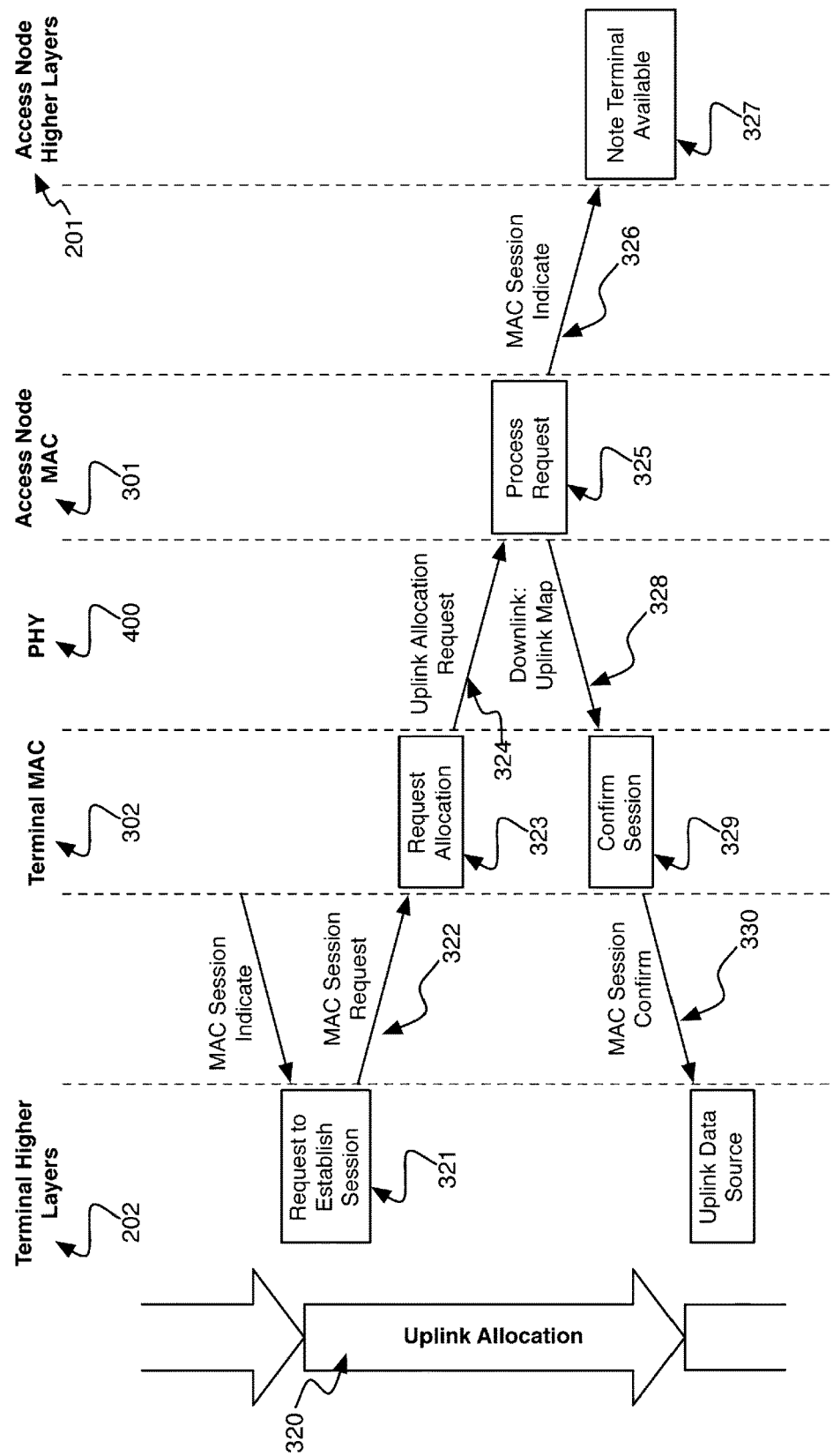
FIG. 9b presents second partial summary of one embodiment of link state transitions according to an embodiment.
Figure 9C:
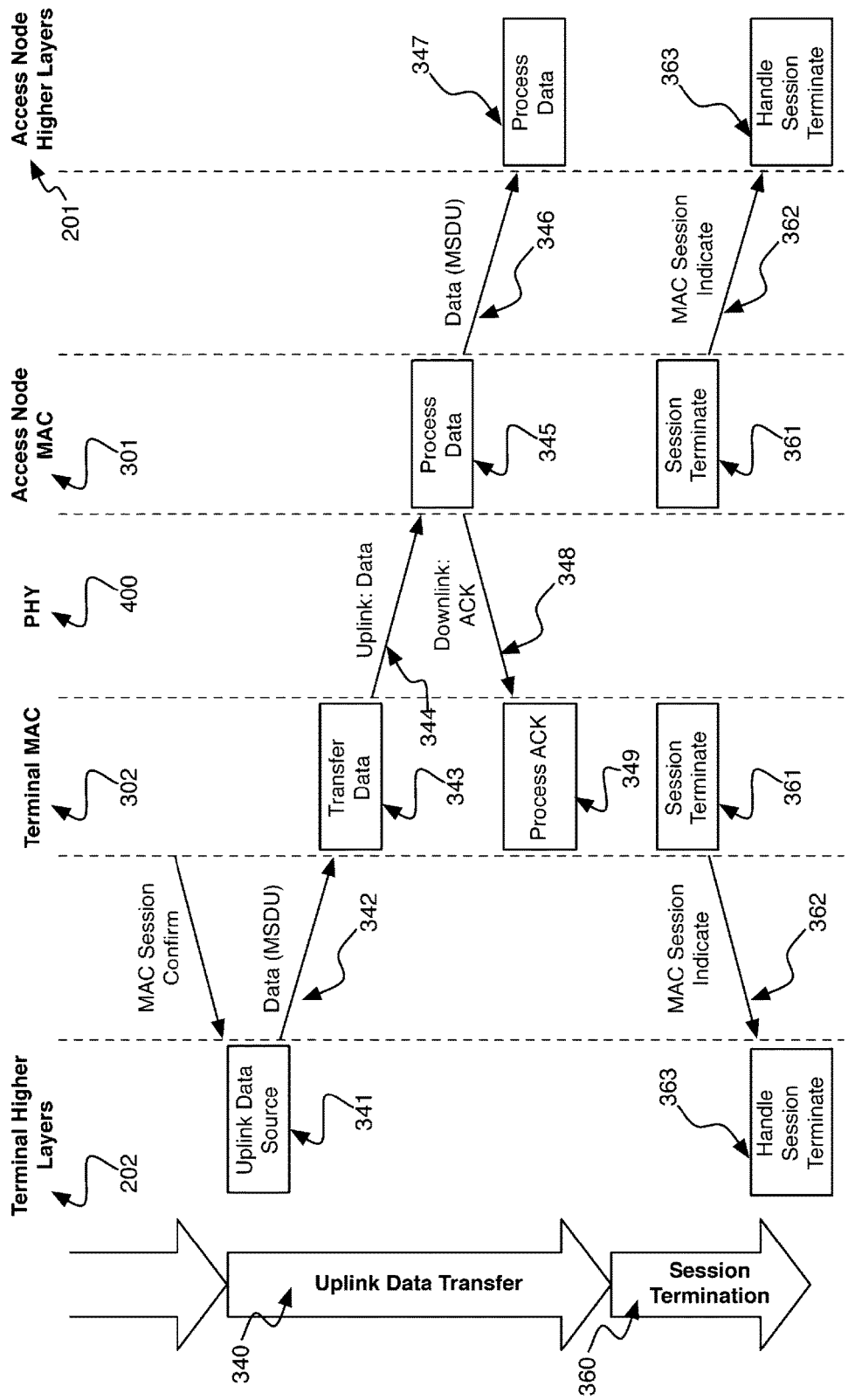
FIG. 9c presents a third partial summary of one embodiment of link state transitions according to an embodiment.

FIGS. 9a to 9c shows a summary of link state transitions in the case of a single terminal and access node. This illustration assumes that the terminal has uplink traffic to send to the access node. Availability of the link may come and go, e.g. as a low earth orbit satellite based access node passes over a terminal. The link is established and used in the following steps, which are described in further detail in the description that follows:

1. link establishment and indication of session availability 310;
2. uplink allocation and session confirmation 320;
3. uplink data transfer 340; and
4. session termination 360.

Section 3.1: Link Establishment

After achieving frame synchronisation, the terminal listens for access node transmissions 314 in one or more of the persistent downlink slots, e.g. the administration slot shown in FIG. 7. The access node MAC layer prepares (the higher layers obtain downlink data source 311 and package as data as MSDU 312) and transmits downlink frames 313 over the physical layer 400. Each frame includes at least one persistent slot that is transmitted with a known modulation and coding scheme. The terminal receives access node transmission 315 and attempts to acquire and demodulate these transmissions during one or more frames to establish a link 316, and updates downlink channel parameter estimates maintained by the channel state tracker, as described in Section 6. Once link establishment criteria have been met 317 the terminal may transmit to the access node. In an embodiment link establishment criteria include one or more of:

a quality requirement on downlink channel parameter estimates, e.g. as indicated by the channel state tracker reporting a valid status;

a minimum receive SNR requirement; and/or a requirement on access node and terminal geometry/dynamics, e.g. minimum separation.

When the link is established 317, the terminal MAC layer sends a notification 319 to the higher layers to indicate that a session 318 with 318 the access node is available. The administration packet data also instructs the terminal on the modulation and coding scheme in use for other downlink slots, via a downlink slot map. The access node may also use the administration packet to update terminals on the state of access node components, such as providing an estimate of system frequency offsets due to access node transmit and receive chain electronics. The system frequency offsets may then be provided to the channel state tracker for use in uplink channel compensation, as described in Section 6. As outlined above, in the context of the specification system frequency offsets are considered to be a form of channel offset. Once the link is established the terminal may receive downlink transmissions from the access node. The downlink physical layer receiver may then switch from initialisation mode into tracking mode, as described in Section 5.2.

Section 3.2: Uplink Allocation

If the terminal has data to be transmitted (e.g. waiting in a transmit queue), after receiving an indication 319 from the MAC layer that the access node is available, the upper layers of the terminal send a request 322 to the MAC layer to establish a session 321. The MAC layer then requests an uplink channel allocation 323, resulting in the terminal PHY transmitting this request to the access node 324, as shown in FIG. 9b.

Section 3.2.1: Partitioning of Uplink Resources

As described above, uplink allocation is coordinated by indexing subcarriers with respect to the access node receiver point-of-view. The uplink channel is considered to be divided into an orthogonal collection of cells, where each cell is indexed by its position in time (slot) and frequency (subcarrier). The access node allocates cells to terminals based on their transmitter capabilities and the uplink channel load. Each allocation consists of one or more groupings of cells into rectangular blocks, with each block being defined by its start and end frame slot indices and start and end subcarrier indices. An allocation can also extend over one or more frame periods. Using this approach reduces the overhead required to define assignment when allocating cells to terminals.

Figure 10A:
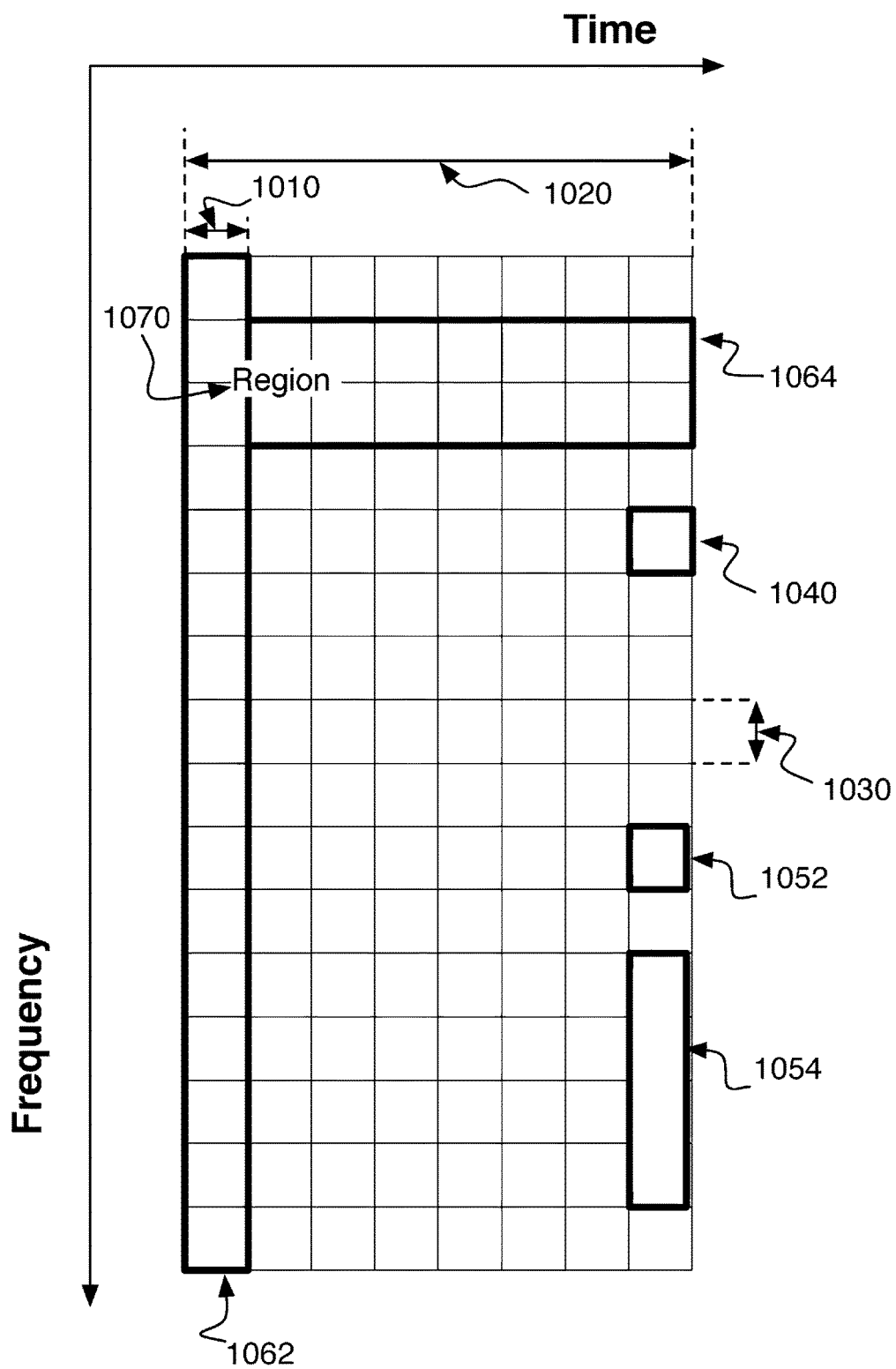
FIG. 10a illustrates concepts for partitioning of uplink resources according to an embodiment.

FIG. 10a illustrates the following concepts for partitioning of uplink channel resources:

Slot 1010: the time dimension of the uplink is divided into slots;

Frame 1020: a frame consists of an integral number of slot periods;

Subcarrier 1030: the frequency dimension of the uplink is divided into subcarriers;

Cell 1040: a cell denotes a subcarrier at a given slot, providing a unique index within the context of a single frame;

Packet 1050: a packet is transmitted in a single slot, spanning one or more subcarriers; FIG. 10a illustrates a first packet 1052 comprising a single subcarrier packet and a second packet 1054 comprising a multi subcarrier packet Block 1060: a block is rectangular set of cells, defined by its start and end frame and slot indices and start and end subcarrier indices; In FIG. 10A a first block 1062 is defined by all subcarriers in the first slot 1010 of the frame 1020, and a second block 1064 is defined by all slots 1010 except the first slot in two adjacent subcarriers 1030.

Region 1070: a region is a set of one or more blocks. In FIG. 10a, a region is defined by the first block 1062 and the second block 1064.

Figure 10B:
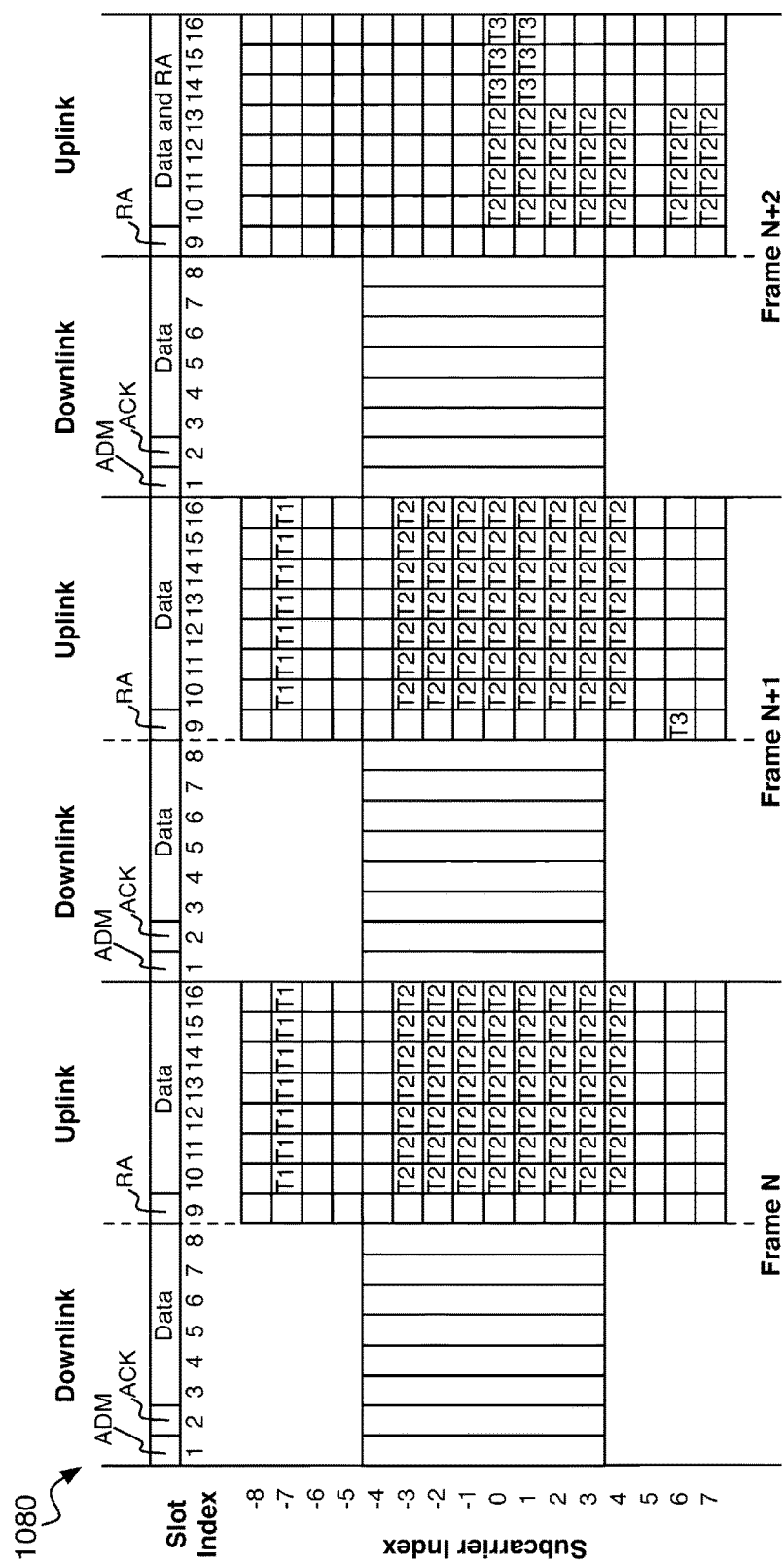
FIG. 10b depicts an example of uplink allocation according to an embodiment.

FIG. 10b provides an example of the channel allocation scheme, operating in TDD mode 1080 according to an embodiment. Frequency (subcarrier index) is represented by the vertical axis and time (frame and slot indices) is represented by the horizontal axis. The uplink and downlink share the same slot timing and index reference. In this example, the uplink and downlink duration is fixed at 8 slots for each. The figure shows the following channel allocations and activity. Further detail on resource request and allocation mechanisms are provided below.

Terminal 1 (T1): has previously been granted access to the uplink. It has been allocated subcarrier index −7, from slot 10 to 16, in frames N and N+1.

Terminal 2 (T2): has previously been granted access to the uplink. It has been allocated the subcarriers indexed from −3 to 4, from slot 10 to 16, in frames N and N+1. During uplink transmissions within this assignment, it makes an allocation request for continued access. This request is granted in the frame N+2 administration downlink slot 1. The new uplink allocation consists of two blocks in frame N+2, from slot 10 to 13. The first block includes subcarriers indexed from 0 to 4 and the second block includes subcarriers 6 and 7. in this example, the access node has excluded subcarrier 5 from the allocation, e.g. in order to avoid interference as described below. This example highlights the flexibility benefit that the uplink allocation scheme provides by permitting non-contiguous allocation.

Terminal 3 (T3): transmits an allocation request message during frame N+1 in the random access region, at subcarrier index 6 in slot 9. This request is granted in the frame N+2 administration downlink slot 1. Terminal 3 is allocated subcarriers 0 and 1, from slot 14 to 16, in frame N+2.

The random access (RA) region is assigned by the access node, and is illustrated as grey slots in FIG. 10b. During all frames slot 9 is available for random access from subcarrier index −8 to 7 (grey slots). During frame N+2 the random access region is extended, to include subcarriers −8 to −1 in slots 10 to 16. This example highlights the benefit that the dynamically defined random access region provides for agile and efficient partitioning of uplink resources between coordinated allocation and random access. Extending the random access region reduces the probability of collision during random access.

Section 3.2.2: Uplink Random Access

The access node allocates a set of cells as a random access region. In an embodiment, the random access region is dynamic, and is announced and maintained by the access node. The access node broadcasts an uplink map message that defines the random access region for the current frame period. The random access region consists of one or more groupings of cells into rectangular blocks, with each block being defined by its start and end frame slot indices and start and end subcarrier indices. The access node may also specify an empty random access region. It is also possible for the access node to define the uplink map message via a multicast message (rather than broadcast message) and limit availability of the random access region to terminals identified in the multicast group.

A terminal may use the random access region to:
transmit a request to be allocated channel access; and
send short unidirectional messages.

Access to the random access region is governed by a set of rules that aim to provide a high probability of reception for new terminals entering access node coverage. In an embodiment the access node defines a random access window size, measured in frame periods, and announces this within the downlink administration slot. This is used by the terminal transmitter to determine the range over which it should select a random back-off before accessing the random access channel.

In an embodiment a terminal wishing to transmit in the random access region will transmit using only one cell within each random access window. The terminal may select the cell as follows, typically updating the selection for each random access window.

1. Determine which cells it is capable of targeting in the announced random access region, based upon constraints such as transmit capability, predicted Doppler shift, and regulatory requirements. Further detail on the calculation of targetable subcarriers is provided in Section 3.2.4. A transmission can then be pre-compensated so that the transmission will arrive at the access node in the desired random access cell (ie subcarrier/slot).

2. Select the transmit cell randomly from the targetable set of random access cells over the random access window.

In an embodiment the random selection is performed as follows.

(a) A transmit frame is chosen, via a uniform random selection over the interval starting at the current frame and having the random access window length.

(b) A cell is chosen from within the transmit frame, via a uniform random selection over the set of all cells targetable by the terminal.

In other embodiments cell selection may be performed according to a pre-defined schedule, or using any of the methods described in WO2014026228.

The terminal may also transmit in the random access region in order to announce its presence to the access node. Upon receiving a message from the terminal the access node MAC layer will indicate session availability to the higher layers of the access node. This is shown in FIGS. 9a, 9b and 9c for the case when the terminal sends a request for uplink access. The access node can then initiate any downlink transmissions destined for the terminal. In one embodiment, if the access node is mobile (e.g. satellite based) then a terminal that has the capability to receive downlink data will transmit an uplink message on a regular basis to announce its presence, e.g. once during each pass of the access node.

In an embodiment the system provides support for a unidirectional (uplink only) remote service, using the random access region for the transmission of short messages. This approach may be used to deliver a 1-way service, catering to terminals with small transmission size requirements, such as service type 1 (ST1) described in WO2014043760. In one embodiment a low complexity unidirectional terminal may implement sufficient acquisition functionality to obtain channel synchronisation and support transmission, while omitting other downlink receiver components.

Section 3.2.3: Request for Uplink Allocation

The terminal requests an uplink allocation by transmitting a message to the access node:
using the random access method described in Section 3.2.2; or
within an existing allocated uplink region previously assigned to the terminal.

In an embodiment an allocation request contains the following:
Source identifier for the terminal.
Destination identifier for the access node.
Number of bytes queued for transmission at the terminal. This allows the access node to determine channel allocation requirements.
Terminal capabilities, such as:
  subcarriers targetable by the terminal (indexed relative to the access node) as described in Section 3.2.4.
  physical layer support, e.g. modulation and coding schemes, transmit power capability, or support for alternate waveforms.
  support for half and/or full duplex operation.
An allocation request may also contain the following:
Transmit power used for the transmission.
An estimate of SNR measured at the terminal. This may be used by the access node to determine downlink link-margin, and steer decisions on when to transmit to the terminal.
Position and dynamic information for the terminal. This can be used by the access node to determine if and when to allocate channel resources to the terminal. For example, a terminal that will soon leave the field of view of a satellite may be given priority access over a terminal that has just entered the field of view.
Authentication data, allowing the access node to authenticate users prior to granting access.

Once an uplink allocation request has been received 323 324, the access node processes the request for uplink access 325 by the MAC layer sending a notification 326 to the higher layers, to indicate that the terminal is available 327, as shown in FIG. 9b. The packet in which a request is sent may also contain user payload data if there is sufficient space. In that case the data would also be passed from the MAC layer to the higher layers (not shown in FIGS. 9a, 9b and 9c).

Section 3.2.4: Determining Targetable Subcarriers

The terminal determines which subcarriers it is capable of targeting at the access node using a prediction of the uplink frequency offset. In an embodiment, the uplink frequency offset prediction is provided by the channel state tracker in two components, representing the whole number of uplink subcarrier spacings, $\tilde{N}_D$, and the additional fractional component $\tilde{\omega}_{IF}$, as described in 6.2.

Figure 11:
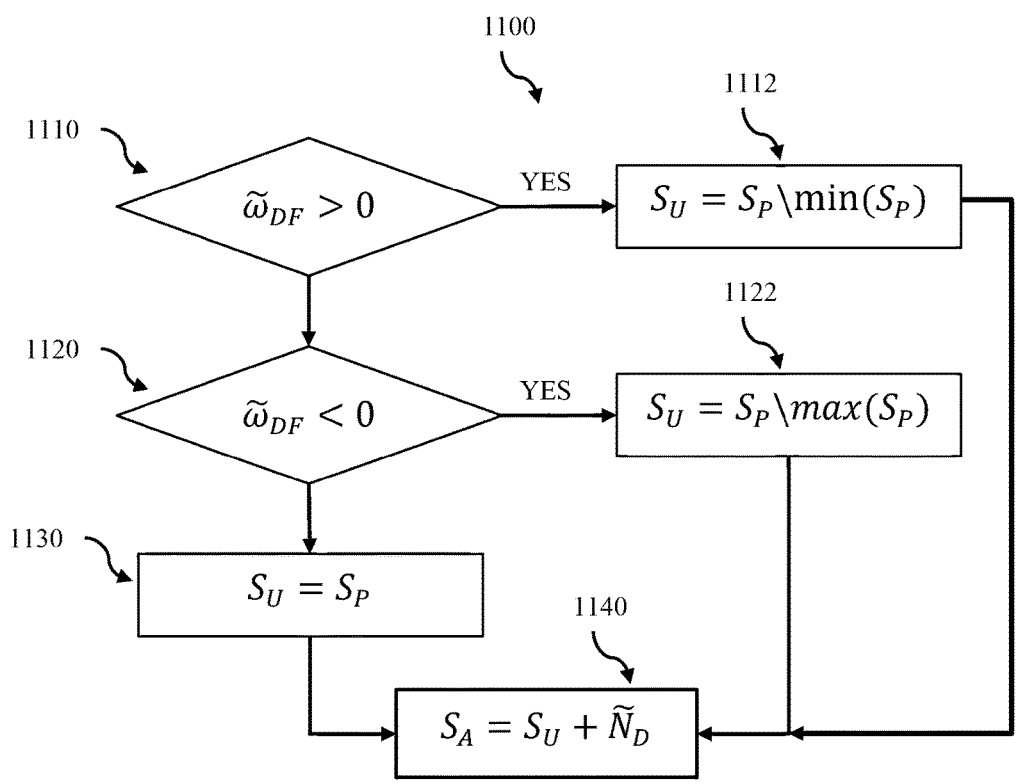
FIG. 11 shows an algorithm for a terminal to determine a set of targetable subcarriers according to an embodiment.

A permitted transmit frequency region is defined in order to meet transmit spectral mask requirements. In an embodiment the terminal determines the set of targetable subcarriers using the algorithm shown in Table 1 and further illustrated in FIG. 11 which is a flowchart 1100 11 of a method for determining the set of targetable subcarriers.

Add the allocation to the access node uplink allocation map.

Generate one or more uplink map element entries for the terminal. A non-contiguous allocation may be defined by assigning multiple elements to a single terminal. The elements will be transmitted in the next uplink map message and notify the terminal of the allocation.

An uplink map message is constructed containing one or more elements and transmitted in the downlink administration slot. Each element comprises:

An identifier for the device being granted allocation. This may be one of:
  The unique identifier for a terminal.
  A broadcast identifier to indicate that the allocation corresponds to the random access region.
  A multicast identifier indicating that the set of terminals in the multicast group may use the allocation for random access.

The modulation and coding scheme to be used for all transmissions in the allocation.

TABLE 1

ALOGORITHM FOR DETERMINING THE SET OF TARGETABLE SUBCARRIERS.

| | |
|---|---|
| Let $S_P$ be the ordered set of subcarriers within the permitted transmission region Calculate the set of subcarriers useable by the terminal, $S_U$: | Subcarriers are indexed such that index zero is the baseband DC subcarrier and is modulated onto the carrier frequency, $\omega_0$. |
| If $\tilde{\omega}_{DF} > 0$ then | Step 1110 |
| $S_U = S_P \backslash \min(S_P)$ | Step 1112. A\B excludes the member B from the set A. Operators min(A) and max(A) select the minimum and maximum valued members from A respectively. |
| else if $\tilde{\omega}_{DF} < 0$ then | Step 1120 |
| $S_U = S_P \backslash \max(S_P)$ | Step 1122 |
| else | |
| $S_U = S_P$ | Step 1130 |
| end Calculate the set of subcarriers targetable at the access node by the terminal, $S_A$, as follows: | |
| $S_A = S_U + \tilde{N}_D$ | Step 1140. The + operator adds $\tilde{N}_D$ to each element of $S_U$. |

Section 3.2.5: Allocation of Uplink Resources

After receiving an uplink allocation request 323 324, the access node MAC layer will:

Verify the authenticity of the request, if optional authentication data is available.

Determine if the terminal should be allowed access. This may involve validating the terminal against a set of policy rules to determine restrictions in place for the terminal, or based on the class of terminal.

Estimate the duration of the communication window with the terminal, based upon the number of queued bytes specified in the request.

Determine the subcarriers to allocate based on availability, and access node and terminal capabilities. Further detail on the calculation of subcarriers targetable by the terminal is provided in Section 3.2.4. The set of subcarriers allocated to a terminal may be non-contiguous.

Determine the uplink modulation and coding scheme, potentially based on estimated link quality and data transfer requirements.

Determine an allocation duration, based upon the allocated bandwidth and modulation and coding scheme. The duration may also be limited based upon expected system dynamics and frequency offset, in order to ensure that the set of subcarriers targetable by the terminal remains valid over the allocated period.

The transmit power level to use for transmissions in the allocation.

The allocated subcarrier region (index of minimum and maximum).

The allocated slot region (index of minimum and maximum).

The allocated frame region (index of minimum and maximum).

A channel identifier, specifying the radio channel to which the uplink slot assignment applies, in the case of a multi-channel system.

In one embodiment, the access node MAC layer uses per-subcarrier noise power estimates provided by the PHY receiver to avoid interference by omitting effected subcarriers from the allocation. Throughout this document the term noise is used to denote energy coming from sources other than the desired signal, such as thermal noise and interference. Thus in the context of this specification the term signal to noise is used generally, and will also cover signal to noise plus interference ratio. The MAC layer may compare the noise estimates to a predetermined threshold. If a subcarrier has noise power exceeding the threshold the MAC layer may remove that subcarrier index from the list of subcarrier indices available for uplink allocation. The MAC layer continues to track the per-subcarrier noise power estimates. Once the subcarrier noise power estimate drops below the threshold, the subcarrier index may be returned to the set available for uplink allocation. The threshold may be chosen experimentally, such that it allows for some variation, e.g. due to changes in thermal noise conditions, while targeting the detection of increased power due to interference. The threshold value may be updated from time to time.

In another embodiment, the MAC layer has knowledge of terminal transmit power capabilities, and considers this in conjunction with per-subcarrier noise estimates during subcarrier allocation. For example, subcarriers that exhibit higher noise power estimates may be allocated to terminals having higher transmit power capability. In another embodiment the access node uses knowledge of access node and terminal locations to estimate link distance and associated path loss. Using knowledge of the SNR operating requirement, path loss, and per-subcarrier noise estimate, the access node estimates the transmit power required to provide a reliable link for each subcarrier. When allocating subcarriers the access node then compares the per-subcarrier transmit power requirement to the transmit power capability stated by each terminal.

In yet another embodiment, if an allocation is granted, an uplink map element is transmitted in the downlink of the frame 328 following the reception of an uplink allocation request message 323 324, as shown in FIG. 9b. If the terminal does not successfully receive the uplink map, e.g. due to poor link conditions, then it will not commence transmission, potentially wasting the allocation by not using it. To overcome this, the access node may retransmit an uplink map element in the following frame period if it does not successfully receive anything from the terminal. In another embodiment an uplink map element for a terminal may be continually transmitted in each frame period.

If a single allocation is not sufficient to transfer all data then the terminal may request a further allocation before the end of its current allocation, e.g. within the last frame of the current allocation.

If the access node is unable to allocate channel resources to the terminal, then it will not generate an uplink map element for the terminal. The terminal may attempt to repeat the request based on the re-transmission rules for the uplink random access region. In one embodiment the access node may explicitly deny access to a terminal by sending an empty uplink map entry to the terminal.

Once an uplink map has been received that provides an allocation, the terminal MAC layer sends a notification 330 to the higher layers to confirm that the terminal is available 329, as shown in FIGS. 9a, 9b and 9c.

Section 3.3: Data Fragmentation

The higher layers provide data to the MAC layer for transmission 341, as shown in FIG. 9c. The MAC layer provides a medium access control service data unit (MSDU) interface to receive blocks of data from the higher layers 342. The MAC layer fragments MSDUs into blocks of data for transmission on the channel (transfer data 343), and then forwards these to the physical layer via the physical layer service data unit (PSDU) interface for transmission over the uplink 344. The MSDU and PSDU concepts used in this document will be recognized by those skilled in the art as having similarity to MSDU and PSDU terminology in existing telecommunications standards. However, this document describes the use of MSDU and PSDU concepts in the context of our system, and is not limited by their meaning in other contexts.

Figure 12:
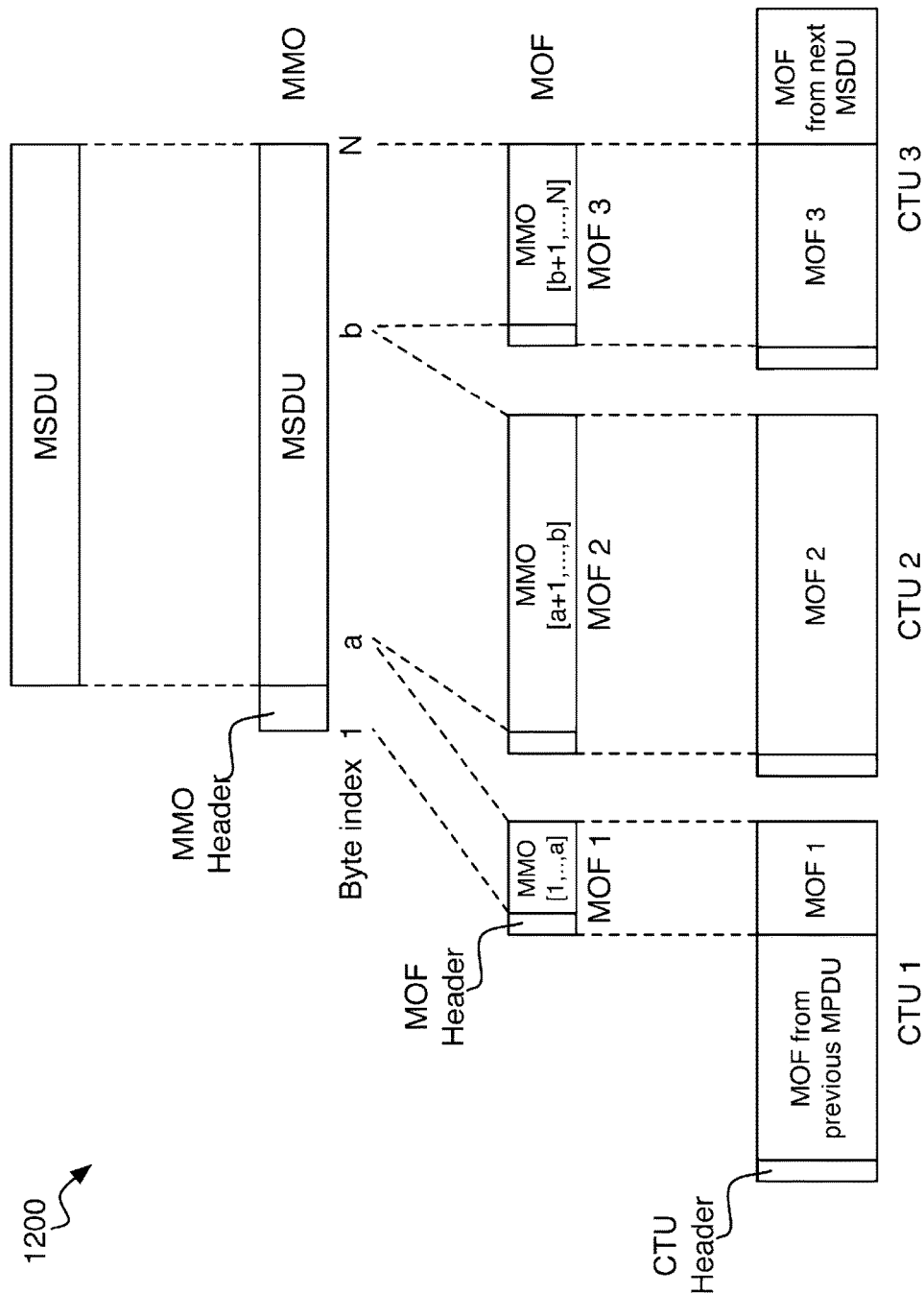
FIG. 12 shows an example of MAC layer data fragmentation according to an embodiment.

The MAC layer packs data to be passed to the physical layer into a channel transmission unit (CTU). In an embodiment each CTU maps directly onto the PSDU interface, i.e. each PSDU carries a single CTU. In an embodiment the MAC layer provides the following mechanism 1200 for variable length fragmentation of MSDUs, as shown in FIG. 12. CTU and message object fragment (MOF) header sizes are minimised to provide efficient data transport. The CTU header contains the source and target unique identifiers for addressing. The CTU optionally also contains a cyclic redundancy check (CRC). If present, the CRC is placed at the end of the CTU. The CRC is not shown in FIG. 12. The MOF header provides information to enable automatic repeat requests and data sequencing.

1. The MSDU is packed within a MAC message object.
2. The MAC message object is partitioned into MOFs. The MOFs can contain a variable number of bytes from the parent MSDU. The length of a MOF is determined at CTU generation time. The maximum size of the fragment being inserted into the current CTU will be based upon the number of free bytes available.
3. MOFs are packed into channel transmission units. Each CTU payload is used to transport one or more MOFs.

Our method for variable length fragmentation allows the inclusion of variable length data within CTUs. It also allows packing of multiple MSDUs into a single CTU. This provides efficiency and flexibility benefits when compared to a conventional method that fragments a large MSDU and transmits a single fragment per PSDU. Our scheme allows one or more fragments per CTU, i.e. per PSDU. This approach also allows efficient multiplexing of MAC management data and user MSDU data.

Section 3.4: Uplink Data Transfer

The terminal MAC layer provides each channel transmission unit as uplink source bits to the physical layer via the PSDU interface. The data is then transmitted on the uplink as shown in block 340 in FIG. 9c.

Section 3.4.1: Uplink Subcarriers

The terminal transmitter applies time and frequency offsets in order to target slot arrival and subcarrier frequency alignment at the access node, e.g. in order to meet the access node allocation described in Section 3.2.5.

In an embodiment, the uplink frequency offset estimate is provided by the channel state tracker in two components, representing the whole number of uplink subcarrier spacings, $\tilde{N}_D$, and the additional fractional component, $\tilde{\omega}_{DF}$, as described in Section 6.2.

The terminal selects transmit subcarriers in order to provide bulk compensation for channel frequency offset. The MAC layer instructs the physical layer on the subcarriers to be used for transmission. The transmit subcarrier set, $S_T$, is calculated using $S_T = S_{AN} - \tilde{N}_D$, where $S_{AN}$ is the set of subcarrier indices to be targeted at the access node, e.g. as allocated via an uplink map message. Pre-compensation for frequency offset that is a fraction of the subcarrier spacing is applied at the physical layer, as described in Section 7.1.

Figure 13:
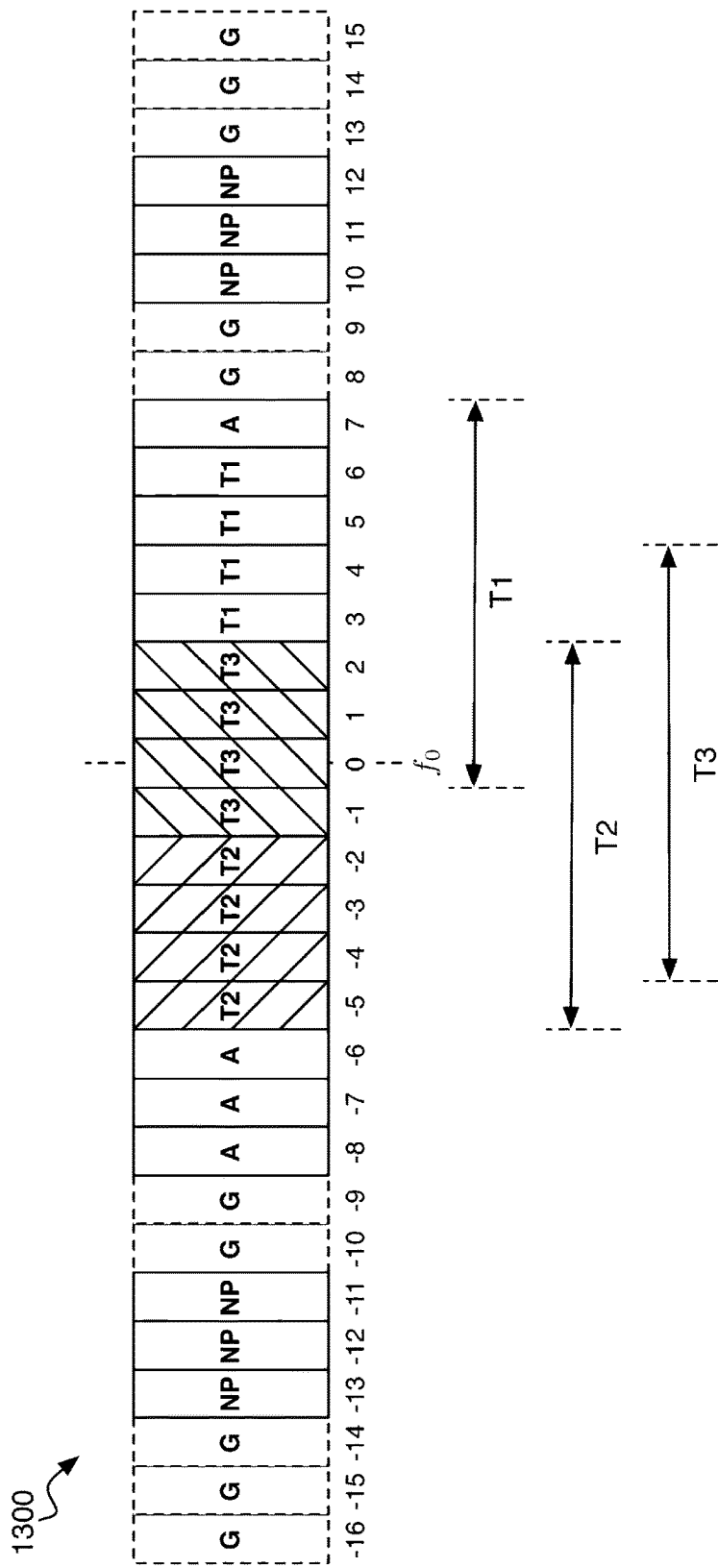
FIG. 13 shows an example of multicarrier uplink with coordinated access to achieve bandwidth expansion by exploiting Doppler shift characteristics of geographically distributed terminals according to an embodiment.

FIG. 13 shows an example coordination of uplink subcarriers 1300 corresponding to the system dynamics in FIG. 2. This example extends the coordinated multicarrier uplink example presented in Section 2 and all three terminals are transmitting. Slots −16, −15, −14, −10, −9, 8, 9, 13, 14, and 15 are Guard intervals (G), slots −13, −12, −11, 10, 11, and 12 are noise power estimate slots (NP) and slots −8 to 7 are the slots available for uplink allocation (A, T1, T2 or T3). The positive Doppler shift induced between the access node and Terminal T1 allows it to target subcarriers 0 to 7. The negative Doppler shift induced between the access node and Terminal T2 allows it to target subcarriers −5 to 2. There is negligible Doppler shift induced between the access node and Terminal T3, and it can target subcarriers −4 to 4. The access node allocates the uplink subcarriers and exploits the Doppler shifts induced by the geographically distributed terminals. This uplink allocation technique provides bandwidth expansion that can offer improved spectral efficiency.

Section 3.4.2: Uplink Reception and Acknowledgement

The terminal MAC layer transfers transfer data 343 to the physical layer 400 for transmission over the uplink 344 and the uplink physical layer receiver provides the access node MAC layer with an estimate of the uplink source bits, as described in Section 4. The uplink MAC layer receives and processes the PSDU data 345 then passes it to the higher layers of the access node via the MSDU interface 346 for further processing 347, as shown in FIG. 9c.

In an embodiment, each uplink PSDU is transmitted using a single cell. In other embodiments, PSDU length may be increased by transmitting across multiple subcarriers, i.e. multiple cells within the same time slot. In an embodiment each PSDU carries a single CTU. The access node MAC layer determines if the uplink PSDU, and hence CTU, was successfully received, e.g. via indication of successful packet reception from the physical layer receiver and/or a successful CRC check at the MAC layer. The access node MAC layer acknowledges CTU reception to the terminal using an acknowledgement (ACK) bitmap, as follows:

The access node generates an ACK bitmap corresponding to the uplink allocation in which the CTUs were transmitted.

A single bit is set to '1' to indicate that the CTU received in a given cell was successfully received by the access node, or '0' otherwise.

Bits are mapped according to the 2-dimensional cell allocation for the previous uplink period. In an embodiment, bits are ordered by increasing subcarrier index, then increasing slot index.

The ACK bitmap is sent in an acknowledgement message on the downlink 348 directed to the target terminal, as shown in FIG. 9c. The message is transmitted in a broadcast CTU during the acknowledgement slot period of the downlink frame, e.g. downlink slot 2 shown in FIG. 10b.

Figure 14:
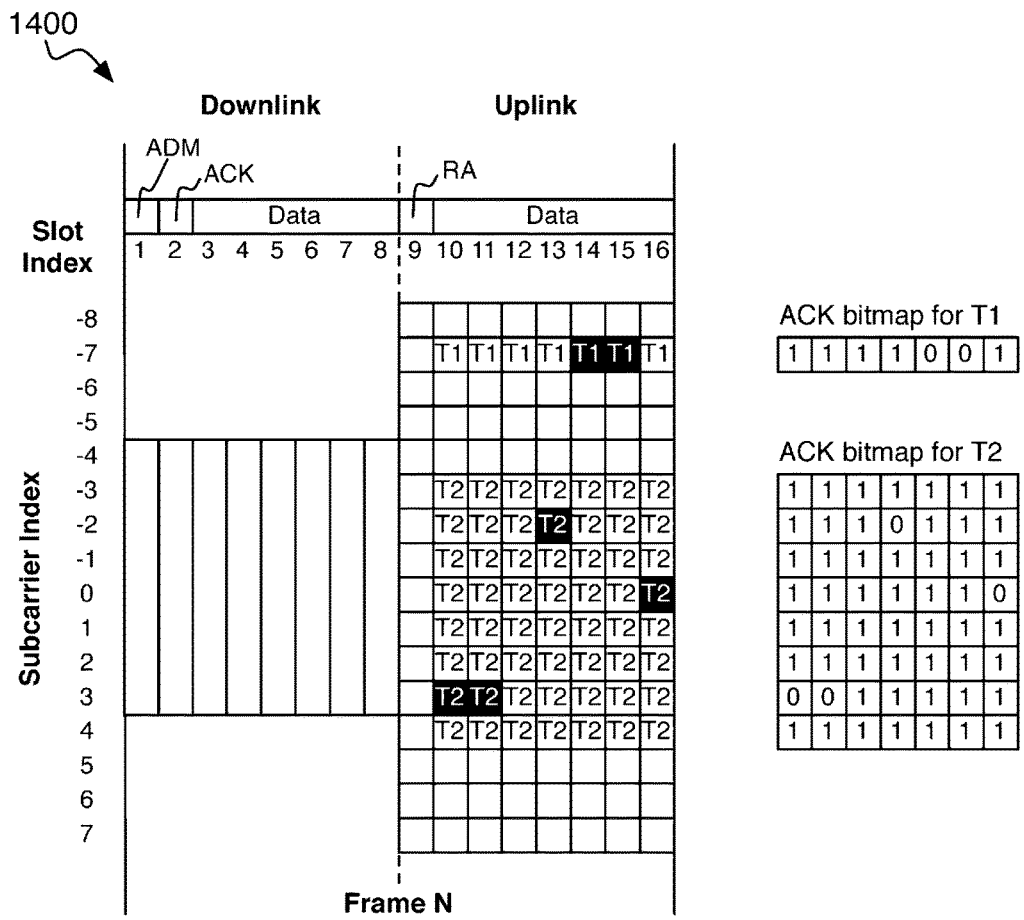
FIG. 14 shows an example ACK bitmap and how it is generated according to an embodiment.

FIG. 14 shows an example ACK bitmap 1400 and how it is generated. The figure shows a full frame period which contains uplink allocations. Terminal T1 has a single subcarrier allocation of duration 7 slots (7 cells). Terminal T2 has an 8 subcarrier allocation of duration 7 slots (56 cells). Cells shaded black indicate CTUs that were not successfully received by the access node. The figure shows the resulting ACK bitmaps for each of the two allocations.

If a terminal has an active uplink allocation then the downlink PHY receiver will process the acknowledgement slot downlink packet and pass the outcome to the MAC layer for processing of ACK messages 349. The MAC layer then extracts the ACK message corresponding to the terminal, and examines the ACK bitmap to determine which CTUs failed to be received by the access node. In one embodiment, the terminal then retransmits the failed CTUs. In an embodiment, the terminal MAC layer re-transmission mechanism operates at the message object fragment level. The MAC layer determines which MOFs were contained in the CTUs that failed, and then reschedules those MOFs for retransmission, along with other MOFs that have been generated since the failed CTUs were transmitted. This approach allows a flexible retry policy, allowing higher priority messages to pre-empt retries for lower priority message fragments.

In an embodiment, if the downlink reception of the acknowledgement bitmap was unsuccessful, then the terminal considers all associated CTUs to have failed. In an embodiment, the status of the link is validated via the channel state tracker prior to each transmission. If the CST does not report a valid status then transmission will be blocked until the CST returns to the valid state. At this point the terminal will be allowed to recommence transmission if it still has an active allocation for the current frame, otherwise it will need to request a new allocation.

Section 3.5: Downlink Data Transfer

The access node MAC layer receives data from a higher layer data source and sends it to an addressed terminal via the downlink physical layer described in Section 5. The downlink may also be used for multicast and broadcast transmissions. The downlink may carry user and network management data, and may also be used to provide feedback data to terminals, e.g. regarding channel tracking accuracy and SNR. Received data is processed by the terminal MAC layer and forwarded to higher layers.

In an embodiment the access node establishes a multicast session without requiring confirmation of session availability from terminals. Broadcast and multicast downlink traffic may be sent while the multicast session is active, using data (MSDUs) provided by higher layers, as shown in FIGS. 9a, 9b and 9c. In order to send unicast traffic to a terminal, the access node first establishes a session with the terminal, as described in Section 3.2.2.

The downlink acknowledgement mechanism is based upon a CTU success list maintained by the terminal MAC layer. The ACK information is sent by the receiving terminal to the access node using an uplink MMO. In an embodiment downlink CTUs are identified by a sequence number. A downlink ACK message provides the access node with a list of sequence numbers for CTUs successfully received by the terminal within the previous downlink frame period. In the TDD operating mode, the downlink ACK message is transmitted in the uplink portion of the current frame.

In one embodiment, the access node retransmits the failed CTUs. In an embodiment, the access node MAC layer re-transmission mechanism operates at the message object fragment level. The MAC layer determines which MOFs were contained in the CTUs that failed, and then reschedules those MOFs for retransmission, along with other MOFs that have been generated since the failed CTUs were transmitted. This approach allows a flexible retry policy, allowing higher priority messages to pre-empt retries for lower priority message fragments.

In one embodiment, the access node will allocate at least one uplink cell to the terminal so that the terminal can transmit a downlink ACK message. If the terminal has a current uplink allocation, then the access node does not need to perform a new allocation. In another embodiment, the terminal may transmit downlink ACK messages within the random access region, using the normal random access rules.

Section 3.6: Session Termination

A communications session is terminated when either receiver considers that the channel conditions are unable to support reliable communication. This will typically occur at the end of a pass in the case where the terminal and/or access node are mobile, as the received signal strength becomes too low.

In an embodiment the MAC layer monitors the state of the link and indicates to higher layers 362 when the link is no longer usable (ie session termination is determined 361) which then handles session termination 363. Determination of terminating the session is based upon one or more of:

a quality requirement on downlink channel parameter estimates, e.g. as indicated by the channel state tracker reporting a valid status;

a minimum receive SNR requirement; and/or a requirement on access node and terminal geometry/dynamics, e.g. minimum separation.

The terminal MAC layer maintains a session to an access node, and termination of the session indicates an end to radio communication with that access node until a new session is established. The access node MAC layer maintains sessions with one or more terminals with which it is communicating. Session termination in the case of an access node is with respect to a particular terminal. The session may be terminated independently by either participant. At termination, any incomplete MSDUs received (or transmitted) are forwarded (or returned) to the higher layers.

Section 4: Physical Layer Processing Overview

Figure 15:
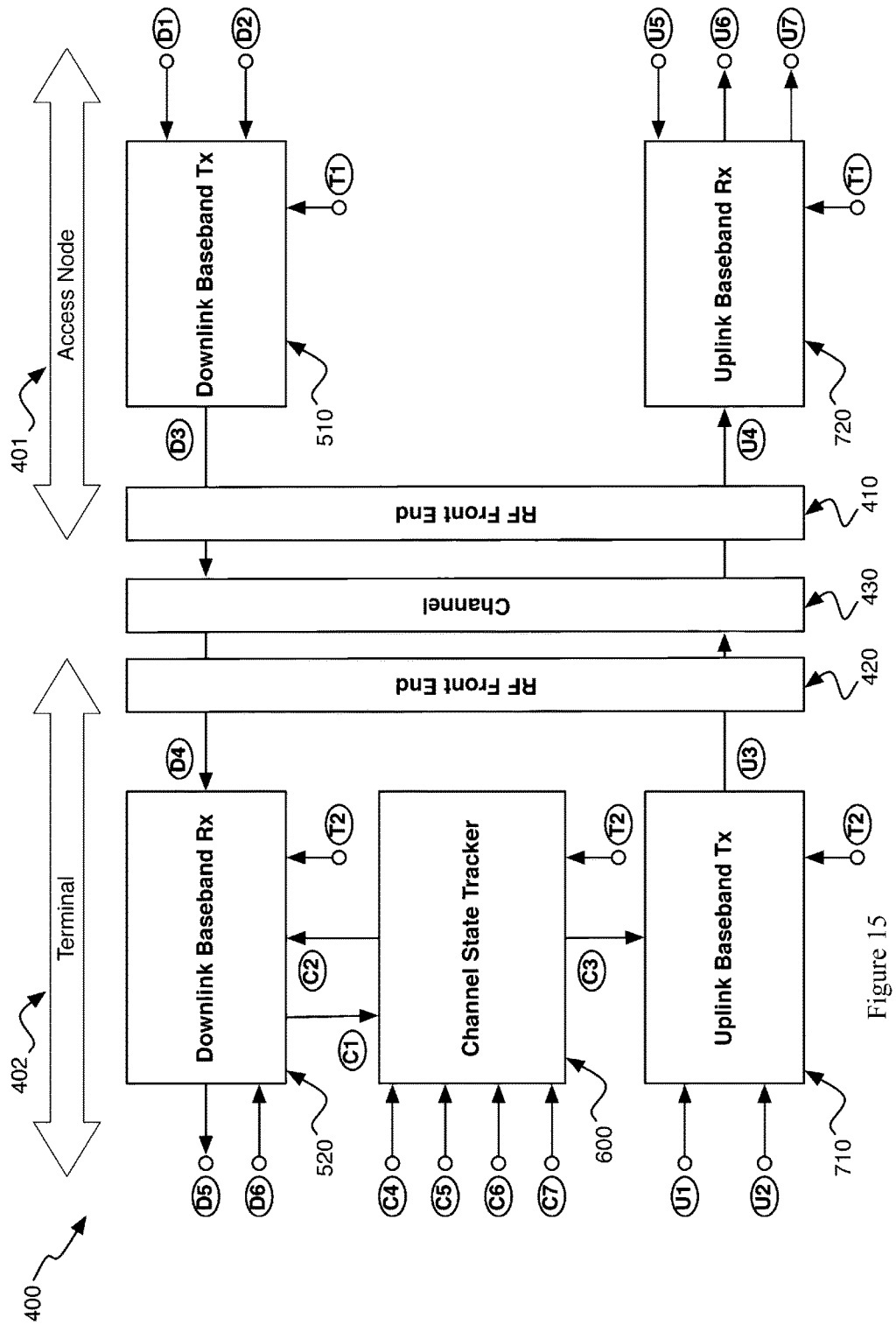
FIG. 15 shows a top level block diagram for the physical layer of the system in both uplink and downlink directions according to an embodiment.

FIG. 15 shows a top level block diagram for the physical layer 400 of the system in both uplink and downlink directions. The block diagram represents processing that occurs at both the terminal 402 and access node 401. A system wide timing (and optionally position) reference is provided to the physical layer 400 and MAC layer at both the access node (T1) and terminals (T2), e.g. via the global positioning system (GPS) or similar. A GPS-disciplined oscillator may also be used at the access node and/or terminals. In an embodiment at least the access node is equipped with a GPS-disciplined oscillator. Local position information may also be available at the terminal and/or access node, e.g. via GPS or programmed fixed coordinates.

The access node baseband transmitter 510 receives downlink source bits (D1) and uses these to generate the baseband downlink transmit signal (D3) according to downlink transmitter instructions (D2), such as modulation and coding scheme, frame format, and transmit power.

The access node RF front end 410 then converts the signal to the system carrier frequency and transmits it across the channel 430. The downlink signal is received by the terminal 120, converted to baseband by the user terminal RF front end 420, and delivered to the baseband receiver 520 for processing (D4). The baseband receiver 520 provides an estimate of the transmitted downlink source bits (D5), according to downlink Rx instructions (D6) such as downlink modulation and coding scheme, and frame format. The baseband receiver 520 also provides an (time-stamped) estimates of parameters pertaining to the channel and valid packet indicator as described in Section 5.2 (C1).

The terminal baseband transmitter 710 receives source bits (U2) and uses these to generate the baseband signal for transmission (U3) via the user terminal RF front end 420, according to uplink transmitter instructions (U1), such as modulation and coding scheme, frame format, transmit subcarriers, and transmit power. The uplink transmitter 710 pre-compensates for channel effects using predictive estimates obtained from the channel state tracker 600. The channel state tracker 600 generates downlink channel state predictions and valid status indicator (C2) and uplink channel state predictions and valid status indicator (C3) using channel estimates made available by the downlink receiver (C1). The channel state predictions may also be fed back to the downlink receiver 520 for use during acquisition. The MAC layer 302 triggers the channel state tracker 600 to generate channel state predictions (C7), at times when they are required by the uplink transmitter 710 or downlink receiver 520. The channel state tracker 600 optionally also uses information pertaining to the access node (C4), such as:

access node position, speed, acceleration, heading and trajectory;

access node transmit power; and system frequency offsets for the access node transmitter and receiver.

The channel state tracker 600 may also receive an indication of downlink packet validity from the MAC layer (C6). The channel state tracker is also provided with the value of local (terminal) system frequency offsets (C5).

The uplink signal is received by the access node 110, converted to baseband by the access node RF front end 410, and delivered to the baseband receiver 720 for processing (U4). The baseband receiver 720 provides an estimate of the transmitted source bits uplinked by each terminal (U6) according to uplink Rx instructions (U5), such as uplink modulation and coding scheme, frame format and subcarrier allocation. The receiver 720 also (optionally) provides uplink receiver information to the MAC layer (U7) 301, such as uplink channel parameter estimates, SNR and noise estimates.

Section 5: Downlink Physical Layer Processing

This section describes embodiments of waveform and receiver methods that provide efficient and reliable downlink data transfer. The techniques described also generate high quality estimates of downlink channel parameters at the terminal receiver 520. These channel estimates are sufficiently accurate to drive the channel state tracker and support operation of the multicarrier uplink physical layer. Alternative approaches to downlink, that are able to provide sufficiently accurate channel parameter estimates, may also be used to implement the system.

Section 5.1: Downlink Transmitter

Figure 16:
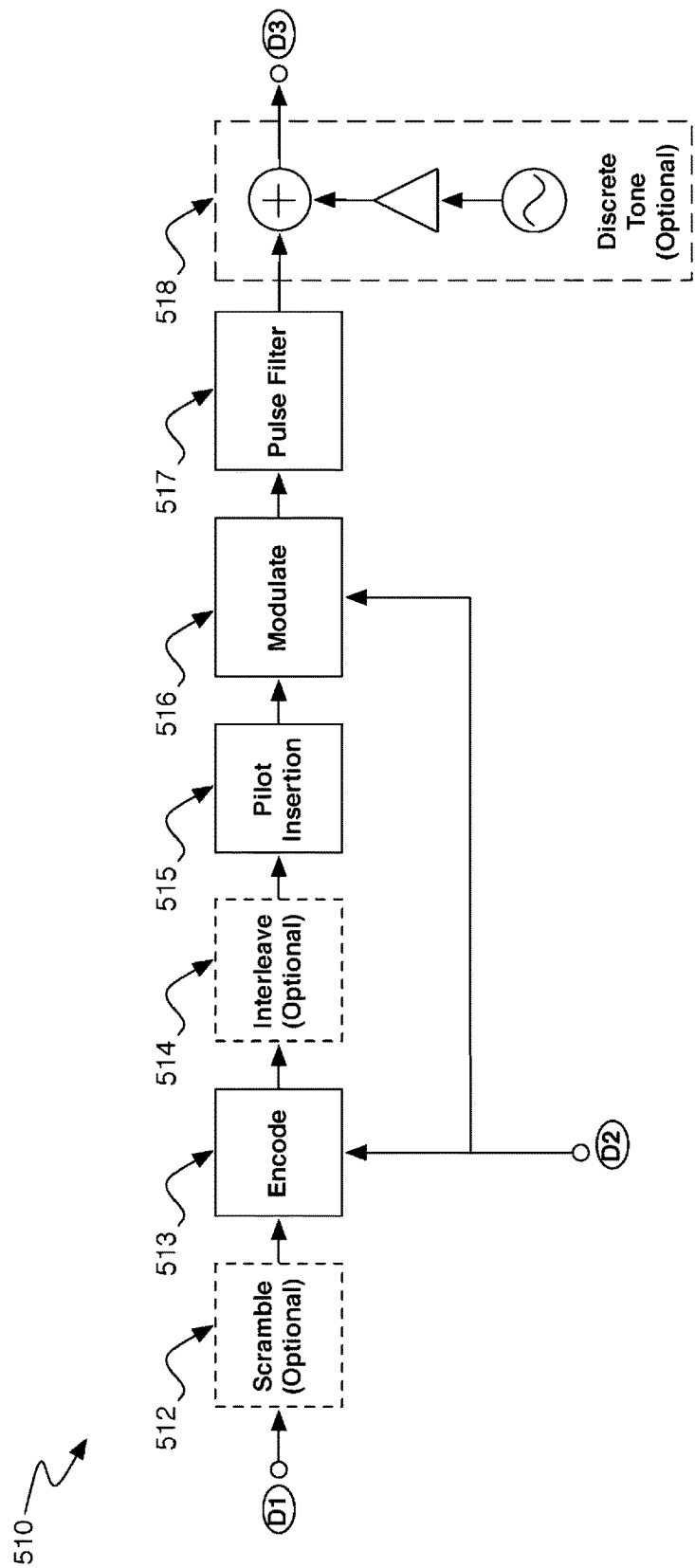
FIG. 16 shows a block diagram for an embodiment of the downlink baseband transmitter that appears in FIG. 15.

In one embodiment, the downlink is time slotted with slots having duration 250 ms, and the downlink transmitter outputs one packet per slot. FIG. 16 shows a block diagram for an embodiment of the downlink baseband transmitter 510 that appears in FIG. 15. Binary data is first optionally scrambled and then input to an error control encoder. The encoded data is then optionally interleaved. Pilot data is then inserted. The resulting signal is then modulated and a series of samples for transmission are generated using a pulse filter. Prior to transmission, a discrete tone (sinusoid) is optionally added to the signal. The resulting complex baseband signal D3 is then provided for transmission using standard methods (e.g. digital-to-analog conversion, filtering and modulation onto the selected carrier). These standard components are not shown. Each component of the baseband transmitter is described in detail below. Downlink Tx instructions D2 may be provided to any block of the transmitter, as required.

Section 5.1.1: Downlink Source Bits

In an embodiment the MAC layer delivers the physical layer a sequence of source binary digits (bits) for downlink D1. In one embodiment, the data is a sequence of 3960 bits.

Section 5.1.2: Scrambler

The optional scrambler 512 is a rate-1 code which is used to remove any structure that might be present in the original source data (e.g. long runs of zeros or ones). This is standard practice in digital communications. It assists with timing recovery and also decouples the spectral properties of the signal from the actual data. In one embodiment, the scrambler is additive, whereby the data sequence is added modulo-2 with the output of a linear feedback shift register with polynomial $x^7+x^4+1$.

Section 5.1.3: Encoder

The error control encoder 513 introduces redundancy to provide protection against noise during transmission. In one embodiment, the error control code is a rate 1/2 systematic irregular repeat accumulate code of H. Jin, A. Khandekar, and R. McEliece, "Irregular repeat-accumulate codes", In Proc. Int. Symp. on Turbo Codes & Rel. Topics, pages 1-8, 2000, where the degree sequence of the code is chosen using standard extrinsic information transfer (EXIT) chart methods to facilitate decoder convergence. The encoder may also insert one or more known bits into the data sequence prior to encoding (also called doping). This can assist the early iterations of the decoder. In one embodiment, the error control code is a low density generator matrix code. In this case, the optional interleaver may be omitted and the modulation may be selected as a recursive modulation, according to any of the methods described in WO2014094064. In one embodiment, the encoder selects the transmit encoding scheme based on instruction from the MAC layer. In an embodiment where the input data is length 3960, a rate 1/2 encoder will produce an encoded sequence of 7920 bits.

Section 5.1.4: Interleaver

An optional interleaver 514 re-orders (permutes) the output of the encoder. This permutation is known to the receiver, thus allowing de-interleaving to be performed at the receiver.

Section 5.1.5: Pilot Insertion

In order to facilitate initial acquisition at the receiver, pilot data (known to the receiver) is inserted into the data sequence by a pilot insertion module 515. In one embodiment, pilot data may be distributed throughout the data sequence. In one embodiment, the pilot data is a contiguous block of bits, prepended to the encoded (and interleaved) data sequence. In one embodiment, the pilot bit sequence contains approximately the same number of '0' and '1' bit values, and the values are approximately uniformly distributed through the sequence. In one embodiment, the pilot data is 60 bits long and consists of the following sequence:

100010100110010100001001000100010101001101100 011110001110001

In an embodiment, where the encoded data is 7920 bits, this results in an output sequence of 7980 bits.

Section 5.1.6: Modulator

The modulator 516 maps bits, or groups of bits onto a signalling constellation (a finite set of complex numbers— commonly referred to as quadrature amplitude modulation, or short, QAM). In one embodiment, the modulator is a Gray-mapped quaternary phase shift keyed (QPSK) modulator. In another embodiment the modulator supports multiple modulation schemes, e.g. M-PSK and M-QAM, where M denotes the number of points in the signal constellation. In an embodiment, the modulator selects the transmit modulation scheme based on instruction from the MAC layer via downlink transmit (Tx) instructions D2.

Section 5.1.7: Pulse Filter

The pulse filter 517 is used to shape the waveform for each symbol in order to obtain suitable spectral properties. In one embodiment, the pulse filter is a root-raised-cosine filter with roll-off $\beta=0.5$. In one embodiment, the root-raised-cosine filter is implemented using a finite duration impulse response with length L=7 symbols.

Section 5.1.8: Discrete Tone

The performance of the receiver depends on its ability to obtain estimates of the frequency and time offset of the downlink packet. In the context of a low earth orbit satellite system, the frequency offset may be relatively large. In order to facilitate initial estimation of this frequency offset, a discrete tone (sinusoid) is added to the modulated signal by a discrete tone module 518. In one embodiment, the phase of the tone is locked to the phase of the modulated signal. In one embodiment, the energy of the tone is minimised, such that the tone has sufficient power to make it distinguishable from the modulated signal components and noise at the receiver. In one embodiment, the discrete tone is at 0 Hz of the baseband signal and has power $-12$ dB with respect to the modulated signal components.

Alternatively, a different sequence (known to the transmitter and receiver) may be added by the discrete tone module 518 instead of a sinusoid, e.g. a particular spread-spectrum sequence such as an m-sequence. Alternatively, the discrete tone or sequence may not overlap with the data carrying signal. Instead, the discrete tone or sequence may be before and/or after the data carrying signal. This could be at the start and/or end of a slot or in a separate slot. In one embodiment, the downlink transmitter outputs at least one packet per frame. The packet acts as a beacon to announce the presence of the access node and allow the downlink receiver to provide an initial channel estimate.

Section 5.2: Downlink Receiver

The downlink receiver is responsible for the reception of packet transmissions from one or more access nodes, and for generating channel parameter estimates to be used during uplink pre-compensation. Downlink packets are transmitted synchronised to the GPS-based frame timing of the system, and thus packet timing can be determined at the receiver using a local GPS timing reference and the time offset estimation techniques described below. Using knowledge of the frame structure the receiver can be enabled only during slots that are deemed relevant to a terminal.

The receiver has the following operating modes:

Idle: In this mode the receiver is inactive.

Initialisation: In this mode the receiver searches for downlink transmissions and does not currently have channel parameter estimates. The downlink packet search is performed within the anticipated time-offset and frequency-offset space. For example, in the case of a satellite application, the expected ranges of Doppler shift, Doppler rate and time-offset are known based on orbital parameters. Slots used for the search can be restricted in order to minimise power consumption, e.g. to just use the beacon downlink slot of each system frame.

Tracking: In this mode the receiver has commenced receiving downlink transmissions. The receiver may use downlink channel estimates obtained from the channel state tracker to aid time-offset and frequency-offset estimation, e.g. by narrowing the search space based upon channel state predictions. Upon successful reception of a packet the receiver provides channel estimate updates to the channel state tracker.

In one embodiment, the downlink receiver generates and reports the following statistics and channel parameter estimates on a per packet basis. These measurements are used by the channel state tracker to predict uplink channel conditions.

timing offset estimate, $\hat{\tau}_d$;
frequency offset estimate, $\hat{\omega}_d$;
estimate of rate of change of frequency offset, $\hat{v}_d$;
complex gain estimate, $\hat{\alpha}_d$;
SNR estimate, $\hat{\gamma}_d$;
valid packet indicator; and
slot number and time-stamp of packet reception.

Figure 17:
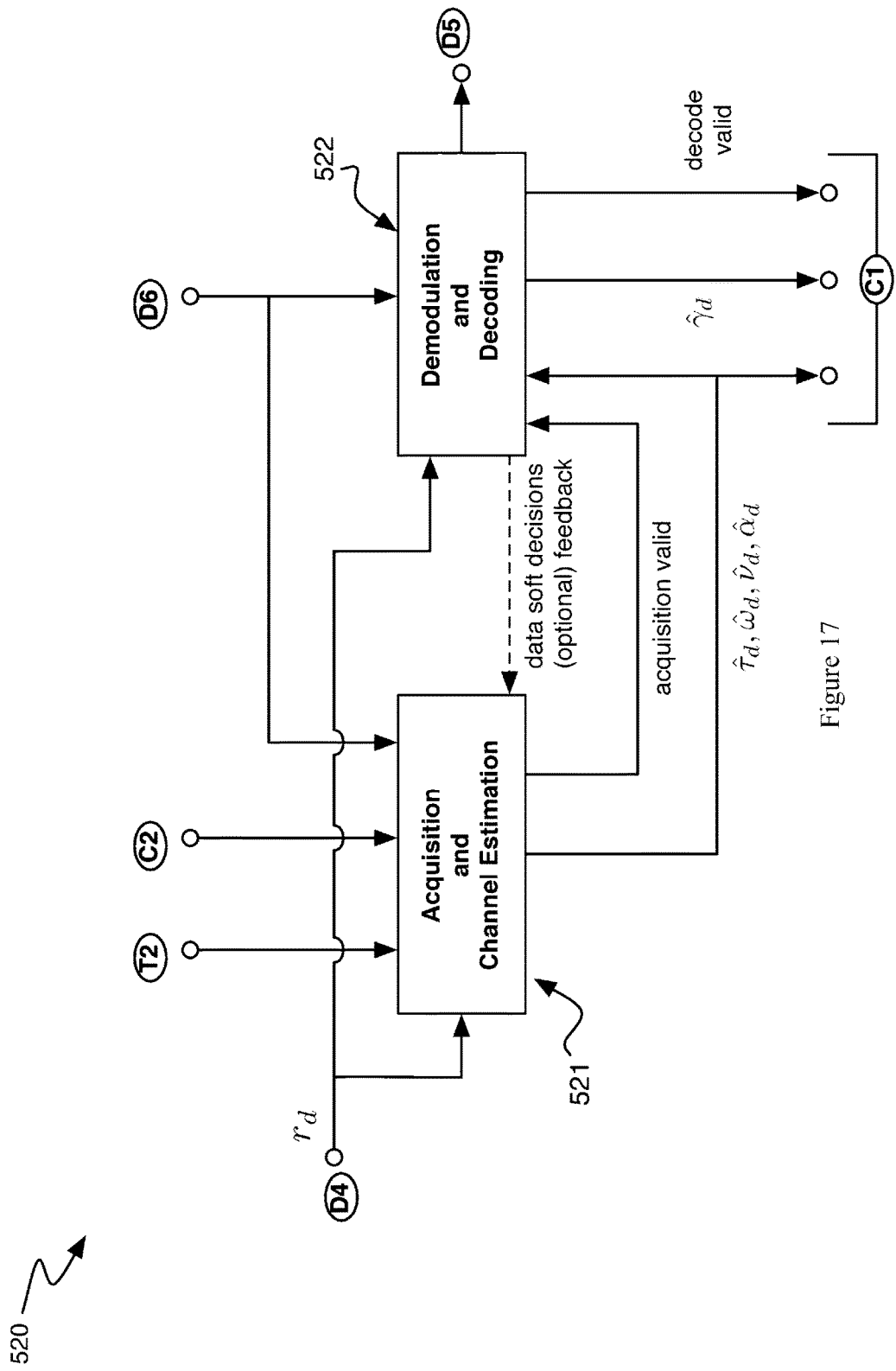
FIG. 17 shows a block diagram for an embodiment of the downlink baseband packet receiver that appears in FIG. 15.

FIG. 17 shows a block diagram for an embodiment of the downlink baseband packet receiver 520 that appears in FIG. 15, which takes as input the oversampled received signal $r_d$. Baseband receive samples are first used to acquire the packet and estimate downlink channel parameters. If acquisition is declared valid then the receiver proceeds to demodulate and decode the packet, using the channel parameter estimates. The decoder outputs downlink bit values, along with an indicator of their validity, and an SNR estimate. If the decoder declares success then the downlink bits are passed to the MAC layer. The channel parameter and SNR estimates may also be passed as metadata to the MAC layer at this point. Upon decoder success the channel parameter estimates are also passed to the channel state tracker. Downlink Rx instructions may be provided to any block of the receiver, as required.

In another embodiment, the initial channel parameter estimates produced by the acquisition and channel estimation block in FIG. 17 are further refined after decoding. In this case, a soft decoder is used as described in Section 5.2.8 and the soft-decisions provided by this decoder are converted to soft-estimates of the complex transmit samples. Treating these soft-estimates as a sequence of known pilot samples, more accurate estimates of the channel parameter offsets are obtained from the received signal samples, e.g. by minimising the sum of the squared errors between the received signal samples and the soft-estimates of transmit samples. Using the resulting refined estimates, the received signal samples are offset-corrected and provided to the soft-decoder a second time in order to obtain an improved decoder output. The refinement may also be an iterative process, where soft decoding and refinement of the estimates are carried out repeatedly, alternating until the decoder declares success or no further refinement of the channel estimates is detected. Refined channel parameter estimates are also made available to the channel state tracker. In one embodiment a channel parameter refinement step is conducted after the decoder declares that a valid code word has been obtained, prior to providing the estimates to the channel state tracker.

Section 5.2.1: Acquisition and Channel Estimation

Figure 18:
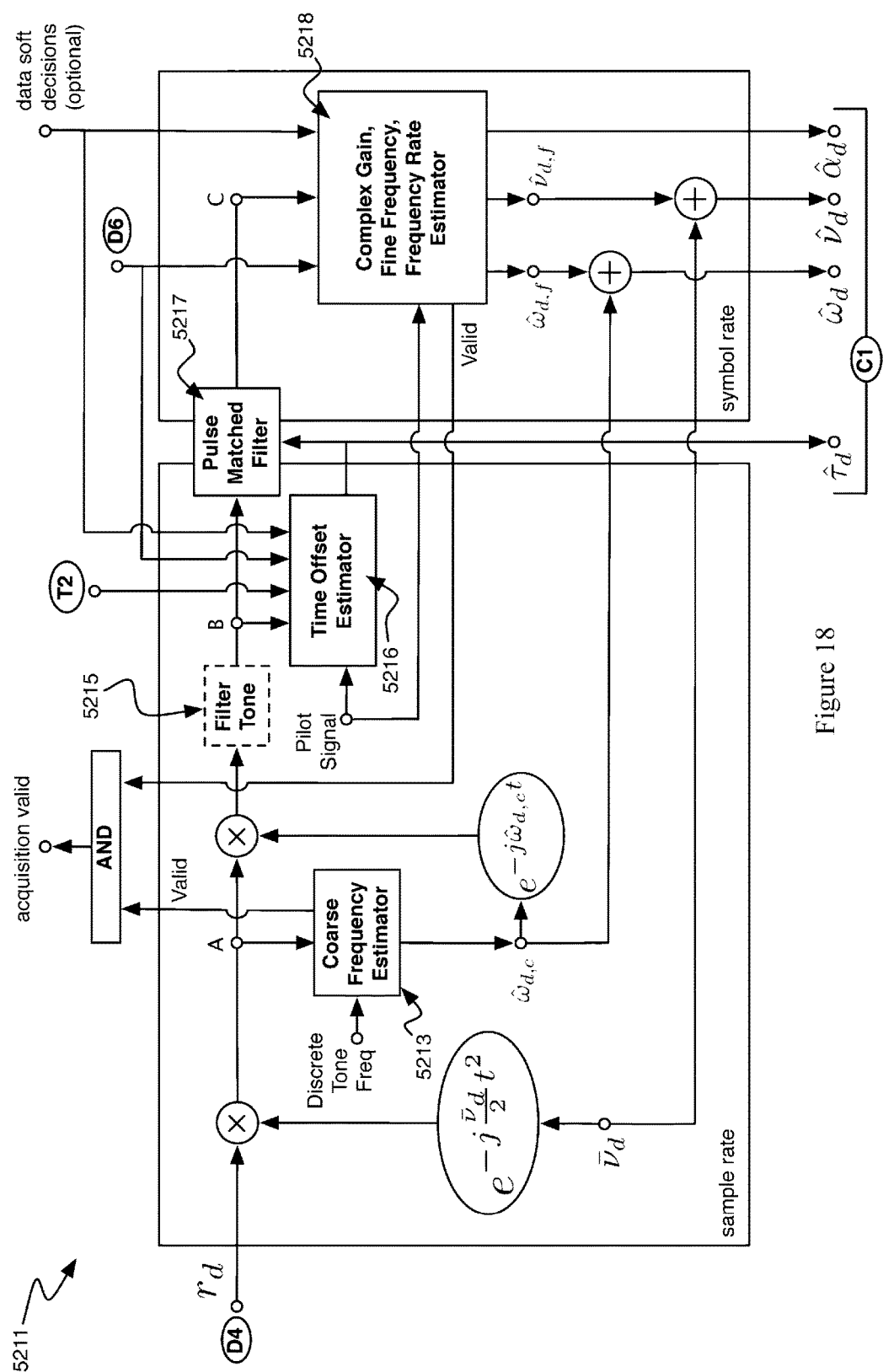
FIG. 18 provides a block diagram for the acquisition and channel estimation module when running in initialisation mode according to an embodiment.

FIG. 18 provides a block diagram for the acquisition and channel estimation module 521 when running in initialisation mode 5211 according to an embodiment. It takes as input the oversampled receive packet signal $r_d$ D4 and provides channel parameter estimates C1.

A range of possible Doppler rates (Hz/second) may be known a-priori. For example, in a satellite application, the Doppler rate is always negative, with known maximum magnitude. In other scenarios, this rate is unknown, or is assumed to be zero. In such cases, the initial Doppler rate compensation can be omitted. Let $\bar{v}_d$ be an indicative value of the Doppler rate (radians per second squared). This value may for example be the midpoint of the range of Doppler rate, or some other value. As a first step, this Doppler rate is removed from the received signal, by multiplying the received samples with a complex exponential $e^{-j\bar{v}_d t^2/2}$ where the time index t takes values corresponding to the sample instances.

Following this initial compensation for Doppler rate, an initial, coarse frequency offset estimate $\hat{\omega}_{d,c}$ (radians/second) is computed by Coarse Frequency Estimator 5213. This coarse offset is removed via multiplication by $e^{-j\hat{\omega}_{d,c} t}$. Optionally, the discrete tone (Section 5.1.8) may be removed by a filter 5215. The resulting signal is then fed into a time offset estimator 5216, which estimates the temporal offset $\hat{\tau}_d$ with respect to the slot boundary. The signal is then fed into a pulse matched filter 5217 which is matched to the transmission pulse (Section 5.1.7). The sample instance of this filter 5217 is set according to the time offset estimate $\hat{\tau}_d$. The resulting symbol-rate signal is then used to find estimates of the complex signal gain $\hat{\alpha}_d$, refinements to the frequency offset (fine frequency offset $\hat{\omega}_{d,f}$), and the frequency rate of change $\hat{v}_{d,f}$ by a fine frequency estimator module 5218. Then the final estimate of the frequency offset $\hat{\omega}_d$ is obtained as the sum of the initial coarse frequency offset and the fine frequency estimate. The final estimate of the frequency rate of change is obtained as the sum of the initial coarse frequency rate of change and the fine frequency rate of change estimate.

In one embodiment, the acquisition coherently removes, i.e. subtracts, the discrete tone after obtaining all estimates. In this case, the filter tone block 5215 is disabled and after estimation, the tone is cancelled coherently at sample level from the signal at point B or at symbol level from the signal at point C. In another embodiment, estimation of complex gain, fine frequency and frequency rate is performed iteratively with the coherent cancellation of the tone. In one embodiment, the filter tone block 5215 is not present. The discrete tone 518 at 0 Hz offset from the baseband signal (described in Section 5.1.8) is removed using a DC blocking operation. DC blocking is performed on samples prior to their input into the matched filter, by first calculating the complex mean across the samples, and then subtracting the mean from all samples. In one embodiment, during the initialisation mode of receiver operation, $\bar{v}_d$ is initialised to the midpoint of the expected range of Doppler rate. The acquisition valid signal is generated via a logical AND operation on the valid signal coming from the coarse frequency estimator 5213 and the fine frequency estimator module 5218, i.e. the output indicates valid if and only if both inputs indicate valid.

Figure 19:
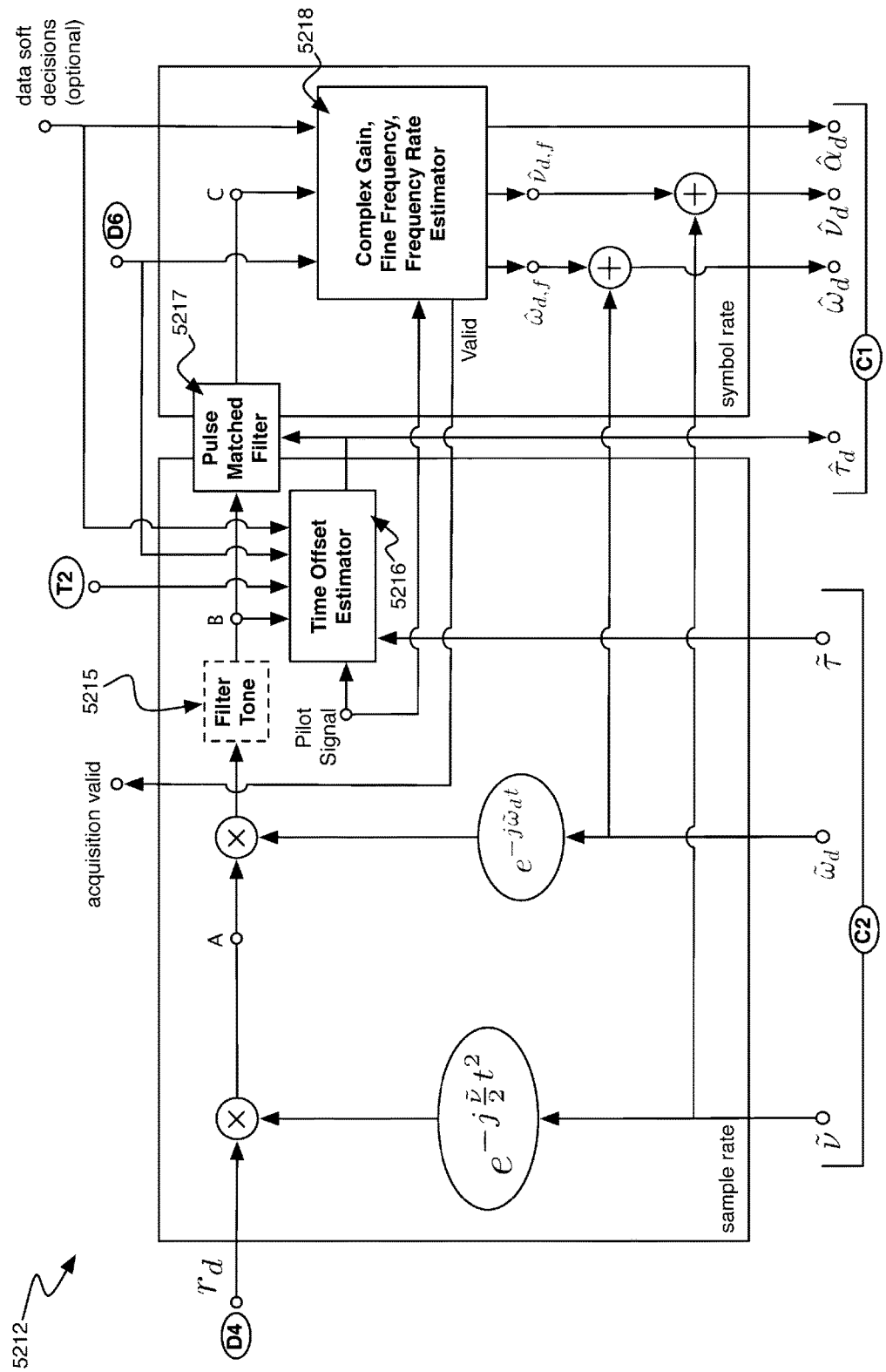
FIG. 19 provides a block diagram for the acquisition and channel estimation module when running in tracking mode according to an embodiment.

The receiver may be operated in initialisation mode at all times, or it may be switched to tracking mode. In an embodiment, the receiver switches from initialisation mode to tracking mode upon receiving a valid status indication from the channel state tracker 600. FIG. 19 provides a block diagram for the acquisition and channel estimation module 5212 when running in tracking mode 5212. During tracking mode the coarse frequency estimator block 5213 is disabled. Channel state tracker frequency offset prediction $\tilde{\omega}_d$ replaces $\hat{\omega}_{d,c}$, and frequency rate prediction $\tilde{v}$ replaces $\bar{v}_d$. In tracking mode the time offset search window can be narrowed using a time offset estimate provided by the channel state tracker. During tracking mode the frequency rate search window may be narrowed given an expected reduction in frequency rate estimation error. If the channel state tracker 600 indicates an invalid status then the receiver is switched back to initialisation mode 5211. The reversion to initialisation mode may be made on the first indication of invalid channel state tracker status, or on some number of indications occurring within a window of time.

In one embodiment, the coarse frequency estimator 5213 is implemented via maximisation of the periodogram of the signal at point A in FIG. 18. This is facilitated by the presence of the discrete tone which was added at the transmitter. The periodogram may be implemented via a zero-padded discrete Fourier transform, where the amount of zero padding is chosen to improve the frequency resolution (by providing narrower frequency bins in the Fourier transform). The transform may be implemented directly, or using a fast Fourier transform, and may even exploit the zero-padding to achieve a further complexity reduction. The maximisation may be performed in two steps, first obtaining the bin of the periodogram with largest absolute value, and secondly performing a numerical optimisation (e.g. Newton's method) in the region of that frequency. The coarse frequency estimate $\hat{\omega}_{d,c}$ is obtained from the frequency corresponding to the maximum absolute value of the periodogram by subtracting the frequency of the discrete tone.

In one embodiment, the maximum absolute value of the periodogram is compared to a threshold value. If the maximum does not exceed the threshold then the receiver declares an invalid acquisition. The receiver may elect to cease processing the packet upon declaration of an invalid acquisition. The threshold value may be chosen such that a periodogram bin meeting the threshold criteria represents a frequency component of sufficient power to make it distinguishable from the modulated signal components and noise at the receiver. In one embodiment, the frequency range for the maximisation may be restricted to allow for acquisition in specific frequency intervals or avoid acquisition in specific frequency intervals. In one embodiment, this approach is used to exclude one or more frequency intervals within which a spurious tone has been declared. Exclusion may be static, e.g. in order to avoid a frequency stable spurious tone introduced by the RF front end, or it may be dynamic. In the event of an invalid packet being declared downstream in the receiver, e.g. due to decoder failure, the coarse frequency estimator may be re-run while excluding the frequency estimate corresponding to the invalid acquisition. This process may be performed iteratively until a valid acquisition is declared; or the maximum absolute value of the periodogram is no longer greater than the threshold value; or some maximum number of iterations has been performed. In one embodiment, one or more frequency intervals may be excluded by excluding the corresponding bins of the periodogram from the maximisation when obtaining a coarse frequency estimate as described above.

The time offset estimator 5216 provides packet start time estimate, with respect to the slot boundary determined from the synchronised system time. In one embodiment, where the signalling constellation is any form of phase shift keying, the time offset estimator 5216 is implemented using any of the methods described in WO2014127407, taking the signal at point B in FIG. 18 as input. This method uses both the known pilot data, and the unknown data portion of the signal to provide an estimate of the time offset. In another embodiment the time offset estimator is implemented using methods described M. Oerder and H. Meyr, "Digital filter and square timing recovery", IEEE Trans. Commun., 36(5):605-612, May 1988.

In one embodiment, the complex signal gain, as well as a refinement of the frequency offset and the rate of change of the frequency offset are estimated from the signal at point C in FIG. 18 by the fine frequency estimator module 5218 as follows.

A two-dimensional grid of frequency offset values and frequency rate values is pre-defined. This grid may be uniform or non-uniform. The minimum/maximum and spacing of this grid in each of the dimensions is chosen ahead of time, and may be determined by experiment. For each grid point $\omega_{d,f}, v_{d,f}$ the signal from C is adjusted by multiplication by $e^{-j\omega_{d,f} t - j v_{d,f} t^2/2}$ where t is now the time instances of symbols. This compensated signal is then provided to any of the algorithms from WO2014089634. This returns estimates of the gain and phase of the signal, as well as the corresponding squared error. If this squared error is lower than any of the squared errors resulting from previous grid points, then the complex gain estimate $\hat{\alpha}_d$ is set to this current estimate. The value of the squared error is also stored as the best value seen so far. The fine frequency estimate $\hat{\omega}_{d,f}$ and frequency rate estimate $\hat{v}_{d,f}$ are set to the corresponding values for that grid point. The algorithm then proceeds to the next grid point. When all grid points have been considered, the process concludes, and the algorithm outputs the values $\hat{\alpha}_d, \hat{\omega}_{d,f}, \hat{v}_{d,f}$. In one embodiment, upon completion the squared error corresponding to the complex gain estimate is compared to a threshold value. If the squared error is lower than the threshold value then the output is declared valid, otherwise it is declared invalid. The threshold value is chosen ahead of time, and may be determined by experiment.

Figure 20:
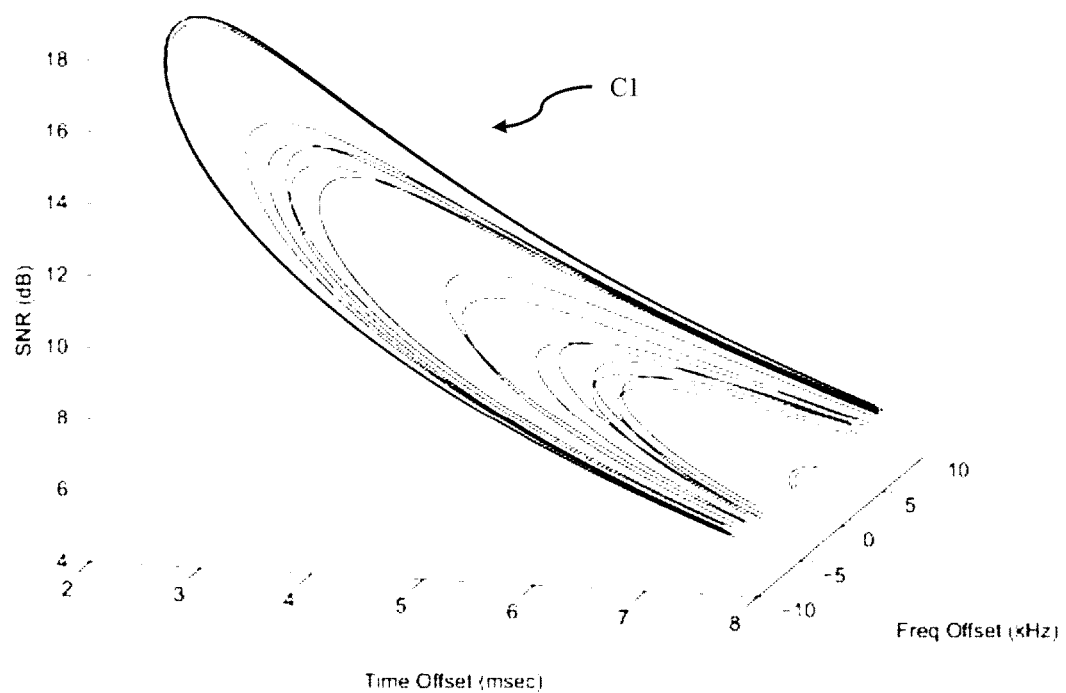
FIG. 20 plots the channel parameters collected from a simulation representing a set of randomly distributed terminals during a satellite pass according to an embodiment.

The channel parameters and hence channel parameter estimates (C1), e.g., complex gain, time offset, frequency offset and frequency rate of change, may be correlated due to the underlying propagation characteristics and geometrical model. This correlation can be exploited for complexity reduction and/or improved estimation accuracy in the acquisition stage, e.g. by limiting the set of frequency/time pairs that need to be considered. In an embodiment a satellite based access node transmits information on its orbital state from time to time, which may serve as input into this process. The orbital state data may also be used to estimate pass durations and predict start times of future satellite passes. In an embodiment the orbital state data carries two line element (TLE) set information for the satellite. FIG. 20 plots the channel parameters C1 collected from a simulation representing a set of randomly distributed terminals during a satellite pass. A circular polar orbit at height of 600 km is assumed at carrier frequency 400 MHz. All terminals are assumed to transmit at the same power. The correlations between frequency offset, time offset and SNR are clearly visible.

Section 5.2.2: Demodulation and Decoding

Figure 21:
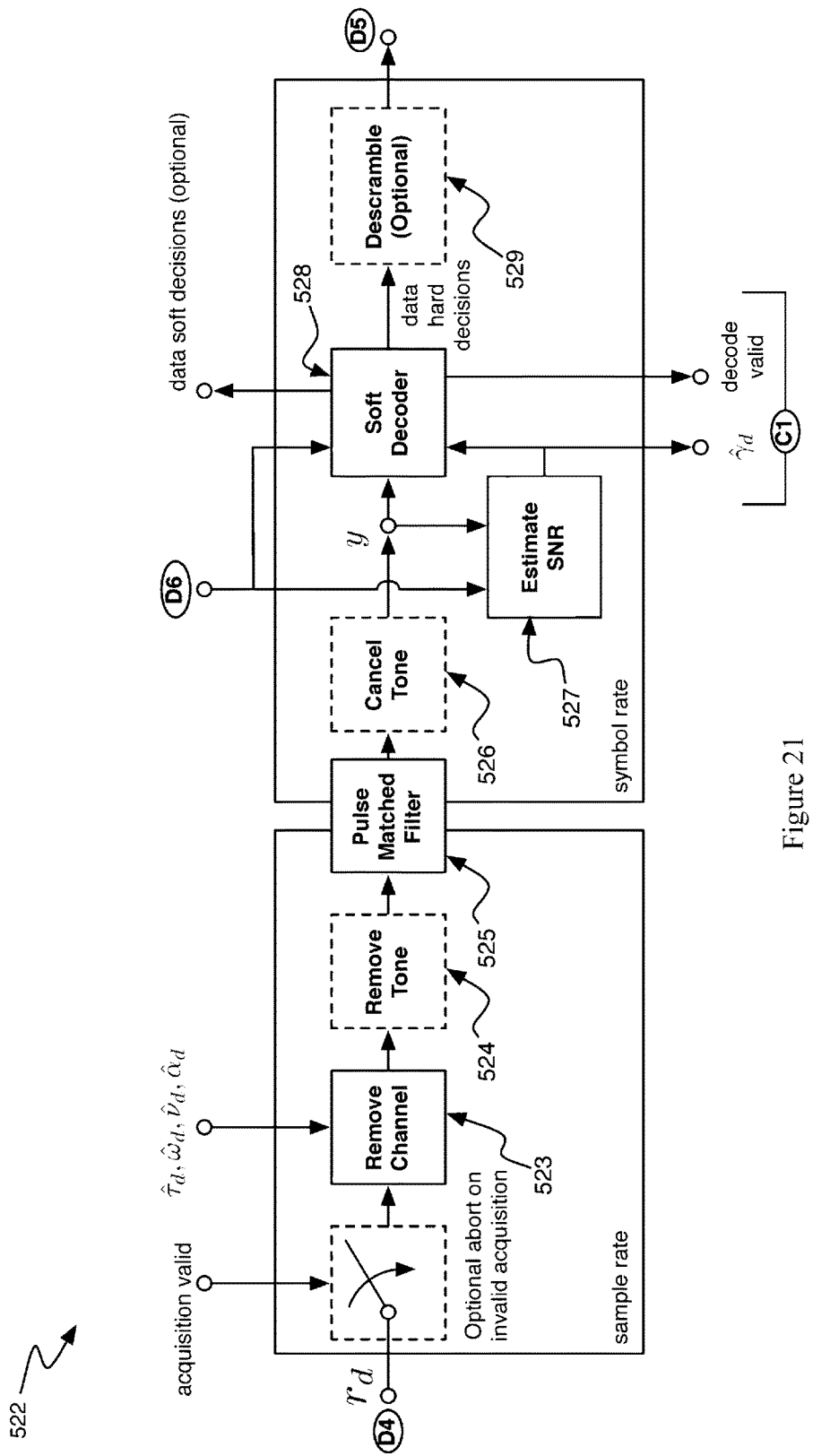
FIG. 21 shows an example of a block diagram of the demodulation and decoding module according to an embodiment.

A block diagram of the demodulation and decoding module 522 is shown in FIG. 21. The module takes as input the oversampled receive packet signal $r_d$ and channel parameter estimates. It provides hard decisions of the decoded downlink data D5, an indication of decoder success, and an SNR estimate.

Section 5.2.3: Remove Channel

The remove channel block 523 removes the (estimated) effect of the communications channel. The estimated frequency offset and frequency rate are removed by multiplying the signal $r_d[t]$ by the complex sinusoid to obtain $r'_d[t] = r_d[t] e^{-j(\omega_d t + v_d t^2/2)}$, where the discrete time index t indexes samples. In an embodiment, compensation for complex gain is performed in two steps, first rotating $r'_d[t]$ samples to obtain $r'_d[t] e^{-j\angle \hat{\alpha}_d}$, where $\angle \hat{\alpha}_d$ is the phase of $\hat{\alpha}_d$. The rotated samples are then output from the channel removal block. The second step is performed at the output of the pulse matched filter, where symbols are divided by the magnitude of the complex gain estimate, $|\hat{\alpha}_d|$. In another embodiment, compensation for complex gain is performed by dividing $r'_d[t]$ samples by the complex gain estimate $\hat{\alpha}_d$. The estimated time offset $\hat{\tau}_d$ can be regarded as consisting of two components: an integer number of sample periods and a fractional (sub-sample) offset. The integer number of sample periods is removed via a re-indexing of the time index. The remaining fractional offset is accounted for in the sample timing of the pulse matched filter.

Section 5.2.4: Remove Tone

The remove tone block 524 is optional and removes the discrete tone at the sample rate. In one embodiment, the discrete tone is removed via a non-coherent filter. In another embodiment, the discrete tone is subtracted coherently (cancellation). In one embodiment the discrete tone at 0 Hz offset from the baseband signal (described in Section 5.1.8) is removed using a DC blocking operation. DC blocking is performed on samples prior to their input into the matched filter by first calculating the complex mean across the samples, and then subtracting the mean from all samples.

Section 5.2.5: Pulse Matched Filter

The pulse matched filter 525 converts the signal to one sample per symbol. It is a digital filter matched (impulse response is the time-reversed complex conjugate) to the pulse shape chosen in Section 5.1.7. The sampling instance is chosen according to the fractional offset component of $\hat{\tau}_d$.

Section 5.2.6: Cancel Tone

Optionally, if the discrete tone has not been removed before the Pulse Matched Filter, it can be removed at a symbol level by coherent cancellation by the cancel tone module 526. This reduces the complexity compared to a coherent cancellation at the sample rate.

Section 5.2.7: Signal-to-Noise Ratio Estimation

The output of the Pulse Matched Filter (optionally after tone cancellation) is used to estimate the signal-to-noise ratio (SNR). As described in Section 5.1.5, the transmitted signal carries pilots and data. Let $\mathcal{P}$ be the set of symbol indices describing the positions of the pilot symbols and let $\mathcal{D}$ be the set of symbol indices that correspond to the data symbols. The transmitted symbols are therefore estimated as $$\hat{u}[i] = \begin{cases} p[i], & i \in \mathcal{P} \\ \hat{s}[i], & i \in \mathcal{D} \\ 0, & \text{otherwise} \end{cases},$$

where p[i] are the pilot symbols known to the receiver and ŝ[i] are the hard decisions for the unknown data symbols. The sets $\mathcal{P}$ and $\mathcal{D}$ are disjoint, i.e. $\mathcal{P} \cap \mathcal{D} = \emptyset$ and the union $\mathcal{P} \cup \mathcal{D}$ contains all those indices where symbols are transmitted.

The SNR is estimated at symbol level after removing the effect of the data modulation (modulation stripping). Modulation stripping is achieved by multiplying the symbol sequence at the output of the pulse matched filter y[i] with the complex conjugate of û[i]. The SNR estimate, denoted $\hat{\gamma}_d$, is then obtained as $$\hat{\gamma}_d = \frac{|\hat{\mu}_d|^2}{\hat{\sigma}_d^2},$$

where $\hat{\mu}_d$ and $$\hat{\sigma}_d^2$$

are estimates of the mean and variance of the modulation-stripped signal y[i]û*[i] and are given by $$\hat{\mu}_d = \frac{1}{|\mathcal{S}|} \sum_{i \in \mathcal{S}} y[i]\hat{u}^*[i],$$

$$\hat{\sigma}_d^2 = \frac{1}{|\mathcal{S}|} \sum_{i \in \mathcal{S}} |y[i]\hat{u}^*[i] - \mu|^2,$$

where $\mathcal{S} \subseteq \mathcal{P} \cup \mathcal{D}$. That is, a subset or all pilot and data symbols may be used.

In other embodiments, the SNR estimator $\hat{\gamma}_d$ may be replaced by any known SNR estimator.

Section 5.2.8: Soft Decoder

The soft decoder module 528 performs the following steps:

1. Remove Pilots

Any pilot sequence introduced in the transmit sequence is removed by deleting the pilot positions.

2. Demodulate

The demodulator computes soft decisions (log-likelihood ratios) of the corresponding bits based on the complex received symbol and the transmit modulation scheme. These computations can be performed, e.g., using the maximum-aposteriori (MAP) algorithm or any approximation of this algorithm.

In an embodiment the MAC layer instructs the demodulator on the modulation scheme that was used at the transmitter.

3. De-Interleave

De-interleave the sequence of soft decisions, where the de-interleaver performs the inverse of the interleaver operation performed at the transmitter.

4. Forward Error Correction

Decode the forward error correcting code (Section 5.1.3) using a decoding algorithm which may include but is not limited to the sum-product algorithm, the BCJR algorithm or any of their approximations. The decoding algorithm may take soft-inputs, or hard-inputs (obtained by taking hard decisions on the demodulator soft decisions). The decoding algorithm may provide soft or hard outputs. In one embodiment, the soft-outputs of the decoder are extrinsic log-likelihood ratios (or any other representation, e.g., probabilities). In another embodiment, the soft-outputs of the decoder are a-posteriori log-likelihood ratios or a function of extrinsic and a-posteriori log-likelihood ratios.

The decoder provides hard-decisions of the data, either directly (in the case of a hard-output decoder), or by taking hard decisions on the outputs of a soft-output decoder.

In an embodiment the MAC layer instructs the decoder on the coding scheme that was used at the transmitter.

5. Decode Valid

An indication is derived from the decoding result to declare that a valid codeword has been obtained. In an embodiment, a valid decode is declared if there are no unsatisfied parity-check equations of the error correcting code.

Section 5.2.9: Descramble

The descramble operation reverses the effect of the optional scrambler described in Section 5.1.2. In an embodiment, the descrambler 529 performs the same function as the scrambler 512 and uses the same polynomial sequence. If a valid decode is declared then the decoder output (or optional scrambler output), that is the decoded downlink bits, D5 is passed to the MAC layer for further processing, and potentially further checking and validation. In the valid decode case the channel state tracker 600 is notified and provided with the receiver channel and SNR estimates made from the packet. If the receiver is in initialisation mode, after decoder success (or optional notification of passing further validation from the MAC layer) it may then be switched into tracking mode. Once in tracking mode the receiver may then use channel predictions from the channel state tracker 600 to process subsequent packets.

Section 6: Channel State Tracker

The channel state tracker 600 is responsible for tracking and predicting channel state parameters, using time and frequency estimates obtained from the downlink channel, as shown in FIG. 15. Channel parameter estimates delivered to the channel state tracker from the downlink receiver are time-stamped, with the time of packet reception. The uplink channel access method requires accurate estimation of the channel propagation delay and frequency offset behaviour. The channel state tracker 600 has the role of generating these estimates on demand, and ensuring that they are of sufficient quality to meet uplink transmission requirements. The MAC layer 302 controls the channel state tracker 600 and triggers it to generate channel state predictions as required, based on knowledge of frame structure and the state of transmitter and receiver operation.

The channel state tracker 600 performs the following functions:

Tracking and Estimation of Time Offset:
  Stores and tracks the current channel time offset (propagation delay) estimate and quality measure.
  Predicts channel propagation delay estimates and quality metrics, based on currently available estimates and their quality.
Tracking and Estimation of Frequency Offset:
  Stores and tracks estimates for the current channel frequency offset and rate-of-change of frequency offset, along with corresponding quality measures.
  Stores and tracks estimates for frequency offsets coming from system components.
  Predicts estimates and quality metrics for frequency offset and frequency rate of change.
Valid Status Indicator:
  The channel state tracker 600 generates a valid status indicator output, by comparing time and frequency prediction quality metrics to uplink operational tolerance requirements. The requirements may be stored locally, and updates may be issued by the access node. Declaration of valid status indicates that the channel state tracker is able to provide estimates of sufficient accuracy to permit uplink operation.

In addition to channel parameter estimates provided by the receiver 520, the channel state tracker 600 may also use access node and terminal GPS position, and information on system dynamics, to aid the parameter estimation process. For example, knowledge of relative velocity between access node and terminal may aid prediction of the Doppler induced frequency offset, and other mobility related channel offsets such as time offset due to the unknown distance between the receiver and terminal. The channel state tracker could also be provided with information about oscillator drift or a lack of clock synchronisation. The channel state tracker may also exploit correlation between channel parameters, as described in Section 5.2.1. A further indication of downlink packet validity (beyond that provided by the PHY) is optionally provided by the MAC layer 302, e.g. indication that the downlink packet content has passed a cyclic redundancy check. In an embodiment the channel state tracker 600 discards downlink channel parameter values that have come from an invalid packet.

Section 6.1: Tracking and Estimation of Time Offset

Channel time offsets are estimated using GPS time, and time offset estimates coming from the reception of downlink packets. In an embodiment GPS time synchronisation is achieved through synchronisation with the 1PPS output from a local GPS receiver, while also maintaining an estimate of the timing error variance. In one embodiment, the time offset estimate output from the downlink receiver provides a packet start time estimate, with respect to the synchronised system time. This estimate will have an error variance, based upon the signal quality of the received packet, and the system time error variance. The system time reference, combined with the packet start time estimate is used to generate a channel time offset prediction, $\tilde{\tau}$, and its variance.

Channel propagation behaviour is assumed to be uplink/downlink symmetric. Hence the propagation delay for both uplink and downlink directions is predicted using estimates coming from the downlink receiver. In an embodiment the predictions are extrapolated using current and past estimate values. Only one downlink packet is required to obtain an initial time offset estimate, however the propagation delay may change during operation, e.g. during a satellite pass. In an embodiment the time offset is predicted using a plurality of received downlink packets to track time offset and rate of change of time offset behaviour. In one embodiment, the future value of time offset parameters is estimated based upon current and past values using an autoregressive filter, or similar known methods. Filter coefficients may be chosen such that higher weight is applied to more recent input values and/or those coming from downlink packets that exhibited higher SNR. In another embodiment the future value of time offset parameters is estimated using a Kalman filter/predictor. In one embodiment, the channel time offset prediction, $\tilde{\tau}$, provided by the channel state tracker is used to pre-compensate the start of uplink transmissions. The channel time offset prediction is also fed back to the downlink receiver to aid acquisition and channel estimation during tracking mode.

Section 6.2: Tracking and Estimation of Frequency Offset

In one embodiment, the channel state tracker 600 obtains time-stamped per-packet frequency offset and frequency rate of change estimates from the downlink receiver. The channel state tracker uses these estimates to predict the downlink frequency offset $\tilde{\omega}_d$. It uses knowledge of frequency offsets caused by system components to predict the channel induced frequency offset $\tilde{\omega}$ and rate of change of frequency offset $\tilde{v}$. It also provides predictions for pre-compensation of uplink frequency offset in two components, representing the whole number of uplink subcarrier spacings, $\tilde{N}_D$, and the additional fractional component $\tilde{\omega}_{DF}$.

Channel propagation behaviour is assumed to be uplink/downlink symmetric. Hence frequency offset estimates for both uplink and downlink directions are predicted using estimates coming from the downlink receiver. In an embodiment the predictions are extrapolated using current and past estimate values. In one embodiment, the channel state tracker is provided with estimates of system frequency offset parameters pertaining to transmit and receive chains of the access node and terminal, e.g. as caused by the combined effect of one or more electronic components. The system frequency offset estimates are stored by the channel state tracker. The values may be static, or may be updated from time to time. Terminal system frequency offset estimates may be updated using local information, e.g. by monitoring the local frequency reference with respect to a GPS receiver. Updates to system frequency offset estimates pertaining to the access node may be provided by the access node via the downlink, e.g. within the administration packet data.

In one embodiment, the channel state tracker adjusts the estimate of the frequency offset induced by the channel, by removing downlink system frequency offset estimate components from the frequency offset estimate provided by the downlink receiver, as follows:

$$\tilde{\omega} = \tilde{\omega}_d - \tilde{\omega}_{AN,Tx} - \tilde{\omega}_{T,Rx}$$

where $\tilde{\omega}_d$ is the frequency offset estimate provided by the downlink receiver, $\tilde{\omega}_{AN,Tx}$ is the system frequency offset estimate for the access node transmitter, and $\tilde{\omega}_{T,Rx}$ is the system frequency offset estimate for the terminal receiver. In one embodiment, the channel state tracker includes uplink system frequency offset estimates when generating the uplink frequency offset prediction for pre compensation $$\hat{\omega}_u = \hat{\omega} + \hat{\omega}_{T,Tx} + \hat{\omega}_{AN,Rx}$$

where $\hat{\omega}_{T,Tx}$ is the system frequency offset estimate for the terminal transmitter, and $\hat{\omega}_{AN,Rx}$ is the system frequency offset estimate for the access node receiver.

The uplink frequency offset prediction is separated into two components, representing the whole number of uplink subcarrier spacings, $\tilde{N}_D$, and the additional fractional component $\tilde{\omega}_{DF}$, as follows $$\tilde{N}_D = \mathcal{Q}(\tilde{\omega}_u, 2\pi f_\Delta)$$

$$\tilde{\omega}_{DF} = \mathcal{R}(\tilde{\omega}_u, 2\pi f_\Delta)$$

where $f_\Delta$ is the subcarrier spacing (Hz) as discussed in Section 7.1.7. The operation $\mathcal{Q}(A, B)$ returns the quotient of A divided by B. The operation $\mathcal{R}(A, B)$ returns the remainder of A divided by B.

In one embodiment, the frequency offset predictor assumes a fixed rate of change of frequency offset, and thus a linear change in frequency offset with time. Estimates for the channel induced frequency rate of change, $\tilde{v}$, are calculated using the frequency offset estimates from recently received downlink packets (e.g. the change in frequency between the last two received packets) after adjusting for downlink system frequency offsets as described above. In this case, the channel state tracker can support embodiments of the downlink receiver that do not provide an estimate of frequency rate of change. In one embodiment, prediction is performed by applying estimates for frequency rate of change to the frequency offset estimates. In one embodiment, the system frequency offsets are assumed to hold constant values, until a point in time when updated values are provided. In this case the rate of change of frequency offset is assumed to be induced by the channel. Channel symmetry is assumed and the channel induced rate of change of frequency offset $\tilde{v}$ is used for the both uplink and downlink.

Another embodiment permits dynamic system frequency offsets. The channel state tracker stores and predicts estimates for the system frequency offsets, and uses the estimates when generating predictions for frequency offset and rate of change of frequency offset. In this case separate estimates for uplink and downlink rate of change of frequency offset may be generated. In one embodiment, the future value of frequency parameters is estimated based upon current and past values using an autoregressive filter or similar known methods. Filter coefficients may be chosen such that higher weight is applied to more recent input values and/or those coming from downlink packets that exhibited higher SNR. In another embodiment the future value of frequency offset parameters is estimated using a Kalman filter/predictor. Error variances on predictions are also calculated, providing an indication of the quality of the predictions.

In one embodiment, the access node persistently transmits during the first two downlink slots of every frame, thus the longest period over which the channel state tracker will need to predict future frequency offsets will be a frame period, minus two slots periods. In a system that employs frequency division duplexing for uplink/downlink, the channel state tracker translates frequency offset estimates to the target uplink frequency. In one embodiment the frequency offset and frequency rate of change predictions provided by the channel state tracker are used for uplink pre-compensation. Specifically, $\tilde{N}_D$ is used in the selection of uplink subcarriers, and $\tilde{\omega}_{DF}$ and $\tilde{v}$ are used by the channel pre-compensation block. In one embodiment, the predicted downlink frequency offset, $\tilde{\omega}_d$, and frequency rate of change, are also fed back to the downlink receiver to aid acquisition and channel estimation during tracking mode.

Section 7: Uplink Physical Layer Processing

Figure 22:
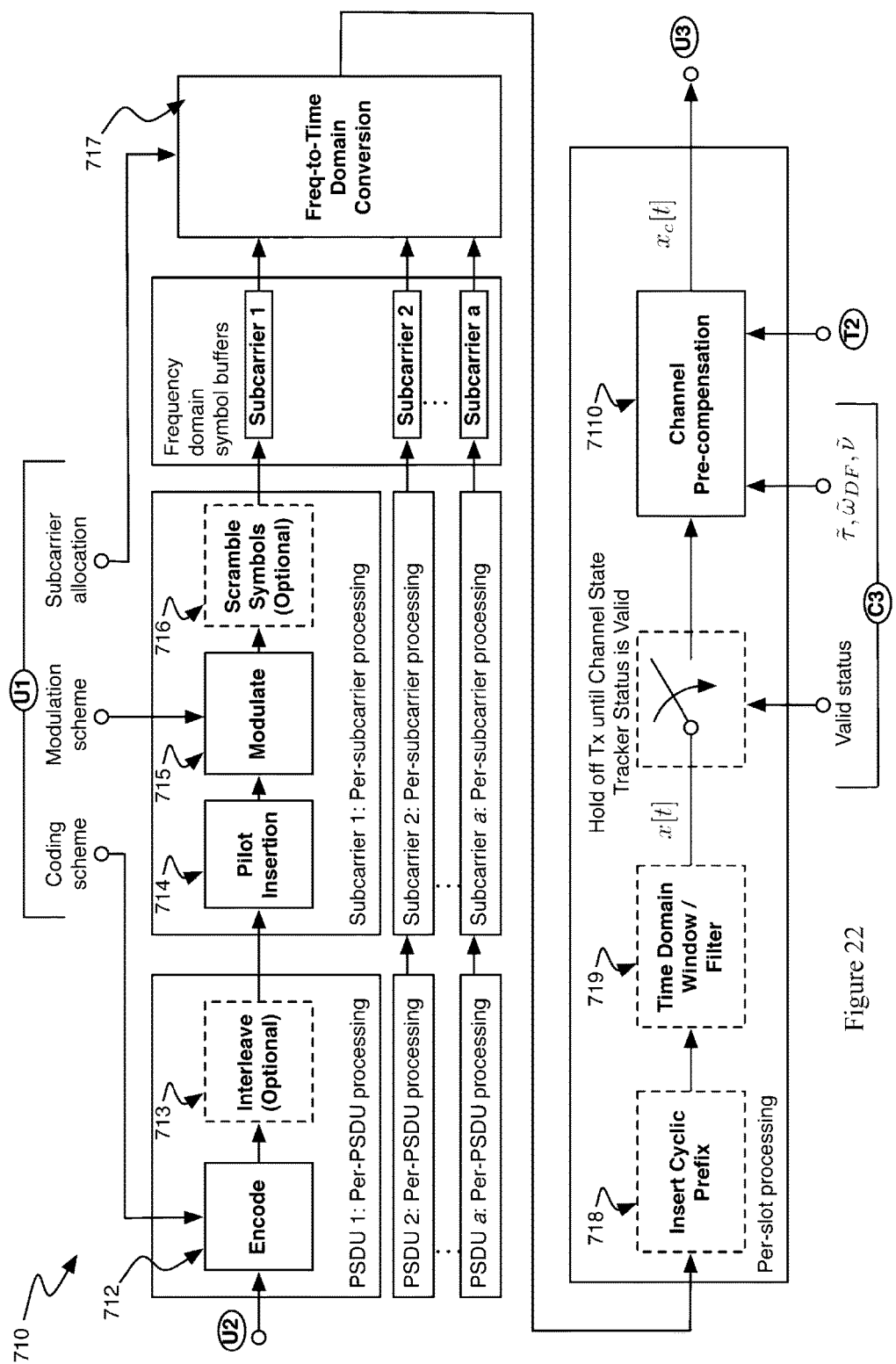
FIG. 22 shows a block diagram for an embodiment of the terminal uplink baseband transmitter that appears in FIG. 15.

In one embodiment, the uplink uses an access node coordinated orthogonal frequency division multiple access (OFDMA) transmission scheme, with channel pre-compensation performed at the terminal transmitter using outputs from the channel state tracker. FIG. 22 shows a block diagram for an embodiment of the terminal uplink baseband transmitter 710 that appears in FIG. 15. The transmitter accepts uplink source bits for transmission to the access node. The physical layer provides a physical layer service data unit (PSDU) interface to receive blocks of source bits from the MAC layer. One or more PSDUs may be transmitted in a single uplink packet (time slot). In an embodiment PSDU length is chosen such that each PSDU is transmitted using a single subcarrier. In other embodiments PSDU length may be increased by transmitting across multiple subcarriers. The MAC layer instructs the physical layer on subcarriers and time slots to be used for transmission, as described in Section 3. Uplink Tx instructions may be provided to any block of the transmitter, as required.

Section 7.1: Uplink Transmitter

In one embodiment, the uplink is time slotted. Time slot duration may be chosen based on the expected behaviour of the communications channel, e.g. considering the coherence time of the channel. In an embodiment time slots are chose to have duration 250 ms, and the uplink transmitter outputs one (optionally multicarrier) packet per slot. Other embodiments may use a different slot time duration, such as 50 ms, 100 ms, 150 ms or 200 ms. FIG. 22 shows a block diagram for an embodiment of the uplink baseband transmitter 710. Binary source data is input to an error control encoder on a per-PSDU basis. Encoded data for each PSDU is (optionally) interleaved. Pilot data is inserted on a per-subcarrier basis. The resulting signal is then modulated and (optionally) scrambled. The process is repeated for all PSDUs, resulting in a set of buffers that contain frequency domain symbols, with one buffer per subcarrier. The frequency domain symbol buffers are then converted to the time domain. Time domain packet processing comprises (optional) cyclic prefixing, (optional) time domain windowing/filtering, and channel pre-compensation. The resulting complex baseband signal is then provided for transmission using standard methods (e.g. digital-to-analog conversion, filtering and modulation onto the selected carrier). These standard components are not shown. Each component of the baseband transmitter is described in detail below.

Section 7.1.1: Uplink Source Bits

In one embodiment, the MAC layer 302 delivers the physical layer one or more sequences of source bits (PSDUs) for uplink. In an embodiment, each PSDU is a sequence of 440 bits. In one embodiment, the source bits may be scrambled prior to encoding, as described in Section 5.1.2.

Section 7.1.2: Encoder

The error control encoder introduces redundancy to provide protection against noise during transmission. In one embodiment, the error control code is a rate 1/2 systematic irregular repeat accumulate code disclosed in H. Jin, A. Khandekar, and R. McEliece. Irregular repeat-accumulate codes. In Proc. Int. Symp. on Turbo Codes & Rel. Topics, pages 1-8, 2000, where the degree sequence of the code is chosen using standard EXIT chart methods to facilitate decoder convergence. The encoder may also insert one or more known bits into the data sequence prior to encoding (also called doping). This can assist the early iterations of the decoder. In one embodiment, the error control code is a low density generator matrix code. In this case, the optional interleaver may be omitted and the modulation may be selected as a recursive modulation, according to any of the methods described in WO2014094064. In one embodiment, the encoder selects the transmit encoding scheme based on instruction from the MAC layer. In an embodiment, where the input data is length 440, a rate 1/2 encoder will produce an encoded sequence of 880 bits.

Section 7.1.3: Interleaver

An optional interleaver 713 re-orders (permutes) the output of the encoder. This permutation is known to the receiver, thus allowing de-interleaving to be performed at the receiver.

Section 7.1.4: Pilot Insertion

In order to facilitate channel estimation and correction at the receiver, pilot data (known to the receiver) is inserted into the data sequence by pilot insertion module 714. In one embodiment, pilot data is distributed throughout the data sequence, with the distribution chosen to aid estimation of residual frequency offset at the receiver. In one embodiment 48 bits of pilot data are used per-subcarrier. In one embodiment, the (optional) downstream symbol scrambler is present and constant valued '1' pilot bits are inserted prior to modulation, thus resulting in constant pilot symbol values at the symbol scrambler input. The final value of modulated pilot symbols is then set by the scrambler. In another embodiment, the downstream symbol scrambler is not present. In this case the pilot bit values are set using a sequence that results in equivalent modulated pilot symbol values to that described for the case of symbol scrambling, noting dependence on subcarrier number. The pilot bit values may be generated offline and stored in a lookup table, or generated at transmit time using a linear feedback shift register.

Figure 23:
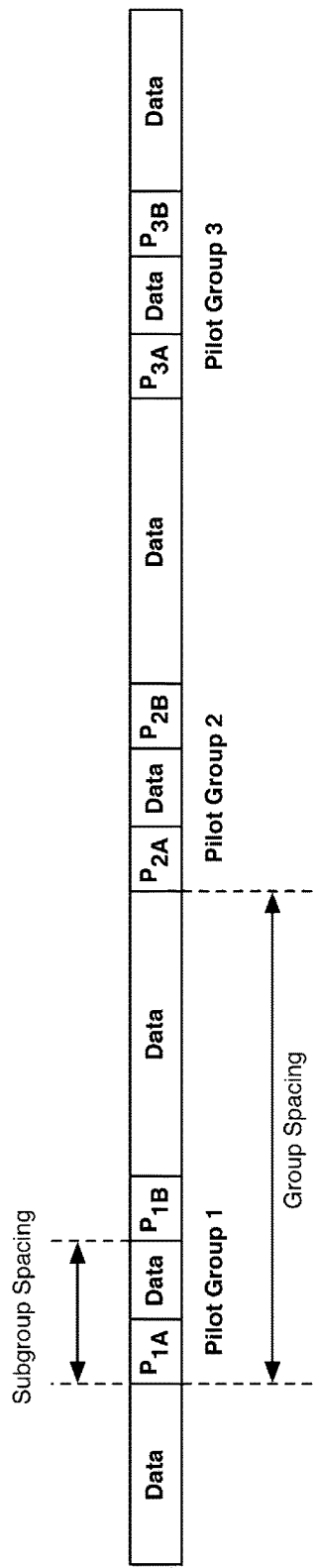
FIG. 23 shows pilot bits distributed at the modulator input such that modulated pilot symbols are output in three groups, separated by data symbols according to an embodiment.

In one embodiment pilot values are chosen to target low peak to average power ratio (PAPR) when more than one subcarrier is active at the transmitter, e.g. via offline generation of pilot sequences and selection of the sequences that exhibit the lowest PAPR. In an embodiment where the encoded data is 880 bits, pilot insertion of 48 bits results in an output sequence of 928 bits. In one embodiment, pilot bits are modulated onto QPSK pilot symbols. In one embodiment, pilot bits are distributed at the modulator input such that modulated pilot symbols are output in three groups, separated by data symbols, as shown in FIG. 23. Each group of pilots is separated into two subgroups, labelled $P_{GA}$ and $P_{GB}$ for group G. Pilot group and subgroup spacings are chosen to target an achievable range of frequency offset estimation at the receiver, as described in Section 7.2.4. In one embodiment, the transmit sequence has length 464 symbols, with pilots located at the following symbol positions (indexed from 0):

Group 1: 70-73, 102-105;
Group 2: 214-217, 246-249; and
Group 3: 358-361, 390-393.

In this case, the inter-group spacing is 144 symbols and the spacing between subgroups is 32 symbols.

Section 7.1.5: Modulator

The modulator 715 maps bits, or groups of bits onto a (QAM) signalling constellation. In one embodiment, the modulator is a Gray-mapped QPSK modulator. In another embodiment the modulator supports multiple modulation schemes, e.g. M-PSK and M-QAM, where M denotes the number of points in the signal constellation. In one embodiment, the modulator selects the transmit modulation scheme based on instruction from the MAC layer. In an embodiment, where the modulator input is 928 bits, a QPSK modulator output of 464 symbols is produced.

Section 7.1.6: Symbol Scrambler

Data symbols are optionally scrambled with a complex scrambling sequence by symbol scrambler 716. In an embodiment symbols are scrambled with a pseudo-random QPSK sequence unique to the subcarrier being transmitted, thus also generating a unique pilot symbol sequence per subcarrier. In an embodiment a binary scrambling sequence is obtained from a pseudo-random binary sequence (PRBS) generator, e.g. using as a linear feedback shift register with polynomial $x^7+x^4+1$. The receiver referenced target subcarrier index is used to initialise the scrambler, thus producing a unique sequence for each subcarrier. Scrambler output bits are read in pairs, and mapped onto a QPSK scrambling symbol. The scrambling symbol is then multiplied by the modulator output symbol. This effectively rotates the phase of each symbol by 0, $\pm\pi/2$, or $\pi$. In an embodiment the scrambled output symbol is obtained efficiently by re-assigning real and imaginary components of the input symbol and sign flipping as follows. Let scrambler output bits $b_1$ and $b_2$ be the first and second bits from the PRBS output pair respectively and apply the transform (phase spin) to the complex input symbol a+jb shown in Table 2.

TABLE 2

| SYMBOL SCRAMBLER OPERATION. | | | | |
|---|---|---|---|---|
| $b_1$ | $b_2$ | Rotation | Real out | Imag out |
| 0 | 0 | 0 | a | b |
| 0 | 1 | $\pi/2$ | −b | a |
| 1 | 0 | $-\pi/2$ | b | −a |
| 1 | 1 | $\pi$ | −a | −b |

At the receiver, the inverse of the scrambling operation is applied in order to obtain the unscrambled data and pilot symbols. Unscrambling is performed by flipping the $b_1b_2$=01 and $b_1b_2$=10 entries in Table 2, thus reversing the roles of $b_1$ and $b_2$. In an embodiment where the modulator output has length 464 symbols the scrambler outputs 464 symbols modified by the scrambling sequence.

Section 7.1.7: Frequency-to-Time Domain Converter

The scrambled modulated symbols for all subcarriers form a set of frequency domain symbol buffers. In one embodiment, PSDU length is chosen such that each PSDU is transmitted using a single subcarrier. In other embodiments a single PSDU may be transmitted across multiple subcarriers. If the length of the frequency domain buffer corresponding to the PSDU does not populate an integral number of subcarriers in the uplink packet then the buffer may be padded with redundant or randomly generated symbols.

In an embodiment the physical layer receives instruction from the MAC layer on the set of subcarriers that have been allocated to the terminal for uplink transmission, and the transmit modulation and coding scheme for each. Frequency domain symbol buffers are assigned to subcarriers within the allocation. The frequency-to-time domain converter block 717 combines the symbols targeting each subcarrier to produce a time domain OFDM symbol. Each symbol modulates an orthogonal subcarrier of frequency specified by the (signed) subcarrier number n. The frequency of each subcarrier relative to the system operating channel centre frequency is $f_n = n \times f_\Delta$, where $f_\Delta$ is the subcarrier spacing (Hz). At each symbol index k, the resulting time domain OFDM symbol for $0 \leq t < 1/f_\Delta$, generated using frequency domain symbols $X_{k,n}$ at active subcarrier indices n, is $$x_k(t) = \Sigma_{subcarriers\,n} X_{k,n} e^{j2\pi f_n t} \qquad (1)$$

An embodiment of a single carrier transmitter is realised through application of (1).

Another embodiment uses an inverse fast Fourier transform (IFFT) to generate the time domain waveform. This offers flexible support for the number of active subcarriers. The subcarrier number, n, determines the frequency index on the input of the IFFT at which the frequency domain symbol buffer output is placed. Other known frequency-to-time domain conversion techniques may also be applied. A reduced complexity IFFT may be used to exploit the fact that only a subset of subcarriers requires modulation, e.g. for an N point IFFT with a active subcarriers out of N, complexity can be reduced to $\mathcal{O}(N\log a)$ in comparison to $\mathcal{O}(N\log N)$. In an embodiment, the subcarrier spacing is 2 kHz. A 32-point IFFT with a sampling rate of 64 kHz is used to generate the 2 kHz subcarriers. In an embodiment where the modulator/scrambler output has length 464 symbols, the output of the frequency-to-time domain converter block is a series of 464 time domain OFDM symbols.

Section 7.1.8: Cyclic Prefix Insertion

The (optional) cyclic prefix insertion block 718 copies samples from the end of each OFDM symbol and prepends them to the symbol, as is standard practice for OFDM transmission. The length of the cyclic prefix is typically chosen according to the delay spread of any expected multipath. In an embodiment, the cyclic prefix also provides robustness to symbol timing misalignment at the receiver, and hence receiver requirements are considered when choosing the length of the cyclic prefix. Moreover, the guard between symbols provided by the cyclic prefix reduces potential inter-symbol interference that may result from time domain windowing/filtering. At the output of the block the cyclic prefixed symbols are concatenated together to produce a continuous time domain signal. In an embodiment, for a 32-point IFFT with 64 kHz sampling rate, a cyclic prefix length of 2 samples (31.25 μs) is chosen.

Section 7.1.9: Time Domain Windowing/Filtering

The (optional) time domain windowing/filtering block 719 applies either time domain windowing or FIR filtering to smooth symbol transitions. This operation reduces out-of-band emissions. In one embodiment, this block applies a time domain symbol-transition window between adjacent time domain OFDM symbols, as output from the cyclic prefix insertion block. A raised-cosine window is applied to the L samples at the start and end of each symbol. The previous symbol is cyclic-extended and then shaped with the transition window before combining with the shaped start of the current symbol. In one embodiment the cyclic prefix length and the window overlap duration are the same. The cyclic prefix region of the current symbol includes the cyclic prefix shaped by the window (ramping up), plus the cyclic extension of the previous symbol, shaped by the window (ramping down). Thus symbol transitions are complete within the cyclic prefix region of each symbol. In one embodiment with a cyclic prefix length of 2 samples, a window overlap duration of L=2 samples is chosen.

Section 7.1.10: Channel Pre-Compensation

The channel pre-compensation block 7110 uses channel parameter estimates provided by the channel state tracker to counteract uplink channel effects. Frequency shift and rate pre-compensation are performed on the discrete time domain transmit signal x[t] via complex multiplication with a unit-amplitude phasor. The phase process of the phasor is set to remove the uplink pre-compensation values for the fractional component of frequency offset, $\tilde{\omega}_{IF}$, and frequency rate, $\tilde{v}$, provided by the channel state tracker. The frequency compensated discrete time domain uplink signal $x_c[t]$ is generated by $$x_c[t] = x[t] e^{-j(\tilde{\omega}_{DF} t + \tilde{v} t^2 / 2)},$$

where the discrete time index t indexes samples.

The frequency compensated signal is output to the transmitter front end at a time that compensates for the estimated channel delay provided by the channel state tracker. Therefore a nonzero delay estimate will cause the terminal to transmit the packet early with respect to the system-wide slot timing reference. In an embodiment with slot time 250 ms, an inter-slot guard time is provided, and all terminals compensate transmission timing such that packets arrive aligned at the receiver 1.75 ms after the slot timing boundary.

Section 7.2: Uplink Receiver

The uplink receiver is responsible for demodulating and decoding a multicarrier uplink signal originating from one or more terminals. The uplink waveform design enables efficient receiver implementation at the access node. This feature is particularly valuable when the access node is located onboard a satellite. Channel pre-compensation is performed at the terminals, using accurate estimates coming from the downlink receiver and channel state tracker. The uplink signal requires only minor residual frequency offset and complex gain correction. The receiver performs these functions using low complexity independent subcarrier channel estimation and correction.

The access node is responsible for subcarrier allocation, and therefore has knowledge of the active subcarrier set. This allows the receiver to be designed such that only active subcarriers need to be processed, allowing power to be saved in lightly loaded systems. The uplink receiver generates the following channel parameters. Each active subcarrier may originate from a different terminal, and thus the receiver outputs per-subcarrier channel parameter estimates for each packet.

residual frequency offset estimate, $\hat{\omega}_u$;
estimated rate of change of residual frequency offset, $\hat{v}_u$;
complex gain estimate, $\hat{\alpha}_u$;
SNR estimate, $\hat{\gamma}_u$;
decode valid indicator;
slot number; and
subcarrier number.

In one embodiment, per-terminal channel parameter estimates are generated for one or more of residual frequency offset, estimated rate of change of residual frequency offset, complex gain and SNR. The per-terminal channel parameter estimate is obtained by calculating the average of the per-subcarrier channel parameter estimate over one or more of the subcarriers allocated to the terminal. In an embodiment, the uplink channel parameter estimates are used for system optimisation and tuning purposes, as described in Section 9.

Figure 24:
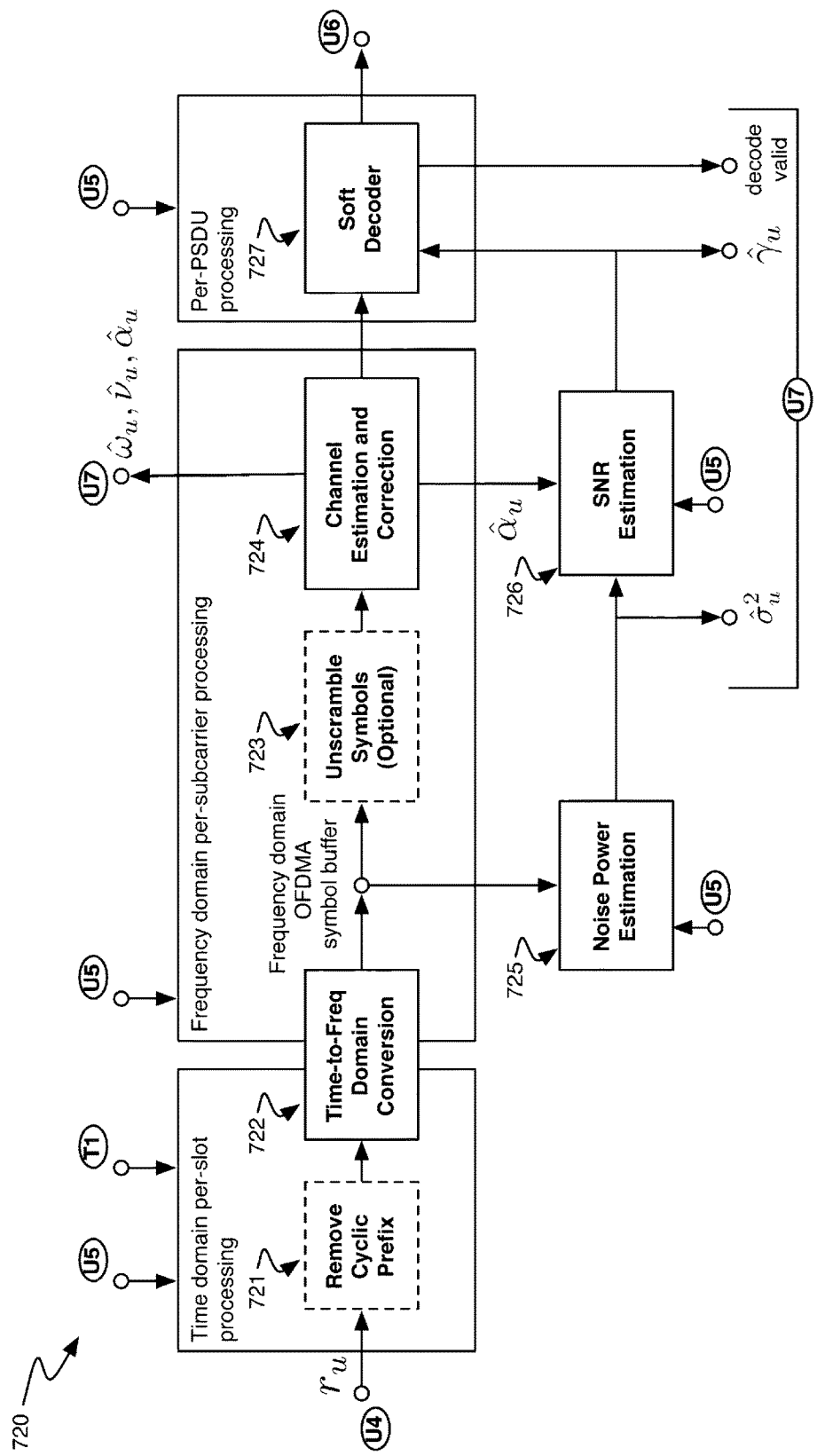
FIG. 24 shows a block diagram for an embodiment of the uplink baseband multicarrier packet receiver.

FIG. 24 shows a block diagram for an embodiment of the uplink baseband multicarrier packet receiver 720, which takes as input the oversampled received signal $r_u$. Samples reserved for inter-slot guard time, as described in Section 7.1.10, are removed when preparing $r_u$. After removing (optional) cyclic prefix samples the time domain packet is converted into a series of frequency domain OFDMA symbols. Noise power is estimated using inactive subcarriers. Each active subcarrier is (optionally) unscrambled. The channel estimation and correction block removes residual frequency offset, rate of change of frequency offset, and compensates for complex channel gain. The corrected symbols for each subcarrier are reassembled according to PSDU size, and input to a soft decoder block. The soft decoder demodulates and (optionally) de-interleaves prior to decoding. The decoder outputs uplink bit values, along with an indicator of their validity. If the decoder declares success then the uplink bits (PSDUs) are passed to the MAC layer. The channel parameter and SNR estimates may also be passed as metadata to the MAC layer. Each component of the baseband receiver is described in detail below. Uplink Rx instructions may be provided to any block of the receiver, as required.

In another embodiment, the initial channel parameter estimates produced by the channel estimation and correction block in FIG. 24 are further refined after decoding. In this case, a soft decoder is used and the soft-decisions provided by this decoder are converted to soft-estimates of the complex transmit samples. Treating these soft-estimates as a sequence of known pilot samples, more accurate estimates of the channel parameter offsets are obtained from the received signal samples, e.g. by minimising the sum of the squared errors between the received signal samples and the soft-estimates of transmit samples. Using the resulting refined estimates, the received signal samples are offset-corrected and provided to the soft-decoder a second time in order to obtain an improved decoder output. The refinement may also be an iterative process, where soft decoding and refinement of the estimates are carried out repeatedly, alternating until the decoder declares success or no further refinement of the channel estimates is detected. Refined channel parameter estimates may also be passed as metadata to the MAC layer. In one embodiment a channel parameter refinement step is conducted after the decoder declares that a valid codeword has been obtained, prior to providing the estimates to the MAC layer.

Section 7.2.1: Cyclic Prefix Removal

Each uplink OFDM symbol (optionally) undergoes CP insertion, as described in Section 7.1.8. Cyclic prefix samples are removed from each OFDMA symbol in the received packet, via sample selection, prior to input into to the time-to-frequency domain conversion block by cyclic prefix removal block 721.

Section 7.2.2: Time-to-Frequency Domain Conversion

The time-to-frequency domain conversion block 722 transforms the time domain received packet into a buffer of frequency domain OFDMA symbols. In one embodiment, a fast Fourier transform (FFT) is used to generate the frequency domain OFDMA symbols. Other known time-to-frequency domain conversion techniques may also be applied. The access node has knowledge of the active subcarrier set, and hence a reduced complexity FFT may be used when only a subset of subcarriers require demodulation. In one embodiment, the subcarrier spacing is 2 kHz. A 32-point FFT with a sampling rate of 64 kHz is used to generate the frequency domain OFDMA symbols.

Section 7.2.3: Symbol Unscrambler

The symbol unscrambler 723 reverses the (optional) scrambling operation performed at the uplink transmitter, as described in Section 7.1.6. Symbols are unscrambled on a per-subcarrier basis, with the receiver subcarrier index being used to initialise the descrambler.

Section 7.2.4: Channel Estimation and Correction

The pilot assisted channel estimation and correction block 724 generates uplink channel parameter estimates and uses them to correct the input symbols prior to demodulation, via the following steps:

Coarse frequency offset estimation and correction;

Fine frequency offset and frequency rate estimation and correction; and

Complex gain estimation and correction. This step produces the final symbol output, and associated SNR estimate, required by the demodulation process that follows.

As described in Section 7.1.4, in an embodiment pilot symbols are distributed in three groups across each subcarrier. Each group of pilots is separated into two subgroups, labelled $P_{GA}$ and $P_{GB}$ for group G, as shown in FIG. 23. Other embodiments may use different numbers and/or sizes of pilot groups and different group separation. The channel estimation operations described here are not limited to the specific pilot distribution shown in FIG. 23.

In one embodiment, the unscrambled pilot symbols have a constant symbol value that is known to the receiver, as described in Section 7.1.4. In other embodiments pilot symbols may be set to different values. In this case the receiver uses the known transmitted pilot values (e.g. from a lookup table) to modulation strip the received pilot symbols prior to using them for channel estimation.

Figure 25:
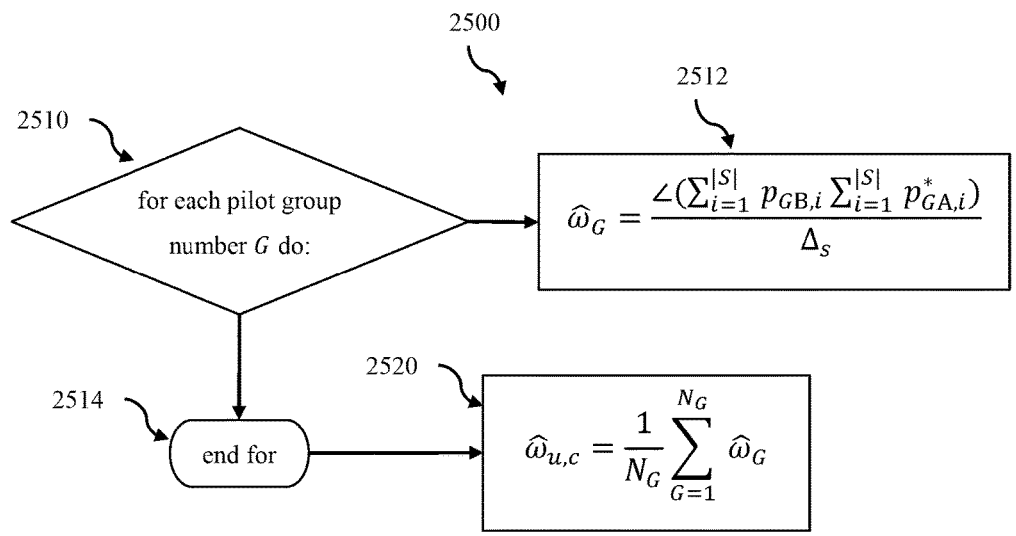
FIG. 25 shows a flowchart of an algorithm to obtain an uplink coarse frequency estimate according to an embodiment.

The coarse estimation process calculates an average of independent frequency offset estimates made using the pilots groups. Each estimate is obtained by first summing the adjacent pilot symbols in each subgroup, and then calculating the difference in phase between the two sums. The uplink coarse frequency estimate $\hat{\omega}_{u,c}$, in radians per symbol period (including optional cyclic prefix extension), is obtained using algorithm shown in Table 3 and FIG. 25.

TABLE 3

ALGORITHM FOR DETERMINING THE COARSE FREQUENCY OFFSET $\hat{\omega}_{u,c}$

| | |
|---|---|
| for each pilot group number G do | Step 2510 |
| Calculate the group frequency estimate: | |
| $$\hat{\omega}_G = \frac{\angle\left(\sum_{i=1}^{|S|} p_{GB,i} \sum_{i=1}^{|S|} p_{GA,i}^*\right)}{\Delta_s}$$ | Step 2512. $\|S\|$ is the number of pilot symbols in each subgroup, and $p_{GA,i}$ and $p_{GB,i}$ are the $i^{th}$ pilot symbols in subgroups A and B of group G. $\Delta_s$ is the subgroup spacing. The $\angle$ operator returns the phase of the complex operand. |
| end | Step 2514 |

TABLE 3-continued

ALOGORITHM FOR DETERMINING THE COARSE FREQUENCY OFFSET $\hat{\omega}_{u,c}$

Calculate the average of the group estimates:

$$\hat{\omega}_{u,c} = \frac{1}{N_G} \sum_{G=1}^{N_G} \hat{\omega}_G,$$

Step 2520. $N_G$ is the number of pilot groups return $\hat{\omega}_{u,c}$

All frequency domain input symbols X[k] are then corrected to generate $X_c[k]$ by applying the coarse frequency estimate, $$X_c[k]=X[k]e^{-jk\hat{\omega}_{u,c}},$$

where k indexes symbol number.

In one embodiment, when multiple subcarriers are allocated to a terminal, the per-subcarrier values of $\hat{\omega}_{u,c}$ are averaged across two or more subcarriers allocated to the same terminal. The average value is then used to perform the correction.

The fine frequency estimation process operates on the coarse-corrected symbols $X_c[k]$. The fine frequency estimator calculates inter-group frequency estimates using the phase difference of the sum pilots between pilot group pairs. The fine frequency estimate is the average of the inter-group frequency estimates. The frequency rate is estimated using the difference between inter-group fine frequency estimates. The uplink fine frequency estimate $\hat{\omega}_{u,f}$ (radians per symbol period) and fine frequency rate estimate $\hat{v}_{u,f}$ (radians per symbol period squared) are obtained for the case of 3 pilot groups ($P_1$, $P_2$, $P_3$) using algorithm of Table 4 and FIG. 26. The algorithm may be extended for use with higher numbers of pilot groups.

The channel estimation and correction block provides the following uplink frequency and frequency rate estimates for external use $$\hat{\omega}_u = \hat{\omega}_{u,c} + \hat{\omega}_{u,f}$$

$$\hat{v}_u = \hat{v}_{u,f}.$$

Figure 26:
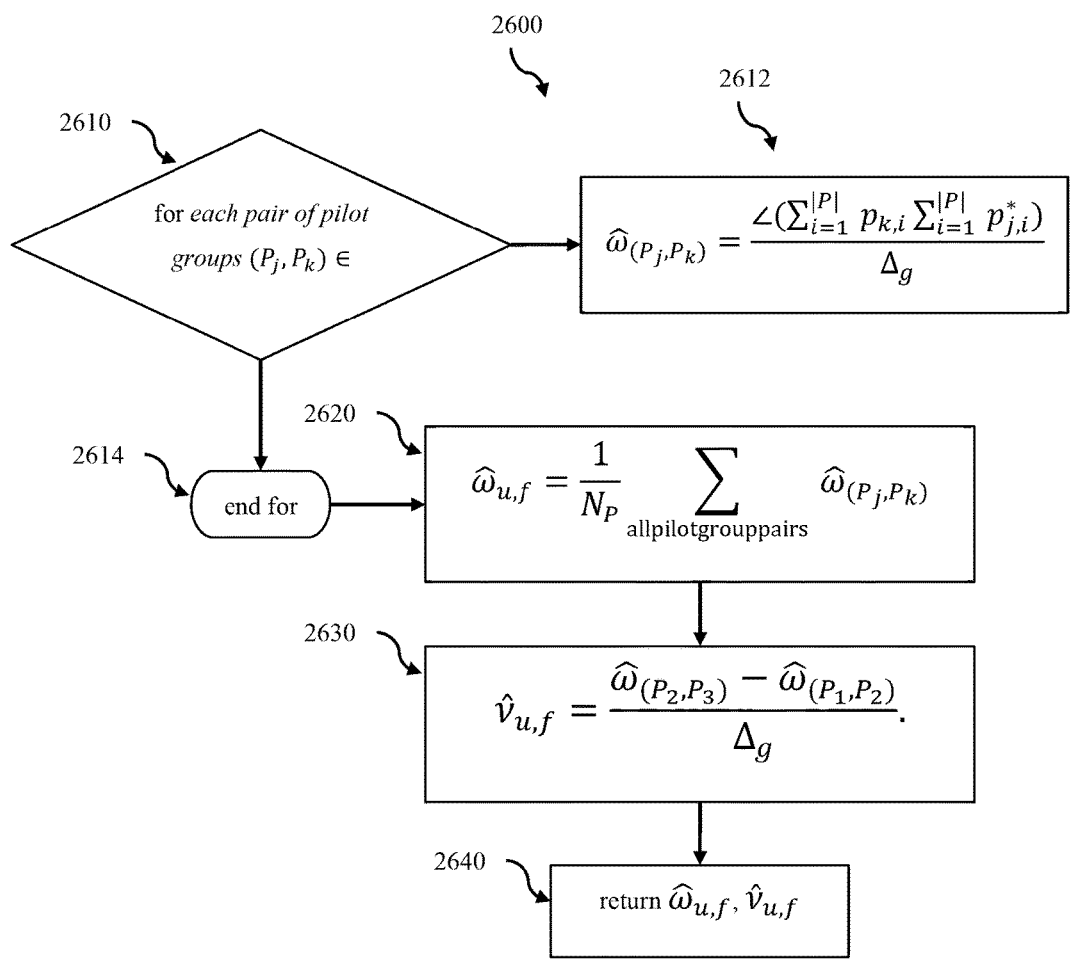
FIG. 26 shows a flowchart of an algorithm to obtain uplink fine frequency estimate according to an embodiment.

In one embodiment, the fine estimation and correction process omits frequency rate estimation in algorithm of FIG. 26, and sets $\hat{v}_{u,f}$ to some constant value. This value may for example be zero, or the midpoint of the expected range of Doppler rate. In one embodiment, when multiple subcarriers are allocated to a terminal, the per-subcarrier values of $\hat{\omega}_{u,f}$ and/or $\hat{v}_{u,f}$ are averaged across two or more subcarriers allocated to the same terminal. The average value is then used to perform the correction.

The following is about Estimation Range. Pilot group and subgroup spacings may be adjusted to set the unambiguous range for frequency offset estimation and correction, according to

TABLE 4

ALOGORITHM FOR DETERMINING THE FINE FREQUENCY OFFSET ESTIMATE $\hat{\omega}_{u,f}$ (RADIANS PER SYMBOL PERIOD) AND FINE FREQUENCY RATE ESTIMATE $\hat{v}_{u,f}$ for each pair of pilot groups $(P_j, P_k) \in \{(P_1, P_2), (P_2, P_3)\}$  Step 2610
do
   Calculate the the inter-group frequency estimate:

$$\hat{\omega}_{(P_j,P_k)} = \frac{\angle\left(\sum_{i=1}^{|P|} p_{k,i} \sum_{i=1}^{|P|} p_{j,i}^*\right)}{\Delta_g}$$

Step 2612. |P| is the number of pilot symbols in each group, and $p_{j,i}$ and $p_{k,i}$ are the $i^{th}$ pilot symbols in groups $P_j$ and $P_k$. $\Delta_g$ is the group spacing end  Step 2614
Calculate the average of the inter-group frequency offset estimates:

$$\hat{\omega}_{u,f} = \frac{1}{N_P} \sum_{allpilotgrouppairs} \hat{\omega}_{(P_j,P_k)},$$

Step 2620. $N_P$ is the number of pilot group pairs

Calculate the frequency rate estimate:

$$\hat{v}_{u,f} = \frac{\hat{\omega}_{(P_2,P_3)} - \hat{\omega}_{(P_1,P_2)}}{\Delta_g}.$$

Step 2630 return $\hat{\omega}_{u,f}, \hat{v}_{u,f}$  Step 2640

All coarse corrected frequency domain symbols $X_c[k]$ are then refined to generate $X_f[k]$ by applying the fine estimates, $$X_f[k]=X_c[k]e^{-j(\hat{\omega}_{u,f}k+\hat{v}_{u,f}k^2/2)},$$

where k indexes symbol number.

$$\hat{\omega}_r = \pm \frac{1}{2T_{sym}\Delta_p}$$

where $\hat{\omega}_r$ is the unambiguous frequency estimation range, $T_{sym}$ is the OFDM symbol duration (including optional cyclic prefix extension) and $\Delta_p$ is the spacing between (sub)groups that are being used to calculate the estimate. In one embodiment, for a 32-point transmit IFFT with 64 kHz sampling rate and cyclic prefix length of 2 samples, $T_{sym}$=531.25 μs. In this case, the pilot distribution described in Section 7.1.4 provides an unambiguous coarse frequency estimation range ±29.4 Hz (for $\Delta_p=\Delta_s=32$) and fine frequency estimation range ±6.5 Hz (for $\Delta_p=\Delta_g=144$).

The following is about Complex Gain Estimator. In one embodiment, the compensated signal $X_f[k]$ is provided to any of the algorithms from WO2014089634. This returns an estimate of the complex channel gain, $\hat{\alpha}_u$. The symbols $X_f[k]$ are then multiplied by $1/\hat{\alpha}_u$ to correct for channel gain, prior to output from the channel estimation and correction block. In one embodiment for an alternate Fine Frequency and Complex Gain Estimation, the complex signal gain, as well as fine frequency offset and the rate of change of frequency offset, are estimated from the coarse corrected signal, $X_c[k]$, using the grid search method described for the uplink case in Section 5.2.1.

Section 7.2.5: Noise Power Estimation

In one embodiment, the noise power estimation module 725 in the receiver uses an N point FFT, where N is greater than the maximum number of subcarriers that may be allocated for uplink transmission. One or more of the inactive subcarriers, i.e. those not currently allocated, are used to generate an uplink noise power estimate, $\hat{\sigma}_u^2$. In one embodiment, the average power is measured over the duration of the frequency domain received packet, on one or more of the unallocated subcarriers. The noise power estimate is then calculated as the mean of the average power measurements. In one embodiment, the receiver uses a 32-point FFT with subcarriers indexed [−16, . . . , 15]. The centre 16 subcarriers are available for uplink allocation, i.e. subcarriers [−8, . . . , 7]. Subcarriers [−13, −12, −11, 10, 11, 12] are used to estimate noise power, leaving guard subcarriers at the edges of the FFT and at the edges of the allocated subcarriers.

In another embodiment, when estimating noise power the receiver may dynamically include measurements of average power over temporarily unallocated subcarriers. The receiver may store per-subcarrier measurements of noise power made on one or more unallocated subcarriers, and/or the average value of per-subcarrier noise power over time some time (e.g. using a sliding window average). In one embodiment the receiver provides the per-subcarrier noise power estimates to the MAC layer. These per-subcarrier noise power estimates may be used by the access node to dynamically detect interference and coordinate the uplink to avoid regions of the spectrum affected by interference, as described in Section 3.2.5. In one embodiment, if the noise power measured on a subcarrier has increased by a predetermined amount (or more) then the receiver excludes that subcarrier when averaging the noise power estimates across subcarriers. The predetermined amount may be chosen experimentally, such that it allows for some variation, e.g. due to changes in thermal noise conditions, while targeting the detection of increased power due to interference. The receiver continues to track the noise power measured on the subcarrier. If the noise power returns to a suitable level, the receiver may return the subcarrier index to the set used for noise power estimation.

Section 7.2.6: Signal-to-Noise Ratio Estimation

In an embodiment the uplink SNR estimate, $\hat{\gamma}_u$, is calculated using the estimated noise power and complex channel gain estimate by the SNR estimator 726, as follows $$\hat{\gamma}_u = \frac{|\hat{\alpha}_u|^2}{\hat{\sigma}_u^2}.$$

SNR may also be estimated from the symbols at input to the soft decoder block, using methods described in Section 5.2.7.

Section 7.2.7: Soft Decoder

Prior to soft decoding, the channel corrected symbols for each subcarrier are organised according to PSDU size. In an embodiment PSDU length is chosen such that each PSDU is transmitted using a single subcarrier, and hence the soft decoder 727 operates on a per-subcarrier basis. In embodiments where PSDUs may span multiple subcarriers, channel corrected symbols (and associated noise estimates) are collated into PSDU blocks prior to demodulation and decoding. The soft decoder block 727 performs demodulation, (optional) de-interleaving and decoding. The decoder outputs uplink bit values, along with an indicator of their validity, and (optional) data soft decisions for feedback to the channel estimation and correction block. The soft decoder operates as described for the downlink case in Section 5.2.8.

Section 8: Alternative Uplink Physical Layer

The system may use the framework described above to support known access schemes to provide an alternative uplink to the OFDMA based uplink described in Section 7.

In one embodiment the uplink employs single carrier frequency devision multiple access (SC-FDMA). The OFDMA uplink system may be adapted for use as an SC-FDMA system, using transmit and receive techniques known to those skilled in the art, including:

Adding an time-to-frequency domain conversion block (e.g. FFT) to the terminal transmitter, to operate across the allocated subcarriers, prior to the frequency-to-time domain conversion block; and Reversing this process for subcarriers allocated to that terminal at the receiver, by applying a frequency-to-time domain conversion block (e.g. IFFT) across the allocated subcarriers, after the channel estimation and correction block.

In the preferred embodiment the access node allocates the uplink channel resource, and the terminal determines the subcarrier set to be used for transmission, as described for the OFDMA case. The terminal SC-FDMA transmitter uses the subcarrier set to define the subcarrier mapping between the time-to-frequency domain conversion block and the frequency-to-time domain conversion block. The transmitter uses predictions from the channel state tracker to precompensate for uplink channel effects, as described for the OFDMA case.

The physical and MAC layer may present a consistent interface to higher layers of the communications system under both OFDMA and SC-FDMA schemes. Moreover, the system permits coexistence of OFDMA and SC-FDMA terminals using a single receiver. In one embodiment, a terminal using the SC-FDMA scheme generates pilot symbols consistent with the OFDMA uplink, thus allowing the same channel estimation and correction block, as follows:

The frequency domain pilot symbols are generated using a random sequence unique to the logical subcarrier number, as described for the OFDMA case;

The pilots are converted to the time domain using frequency-to-time domain converter (e.g. IFFT).

The time domain pilot symbols are inserted into the packet at predetermined locations, matching those used for the OFDMA case.

The optimisation problem is constructed in a similar manner to the OFDMA case. However in this case the "subcarriers" are now the frequency bands allocated to each SC-FDMA terminal. These might be wider than the original OFDMA subcarriers. Additionally a constraint such that each terminal is only allocated one of these wider subcarriers can be added.

Section 9: System Optimisation

In one embodiment, the access node coordinates system wide optimisation of performance, exploiting one or more of:

slot and subcarrier selection;

knowledge of per-terminal receive power level and/or other terminal parameters such as position; and/or control of terminal transmit power, modulation and coding.

This optimization may take into account items such as fairness, data priority, terminal energy conservation, and opportunistic exploitation of channel strength and signal-to-noise ratio.

In one embodiment, the access node allocates the uplink channel resource such that guard subcarriers are placed between populated subcarriers, improving resilience to frequency offset. The satellite may also allocate reduced power subcarriers close to the band edges in order to satisfy spectral regulatory requirements.

In some instances, a terminal may have larger than expected residual uplink carrier frequency and/or timing offset, even after acquiring and tracking the satellite downlink packets. This could be due to acquisition/tracking failures, hardware malfunction, temperature variations, low quality or faulty local oscillators, or a variety of other mechanisms. In such cases, the access node will be aware of this problem from its reception of transmissions coming from the terminal. Such problems, if ignored, could lead to inter-carrier or inter-symbol interference which may affect the ability to decode other users. In such instances, the access node may do one or more of the following:

transmit an instruction to such a terminal, barring it from access and instructing it to cease making requests;

not acknowledge access requests from the terminal—effectively barring it from access;

transmit a frequency (or timing) correction signal in the acknowledgement/subcarrier assignment message, based on uplink channel parameter estimates;

assigning subcarrier(s) to the terminal in a forthcoming slot, but not assign any other terminals to that slot; or only assign other terminals to subcarriers that are sufficiently orthogonal to the transmissions from the offset terminal.

In one embodiment the access node collects statistics pertaining to the link it has with each terminal, such as:

average complex channel gain, e.g. maintained via a sliding window.

average noise power, e.g. maintained via a sliding window.

average SNR, e.g. maintained via a sliding window.

PSDU success (or error) rate may be calculated by using the decode valid flag to indicate PSDU decode success (or failure), e.g. maintaining a sliding window calculation of the number of successes (or failures) occurring in the window, divided by length of the window.

Statistics may also be calculated per subcarrier and/or slot, e.g. allowing interference to be monitored and avoided in frequency and/or time. Average complex channel gain, noise power, and/or SNR statistics may be used to estimate available link margin. The access node may then use the link margin estimate to optimise link performance by instructing the terminal on uplink modulation, coding scheme and transmit power. For example, given sufficient link margin the access node may instruct a terminal to reduce transmit power, increase code rate, and/or increase modulation order. The access node may also consider the capability of each terminal, such as its maximum transmit power, and supported modulation and coding schemes, when determining how to instruct the terminal.

In one embodiment, the access node collects PSDU success rate statistics for each subcarrier and uses them as an input to subcarrier allocation, e.g. prioritising allocation to subcarriers exhibiting high success rate. The access node may also record and use the PSDU success rate statistics on a per-terminal basis.

When allocating the uplink resource the access node may simultaneously consider the set of collected statistics and terminal capabilities across multiple links. For example, a terminal that has the capability to transmit using a high order modulation scheme may be allocated subcarriers that offer a high link margin in preference to a terminal that does not have that capability.

Potential exists for subcarriers received at a lower power to suffer inter-carrier interference from nearby (in frequency) higher powered subcarriers. In one embodiment the access node coordinates a closed loop power control mechanism, instructing terminals to adjust transmit power, with the target of a uniform distribution of power across all received subcarriers. In another embodiment the access node groups higher power subcarriers together and separates them from lower power subcarriers, e.g. assigning higher power subcarriers to different slots, or to subcarriers that are sufficiently separated in frequency from the lower powered subcarriers.

Section 10: Implementation Example

Figure 27:
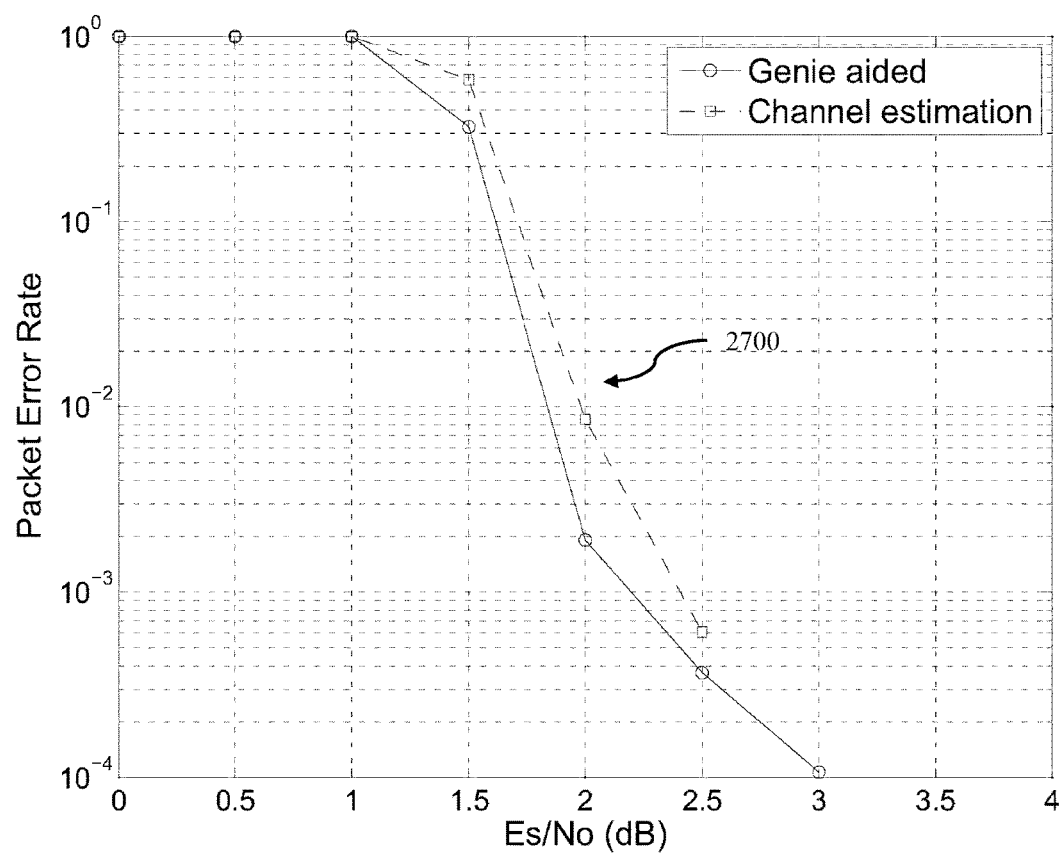
FIG. 27 shows packet error rate simulation results for an embodiment of the downlink waveform.

FIG. 27 shows packet error rate simulation results 2700 for an embodiment of the downlink waveform described above. Downlink packets contain 3960 data symbols (7920 QPSK modulated rate 1/2 coded bits) and 30 pilot symbols. The symbol rate is 16000 symbols/sec and slot duration is 250 ms. The curve labelled "Genie aided" was obtained from a simulation in which the receiver was provided with perfect knowledge of the channel parameters. The curve labelled "Channel estimation" was obtained from a simulation in which the receiver was not provided with information about the channel. Receiver performance when estimating the channel is within 0.3 dB of performance when using perfect knowledge of the channel.

Figure 28:
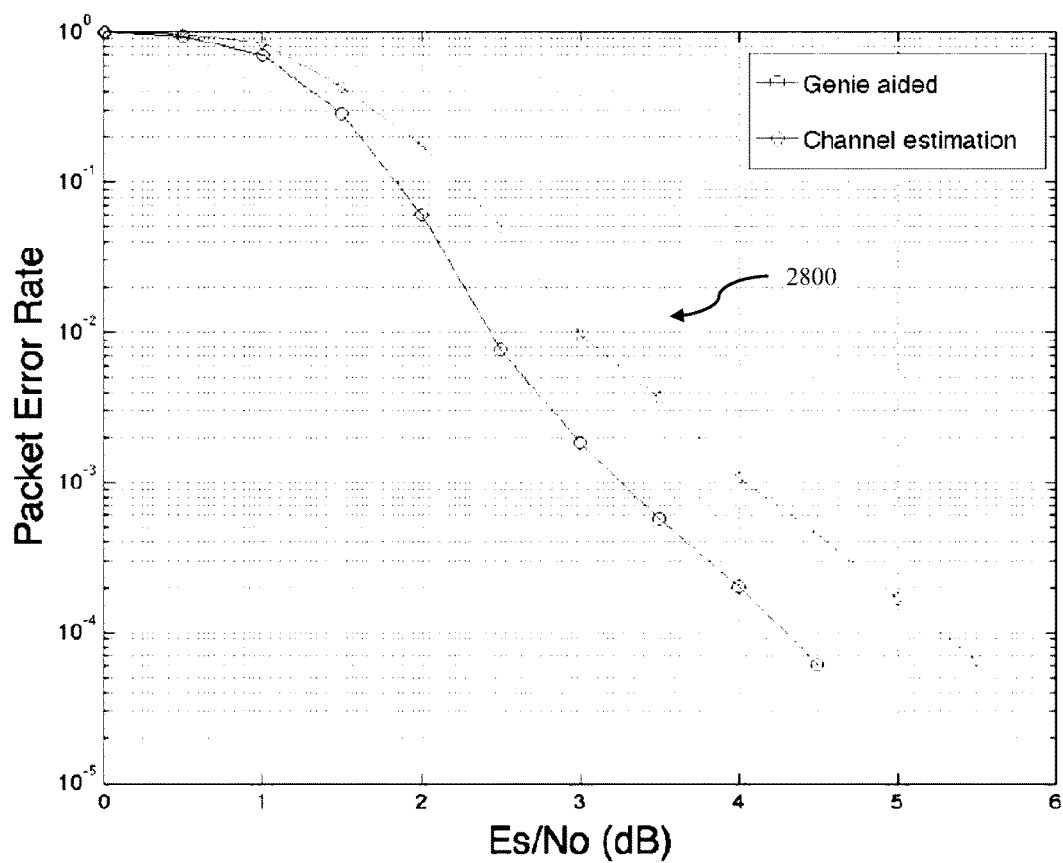
FIG. 28 shows packet error rate simulation results for an embodiment of the uplink waveform.

Statistics relating to channel offset estimation accuracy were recorded during downlink simulation. These statistics were used as input into the uplink simulation model, in order to model the expected behaviour of the channel state tracker. FIG. 28 shows packet error rate simulation results 2800 for an embodiment of the uplink waveform described above. Uplink packets contain 440 data symbols (880 QPSK modulated rate 1/2 coded bits) and 24 pilot symbols. The symbol rate is 2000 symbols/sec and slot duration is 250 ms. In this simulation a single terminal transmits using a single subcarrier. The curve labelled "Genie aided" was obtained from a simulation in which the receiver was provided with perfect knowledge of the channel parameters. The curve labelled "Channel estimation" was obtained from a simulation in which the receiver was not provided with information about the channel. Receiver performance when estimating the channel is within 1 dB of performance when using perfect knowledge of the channel.

Embodiments of the methods and apparatus described herein can be used to improve the spectral efficiency of communications in a multiuser multicarrier communications network comprising an access node, such as a satellite access node, and a plurality of terminals. Embodiments may also offer one or more of the following benefits:

- A flexible and efficient means for the access node to allocate channel resources, in dimensions of both time and frequency;
- Access node coordinated system-wide optimisation of performance;
- The potential to offer bandwidth expansion (through exploitation of Doppler shifts) between terminals and access node;
- A versatile radio interface design which can serve as the remote radio interface (between the access node and user terminals) or the gateway radio interface (between the access node and gateway terminals) or simultaneously serve as both remote and gateway radio interface;
- Low complexity signal acquisition and synchronisation tracking. Uplink transmissions are coordinated targeting simultaneously arrival at a specific frequency, with only phase offset, symbol timing and minor residual frequency offset;
- Coordinated system-wide distribution of processing, enabling low complexity implementation for both access node and terminals;
- Dynamic detection and avoidance of uplink interference. The access node may allocate a terminal to a group of subcarriers that are not necessarily contiguous, thus providing a flexible mechanism to avoid narrowband interferers;
- Potential for terminals to modulate the uplink using a fast Fourier transform (FFT), or reduced complexity FFTs that take advantage of the fact that only a small subset of subcarriers need to be modulated;
- Potential to demodulate the uplink using an FFT and per-carrier amplitude and phase tracking (one tap equalization);
- Error control coding of terminal transmissions, either per subcarrier, or across multiple subcarriers;
- The ability for terminals to adjust their transmit power, modulation scheme, and/or error control code rate, and for this to be coordinated by the access node;
- Mechanisms for managing terminals that exhibit larger than expected residual carrier frequency and/or timing offset;
- Optional use of cyclic prefix to (a) reduce the susceptibility to residual time offsets (b) provide resilience to multipath; and
- Optional support for unidirectional (uplink only) service.
- The ability for multiple users to simultaneously transmit during the same slot and on the same (or overlapping) set of subcarriers, and for this to be coordinated by the access node
- The use of multiuser detection (e.g. linear filtering) or multiuser decoding (e.g. iterative multiuser decoding) techniques, such as those described in PCT/AU2014/000826, to reliably decode users transmitting in the same slot, and on non-disjoint sets of subcarriers.
- The access node can coordinate the allocation of multiple terminals to subcarriers based on consideration (e.g. via EXIT charts) of the likelihood of being able to decode those transmissions using an iterative multiuser decoder or some other decoder.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Aspects of the system may be a computer implemented using a computing device or apparatus which comprises one or more processors and a memory, and optionally input devices (eg keyboard, mouse, etc.) and output devices (eg a display). These may be integrated in receiver and transmitter apparatus or be in communication with receiver and transmitter apparatus, for example to perform specialised calculations on behalf of the receiver and transmitter apparatus. The memory may comprise instructions to cause the processor to execute aspects or steps of a method described herein. The processor and memory may be included in a standard computing device, such as a server, desktop computer, a portable computing device such as a laptop computer or tablet, or they may be included in a customised device or system. The computing device may be a unitary computing or programmable device, or a distributed device comprising several components operatively (or functionally) connected via wired or wireless connections. The one or more processors may comprise a central processing unit (CPU) comprising an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for communication between a terminal and an access node in a multiuser multicarrier communications network comprising a plurality of terminals, the method comprising:
    establishing a link between the terminal and the access node;
    performing initial estimation of one or more channel estimates and tracking one or more channel offsets;
    estimating one or more channel offsets for future packets to be transmitted by the terminal using the one or more tracked channel offsets; and
    pre-compensating a transmission to the access node by the terminal using the one or more estimated channel offsets, wherein the plurality of terminals are permitted to transmit within a band with a predefined maximum bandwidth and are not permitted to transmit out of the band, and the pre-compensation is performed by the terminal such that the transmission is transmitted within the predefined maximum bandwidth but is permitted to arrive at the access node outside of the band permitted at the terminal so that an aggregate signal comprised of transmissions received from the plurality of terminals by the access node occupies a bandwidth greater or equal to the predefined maximum bandwidth of the plurality of terminals.

2. The method as claimed in claim 1, wherein relative movement between the access node and the plurality of terminals generates one or more mobility related channel offsets, and the one or more tracked channel offsets comprise the one or more mobility related channel offsets.

3. The method as claimed in claim 2, further comprising:
    requesting allocation of one or more subcarriers in one or more slots from the access node by the terminal and allocating one or more subcarriers in one or more slots to the terminal, wherein the allocation takes into account the one or more mobility related channel offsets.

4. The method as claimed in claim 3, wherein the one or more mobility related channel offsets comprises a frequency offset, and wherein pre-compensating the transmission comprises pre-compensating for the frequency offset, and wherein pre-compensating for the frequency offset comprises:
  determining which of the one or more subcarriers in the one or more slots that the terminal is capable of pre-compensating using a prediction of an uplink frequency offset;
  transmitting on a different set of one or more subcarriers, wherein a difference in frequency between a requested subcarrier frequency and an actual subcarrier provides a bulk pre-compensation at subcarrier resolution; and
  applying a fine pre-compensation to a channel frequency to pre-compensate for any remaining fraction of subcarrier spacing for the allocated one or more subcarriers.

5. The method as claimed in claim 1, wherein the one or more channel offsets further comprises a time offset, and wherein pre-compensating the transmission further comprises pre-compensating for the time offset by transmitting ahead of a slot timing boundary.

6. The method as claimed in claim 5, wherein pre-compensating the transmission compensates for a time offset and a frequency offset so that at the access node a transmitted subcarrier is estimated to be received sufficiently close to a center frequency of an allocated subcarrier and to a slot boundary such that the access node can successfully receive the transmission after performing residual frequency correction.

7. The method as claimed in claim 1, further comprising:
  determining a targetable set of one or more subcarriers in one or more slots for a terminal wherein the targetable set for a terminal is a subset of total subcarriers that the access node can receive on that the terminal can pre-compensate for the one or more estimated channel offsets, wherein pre-compensation of the transmission is performed by a terminal such that the transmission arrives at the access node in one of the one or more subcarriers of the targetable set.

8. The method as claimed in claim 1, further comprising:
  determining a targetable set of one or more subcarriers in one or more slots that the terminal can pre-compensate for the one or more estimated channel offsets based upon the one or more estimated channel offsets, wherein the targetable set is included in an allocation request transmitted to the access node by the terminal, wherein the allocation is performed by the access node such that in use, the access node is configured to allocate uplink resources by optimising one or more objective functions as a function of system parameters, and wherein the optimisation is configured to discourage allocation of subcarriers not in the targetable set.

9. A method for communication between an access node and one or more terminals in a multiuser multicarrier communications network comprising a plurality of terminals, the method comprising:
  establishing one or more links between the access node and the one or more terminals;
  receiving an allocation request for one or more subcarriers in one or more slots from the one or more terminals; and
  allocating uplink resources to the one or more terminals, wherein the plurality of terminals are permitted to transmit within a band with a predefined maximum bandwidth and are not permitted to transmit out of the band, and the allocation takes into account one or more estimated channel offsets, and wherein the one or more subcarriers are allocated from the predefined maximum bandwidth such that an allocated transmission is transmitted within the predefined maximum bandwidth but may arrive at the access node outside of the band permitted at the terminal so that in use, an aggregate signal comprised of transmissions received from the plurality of terminals by the access node occupies a bandwidth greater or equal to the predefined maximum bandwidth the plurality of terminals.

10. The method as claimed in claim 9, wherein the bandwidth that the one or more subcarriers are allocated from is equal to the predefined maximum bandwidth increased by an amount based on twice a predetermined maximum Doppler offset between the access node and the plurality of terminals and a subcarrier spacing.

11. The method as claimed in claim 9, wherein the allocation request comprises a targetable set of subcarriers for the one or more terminals, wherein allocating the uplink resources takes into account one or more channel offsets using the targetable set, and wherein relative movement between the access node and the plurality of terminals generates one or more mobility related channel offsets, wherein the one or more channel offsets comprise the one or more mobility related channel offsets, and wherein allocating the uplink resources takes into account the one or more mobility related channel offsets using the targetable set.

12. The method as claimed in claim 11, wherein the access node performs independent subcarrier channel estimation.

13. The method as claimed in claim 9 wherein the allocation request comprises a targetable set of subcarriers for the one or more terminals, and wherein allocating the uplink resources to the one or more terminals takes into account one or more channel offsets using the targetable set by optimising one or more objective functions as a function of system parameters, and wherein the optimisation is configured to discourage allocation of subcarriers not in the targetable set.

14. The method as claimed in claim 13, wherein the optimisation is configured to discourage allocation to terminals not in the targetable set by including one or more additional constraints which discourage the optimisation from allocating subcarriers not in the targetable set.

15. A terminal apparatus for use in a multiuser multicarrier communications network comprising an access node and a plurality of terminals, the terminal comprising:
  a transmitter;
  a receiver;
  a channel state tracker configured to perform initial estimation of one or more channel offsets and tracking the one or more channel offsets, and for estimating one or more channel offsets for future packets to be transmitted by the terminal using the one or more tracked channel offsets; and
  a Medium Access Controller (MAC) configured to establish a link between the terminal and the access node, to request allocation of one or more subcarriers in one or more slots taking into account the one or more estimated channel offsets, wherein the terminal is permitted to transmit within a band with a predefined maximum bandwidth and is not permitted to transmit out of the band, and receives an allocation of the one or more subcarriers in one or more slots wherein the allocated one or more subcarriers are selected from either a fixed set of contiguous subcarriers spanning an entire maximum bandwidth or a subset of all possible subcarriers over the maximum predefined bandwidth, and to pre-compensate a transmission from the terminal to the access node using the one or more estimated channel offsets such that in at least one use, the pre-compensation is performed such that the transmission is transmitted within the band, and the transmission is estimated to arrive at the access node in one or more subcarriers outside of the band permitted at the terminal.

16. The terminal apparatus as claimed in claim 15, wherein relative movement between the access node and the plurality of terminals generates one or more mobility related channel offsets, and wherein the one or more tracked channel offsets comprise the one or more mobility related channel offsets.

17. The terminal apparatus as claimed in claim 15, wherein the channel state tracker is a component of a Physical Layer (PHY), and the MAC is configured to trigger the channel state tracker to generate the estimates of channel offsets and instruct the PHY on the one or more subcarriers to be used for transmission.

18. An access node for use in a multiuser multicarrier communications network comprising the access node and a plurality of terminals, the access node comprising:
  a transmitter;
  a receiver; and
  a Medium Access Controller configured to establish one or more links between a terminal and the access node, to receive allocation requests for one or more subcarriers in one or more slots received from one or more terminals, wherein each terminal is permitted to transmit within a predefined maximum bandwidth and is not permitted to transmit out of band, and to allocate the one or more subcarriers in the one or more slots to the one or more terminals, wherein the allocated one or more subcarriers are selected from either a fixed set of contiguous subcarriers spanning an entire maximum bandwidth or a subset of all possible subcarriers over the entire maximum bandwidth and the allocation takes into account one or more channel offsets so that one or more transmissions are received at the access node in additional subcarriers outside of the entire maximum bandwidth permitted at the terminal so that in use an aggregate signal comprised of transmissions received from the plurality of terminals by the access node occupies a bandwidth greater or equal to the predefined maximum bandwidth of the plurality of terminals.

19. The access node as claimed in claim 18, wherein each of the allocation requests comprises a targetable set of one or more subcarriers in the one or more slots from a requesting terminal, and wherein the access node is configured to allocate uplink resources comprising at least one or more subcarriers in the one or more slots to the one or more terminals by optimising one or more objective functions as a function of system parameters, wherein the optimisation is configured to discourage allocation of subcarriers not in the targetable set.

20. The access node as claimed in claim 18, wherein relative movement between the access node and the plurality of terminals generates one or more mobility related channel offsets, and wherein the one or more channel offsets comprises the one or more mobility related channel offsets.

21. The access node as claimed in claim 18, wherein the access node performs independent subcarrier channel estimation.

22. A multiuser multicarrier communications system network comprising:
  a plurality of terminals, each terminal comprising:
    a terminal transmitter;
    a terminal receiver;
    a channel state tracker configured to perform initial estimation of one or more channel offsets and tracking the one or more channel offsets, and for estimating one or more channel offsets for future packets to be transmitted by the terminal using the one or more tracked channel offsets;
    a terminal Medium Access Controller configured to establish a link between the terminal and an access node, and to request allocation of one or more subcarriers in one or more slots taking into account the one or more estimated channel offsets, wherein the terminal is permitted to transmit within a band with a predefined maximum bandwidth and is not permitted to transmit out of the band, and receives an allocation of the one or more subcarriers in one or more slots wherein the allocated one or more subcarriers are selected from either a fixed set of contiguous subcarriers spanning an entire maximum bandwidth or a subset of all possible subcarriers over the maximum predefined bandwidth, and to pre-compensate a transmission from the terminal to the access node using the one or more estimated channel offsets; and
  at least one access node comprising:
    an access node transmitter;
    an access node receiver;
    an access node Medium Access Controller configured to establish one or more links between one or more terminals of the plurality of terminals and the access node, to receive allocation requests for one or more subcarriers in the one or more slots received from the one or more terminals, and to allocate the one or more subcarriers in the one or more slots to the one or more terminals, wherein the allocated one or more subcarriers are selected from either a fixed set of contiguous subcarriers spanning an entire maximum bandwidth or a subset of all possible subcarriers over the entire maximum bandwidth and the allocation takes into account the one or more estimated channel offsets so that one or more transmissions are received at the access node in additional subcarriers outside of the entire maximum bandwidth permitted at the terminal so that in use an aggregate signal comprised of transmissions received from the plurality of terminals by the access node occupies a bandwidth greater or equal to the predefined maximum bandwidth of the plurality of terminals.

* * * * *